(12) United States Patent
Chien

(10) Patent No.: US 10,873,190 B2
(45) Date of Patent: Dec. 22, 2020

(54) DESKTOP OR FLOOR LED LIGHTING DEVICE HAS USB-PORT(S)

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 16/197,800

(22) Filed: Nov. 21, 2018

(65) Prior Publication Data
US 2019/0267825 A1    Aug. 29, 2019

Related U.S. Application Data

(63) Continuation-in-part of application No. 14/951,872, filed on Nov. 25, 2015, and a continuation-in-part of
(Continued)

(51) Int. Cl.
*F21V 33/00* (2006.01)
*H02J 7/00* (2006.01)
(Continued)

(52) U.S. Cl.
CPC ............... *H02J 7/00* (2013.01); *F21S 6/00* (2013.01); *F21S 6/003* (2013.01); *F21S 8/035* (2013.01);
(Continued)

(58) Field of Classification Search
CPC .... H02J 7/00; H02J 4/00; H02J 7/0042; H02J 7/0047; H02J 7/007; F21S 6/00;
(Continued)

(56) References Cited

U.S. PATENT DOCUMENTS 6,474,823 B1  11/2002 Agata et al.
6,666,563 B2  12/2003 Brown
(Continued)

FOREIGN PATENT DOCUMENTS

CN    201078619 Y    6/2008

OTHER PUBLICATIONS

Daniel, Quirky Ember Portable Study Lamp with USB Ports and Power Outlets, Jan. 28, 2011, Gadgetsin.com, http://gadgetsin.com/quirky-ember-portable-study-lamp-with-usb-ports-and-power-outlets.htm.

*Primary Examiner* — Bao Q Truong
(74) *Attorney, Agent, or Firm* — Bacon & Thomas, PLLC

(57) ABSTRACT

Quickly USB Charging ports for lighting device has USB charging-ports which meet 2007 released specification has minimum 1.0 Amp to 5 Amp at DC 5 Volt safety and quickly charging capacity to quickly charge DC current into energy-storage unit or assembly inside the other electric or digital product(s) without high voltage DC current for overheat and fire risk and, optionally, additional outlet-units, to supply AC current to other electric or digital devices including smart phone, computer, communication, consumer electric products. The USB-unit(s) or USB-Module(s) or Outlet-unit(s) fit within or install on anywhere of the item's housing including anywhere of the base, pole, bar, stand, step, contour, edge, walls. The said USB charger only has charging function no any data transmit and only have one input power source not more than one and charging capacity minimum 1.0 Amp up for quickly charge from USB-Charging-ports by 2 male USB-plugs' USB-wire to the device's female USB-ports. The device has $2^{nd}$ or more circuit-inside of device's housing to supply the current to other functions including other light source, LEDs, Plurality of LEDs has different colors, controller, switch, sensor, motion sensor, PIR, remote controller, IP cam and related IR photo-diode or wireless communication for big current needed which may use $2^{nd}$ transformer to supply big Amperage and different working voltage to prevent from 1 transformer not only supply USB Charging-ports(s) but also Big Power consumption for LEDs or other light source or other functions need power.

9 Claims, 19 Drawing Sheets

Related U.S. Application Data application No. 14/834,613, filed on Nov. 10, 2015, and a continuation-in-part of application No. 14/827,810, filed on Aug. 17, 2015, now Pat. No. 10,476,286, and a continuation-in-part of application No. 14/643,026, filed on Mar. 10, 2015, and a continuation-in-part of application No. 14/144,703, filed on Dec. 31, 2013, which is a continuation of application No. 13/161,643, filed on Jun. 16, 2011, now Pat. No. 8,783,936, application No. 16/197,800, which is a continuation-in-part of application No. 14/793,262, filed on Jul. 7, 2015, now abandoned, which is a continuation of application No. 14/642,169, filed on Mar. 9, 2015, now abandoned, which is a continuation of application No. 12/950,017, filed on Nov. 19, 2010, now Pat. No. 8,998,462, application No. 16/197,800, which is a continuation-in-part of application No. 14/870,601, filed on Sep. 30, 2015, and a continuation-in-part of application No. 14/834,613, filed on Nov. 10, 2015, and a continuation-in-part of application No. 14/858,538, filed on Sep. 18, 2015, now Pat. No. 10,184,649, which is a continuation-in-part of application No. 14/833,935, filed on Aug. 24, 2015, now Pat. No. 10,454,289, which is a continuation-in-part of application No. 14/827,810, filed on Aug. 17, 2015, now Pat. No. 10,476,286, which is a continuation of application No. 14/643,026, filed on Mar. 10, 2015, which is a continuation of application No. 14/144,703, filed on Dec. 31, 2013, which is a continuation of application No. 13/161,643, filed on Jun. 16, 2011, now Pat. No. 8,783,936.

(51) Int. Cl.

| | | |
|---|---|---|
| *F21V 23/02* | (2006.01) | |
| *H02J 4/00* | (2006.01) | |
| *G06F 1/26* | (2006.01) | |
| *F21V 15/01* | (2006.01) | |
| *G04B 19/30* | (2006.01) | |
| *H02G 3/14* | (2006.01) | |
| *H01R 25/00* | (2006.01) | |
| *H01R 13/66* | (2006.01) | |
| *G09F 23/00* | (2006.01) | |
| *F21V 8/00* | (2006.01) | |
| *F21S 8/00* | (2006.01) | |
| *F21V 23/06* | (2006.01) | |
| *F21S 6/00* | (2006.01) | |
| *F21W 121/00* | (2006.01) | |
| *F21V 23/04* | (2006.01) | |
| *H01H 9/18* | (2006.01) | |
| *H01R 13/713* | (2006.01) | |
| *H01R 24/76* | (2011.01) | |
| *H01R 103/00* | (2006.01) | |
| *F21Y 115/10* | (2016.01) | |

(52) U.S. Cl.
CPC ............. *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01); *H01R 2103/00* (2013.01); *H02J 2207/20* (2020.01)

(58) Field of Classification Search
CPC ........... F21S 6/003; F21S 8/035; F21V 15/01; F21V 23/02; F21V 23/023; F21V 23/06; F21V 33/00; F21V 33/0004; F21V 33/0024; F21V 33/0048; F21V 33/0056; G02B 6/0045; G04B 19/30; G06F 1/266; G09F 23/00; H01R 13/6691; H01R 25/006; H02G 3/14
See application file for complete search history.

(56) References Cited

U.S. PATENT DOCUMENTS

| | | |
|---|---|---|
| 7,040,783 B1 | 5/2006 | Christianson |
| 7,295,608 B2 | 11/2007 | Reynolds et al. |
| 7,736,033 B2 | 6/2010 | Patel |
| 7,742,293 B2 | 6/2010 | Strauser |
| 7,897,277 B2 | 3/2011 | Meyer et al. |
| 8,116,007 B2 | 2/2012 | Tsai |
| 8,432,667 B2 | 4/2013 | Strauser |
| 8,545,039 B2 | 10/2013 | Patel |
| 8,562,187 B2 | 10/2013 | Smed |
| 8,687,392 B2 | 4/2014 | Sims |
| 8,758,031 B2 | 6/2014 | Cheng et al. |
| 8,783,936 B2 * | 7/2014 | Chien .............. H02J 4/00 362/641 |
| 8,853,884 B2 | 10/2014 | Genannt Berghegger et al. |
| 8,899,797 B2 | 12/2014 | Schaak |
| 8,915,608 B2 | 12/2014 | Chien |
| 9,103,543 B2 | 8/2015 | Marquardt |
| 10,184,649 B2 * | 1/2019 | Chien .............. H02J 7/00 |
| 10,476,286 B2 * | 11/2019 | Chien .............. F21V 15/01 |
| 10,574,069 B2 * | 2/2020 | Chien .............. F21V 15/01 |
| 2006/0209530 A1 | 9/2006 | Schaak |
| 2008/0091250 A1 | 4/2008 | Powell |
| 2008/0258642 A1 * | 10/2008 | Patel .............. F21S 6/002 315/246 |
| 2009/0067161 A1 | 3/2009 | Nagata |
| 2009/0261737 A1 * | 10/2009 | Wright ............ H05B 47/10 315/154 |
| 2010/0046249 A1 | 2/2010 | Mai et al. |
| 2010/0296298 A1 | 11/2010 | Martin, Jr. |
| 2011/0177030 A1 | 7/2011 | Llinas-Brunet et al. |
| 2011/0228449 A1 | 9/2011 | Keebler et al. |
| 2012/0182768 A1 * | 7/2012 | Maslowski ........ F21K 9/232 362/646 |
| 2012/0294015 A1 | 11/2012 | Smed |

* cited by examiner

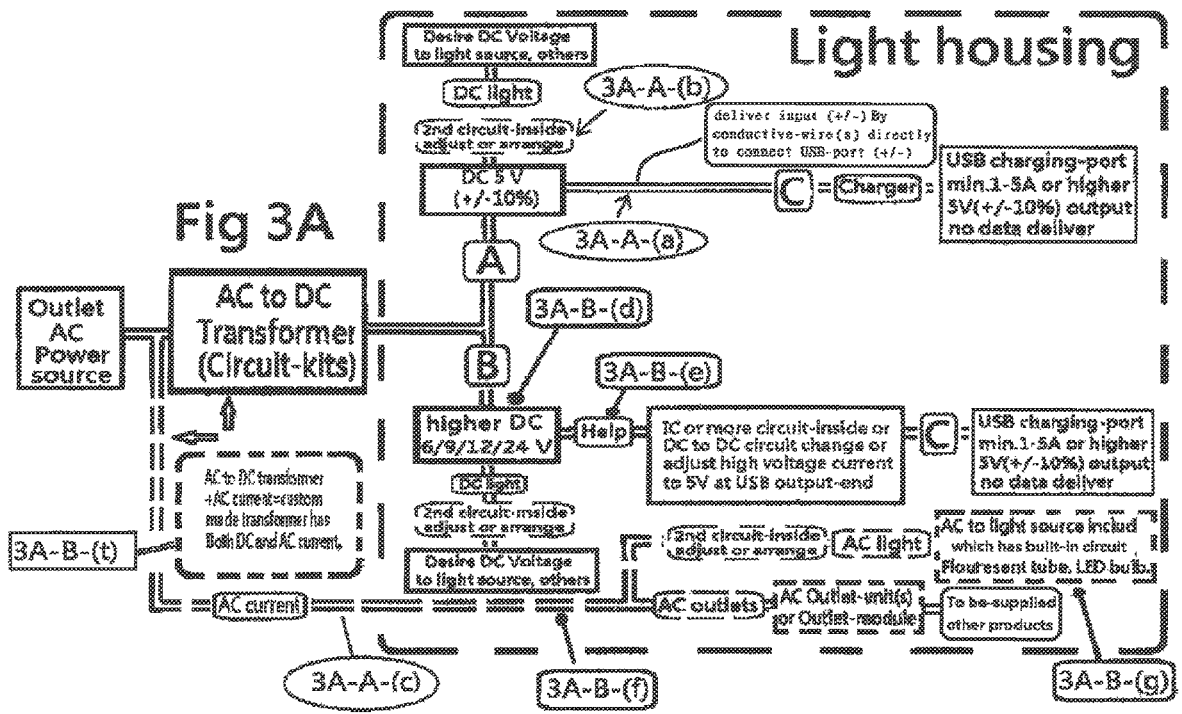
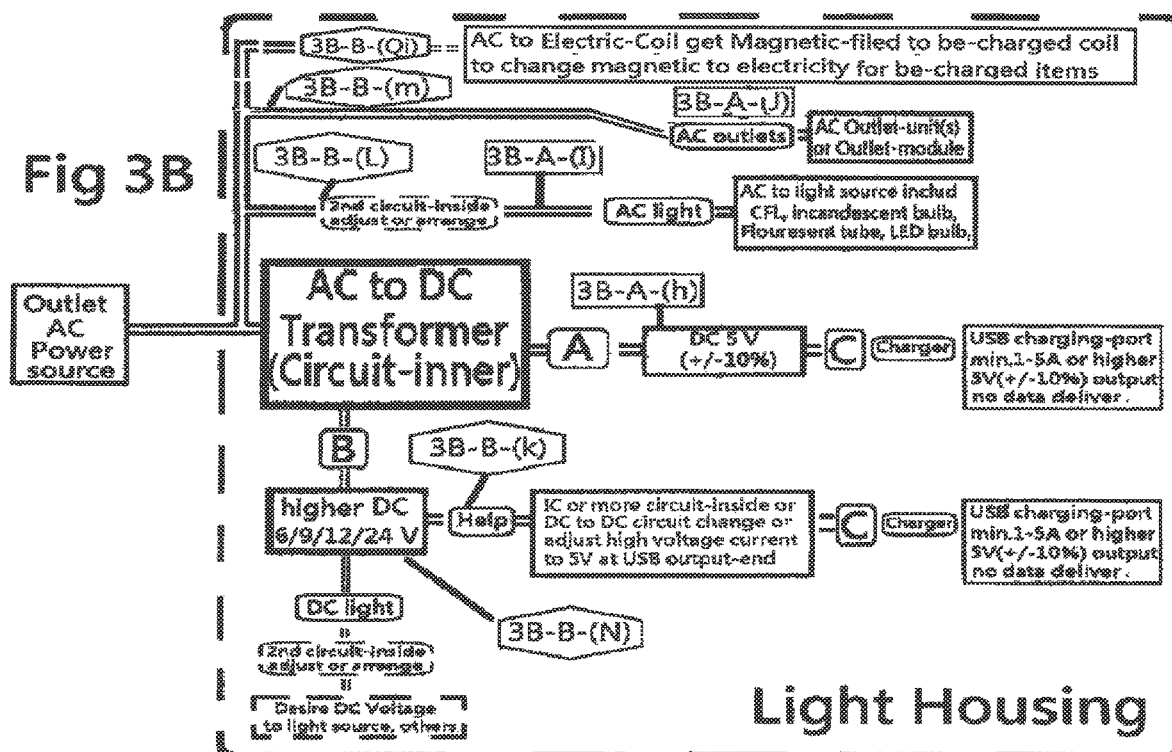

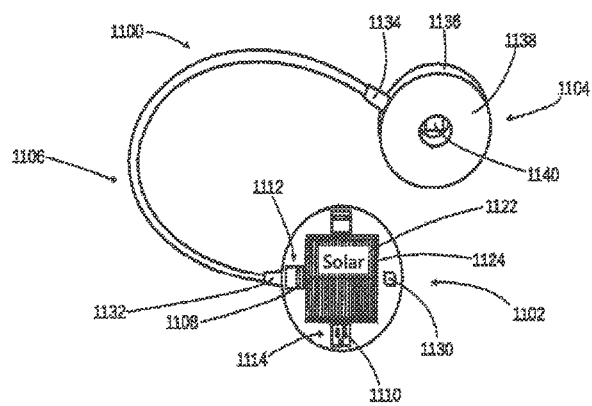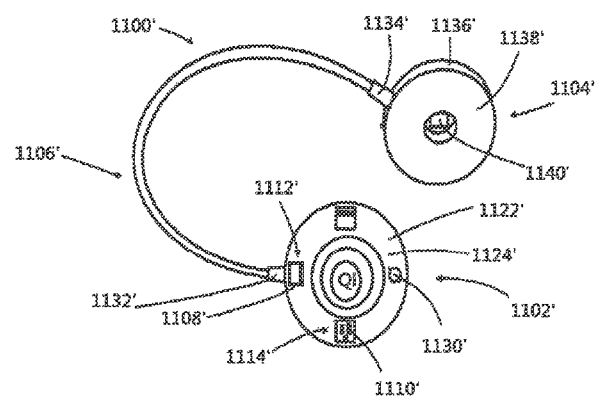
FIG. 11　　　　　　　　　FIG. 11A
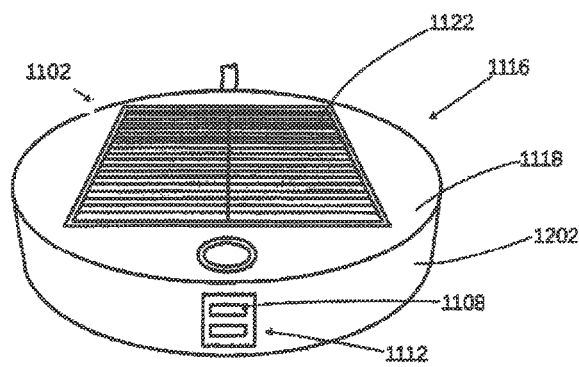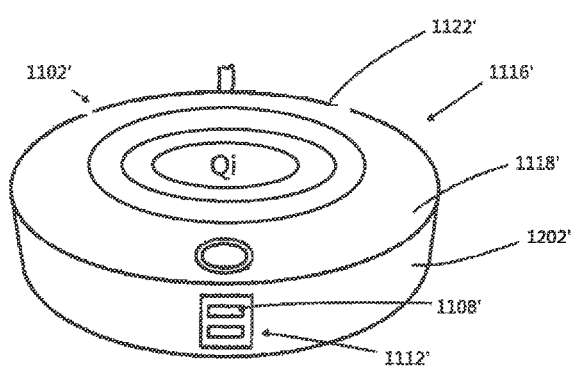
FIG. 12　　　　　　　　　FIG. 12A

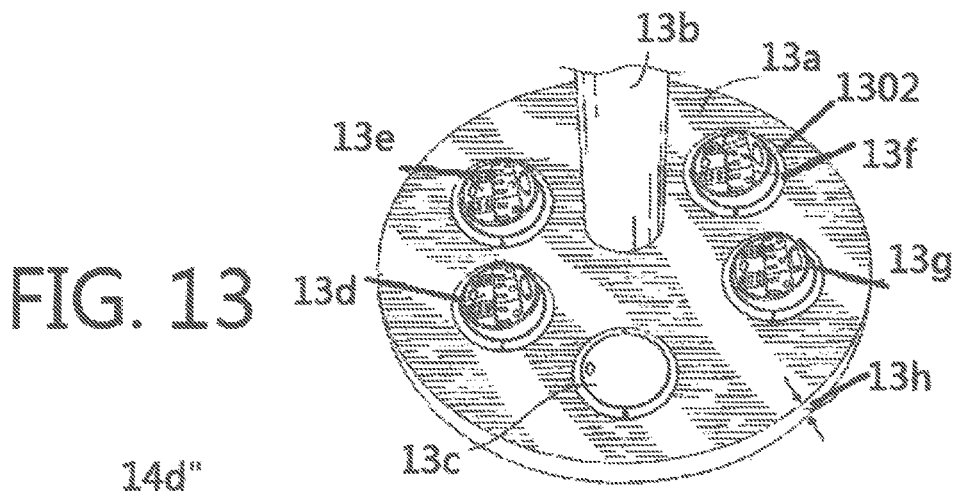
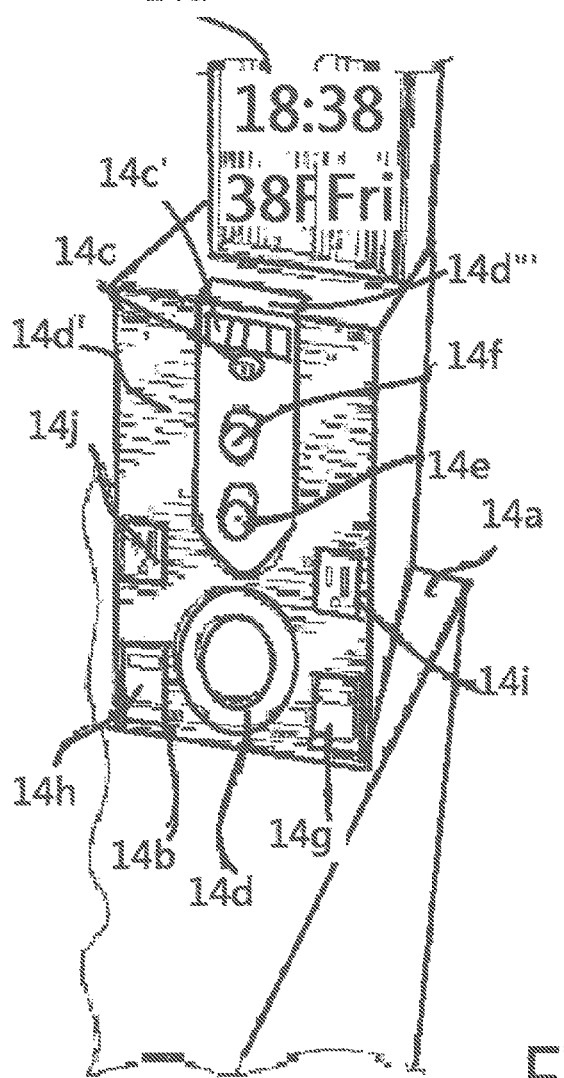
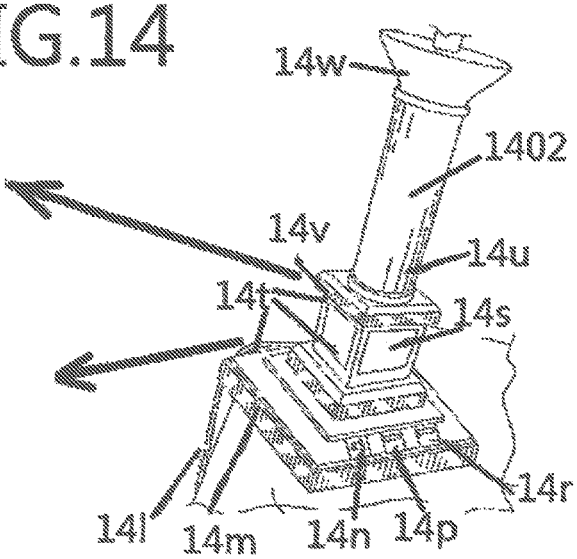
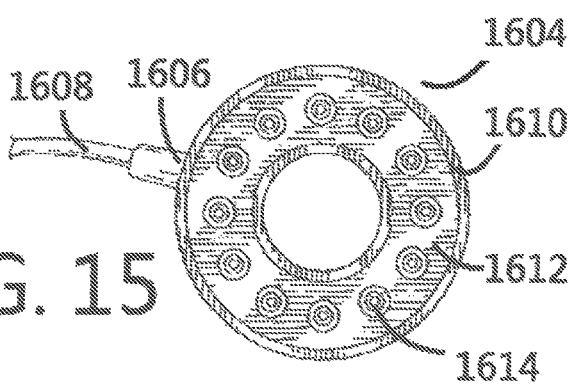

FIG. 16
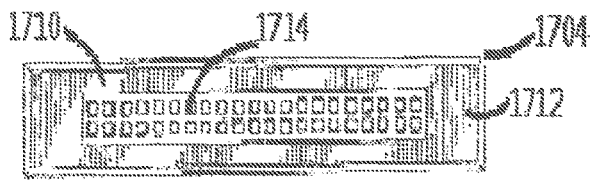
FIG. 16A
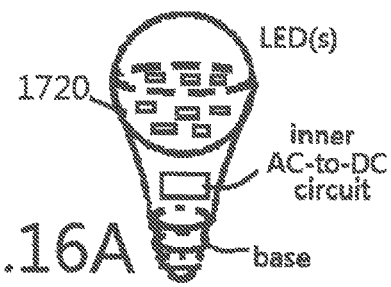
FIG. 17
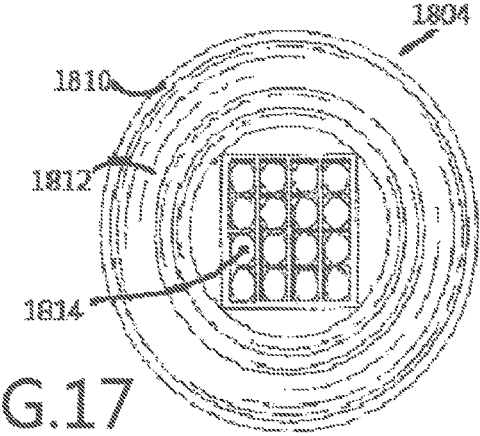
FIG. 18
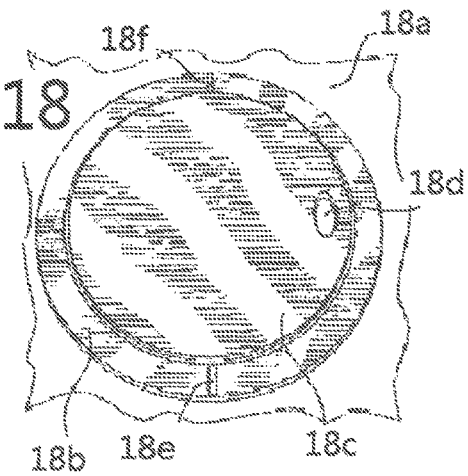
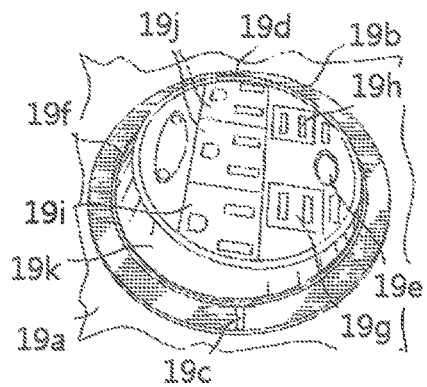
FIG. 19A
Parent filing (#CCC)
11-19-2010 filed
12-950,017
FIG. 19
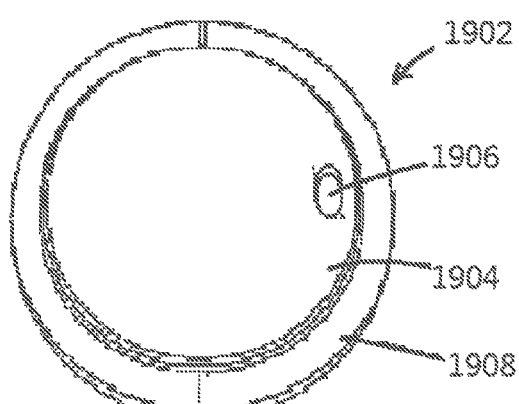
FIG. 20
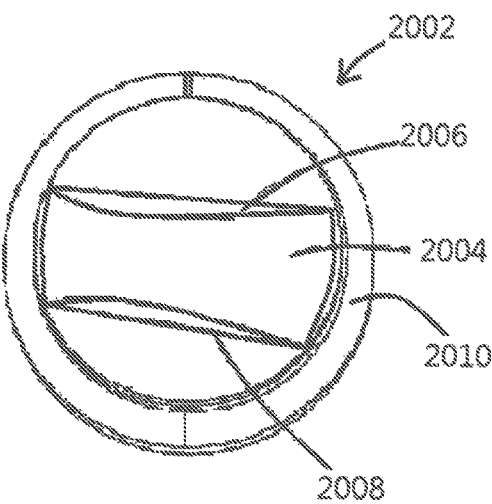

The 1st surface may has LED withe its own cove, shads, lens, stencil to make design light device for recess or top of the surface

2A

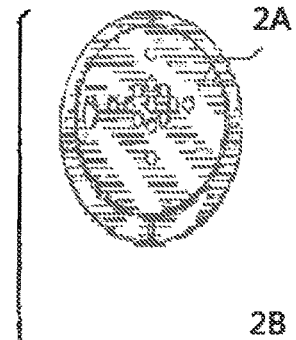

2A'

2B

USB-unit(s) for charging

Parent filing (#CCC) drawing 11-19-2010 filed 12-950,017

2B'

USB-unit(s) for charging

FIG. 21-3  1st surface chang to other surface rotate by force

3A

FIG. 21

3A'  opening for rotate, 1st surface, extend pole, extend pole, locker, frame, locker receiving unit(s), other surface

3B

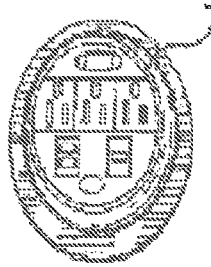

Parent filing (#CCC) drawing 11-19-2010 filed 12-950,017

3B'  other surface, locker, USB port(s), receiving unit(s), opening, receiving unit(s), extend pole, extend pole, USB-unit for charge, locker, USB-unit for charge

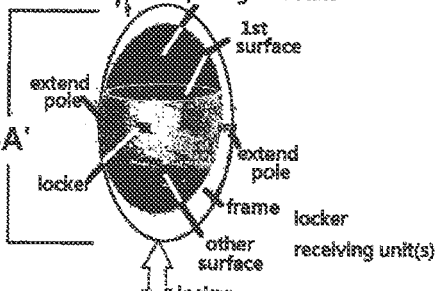

Rotating USB-unit(s) in an universal module with plurality of other functions such as outlet(s), it also can use individual USB-unit(s) or outlet-unit(s)

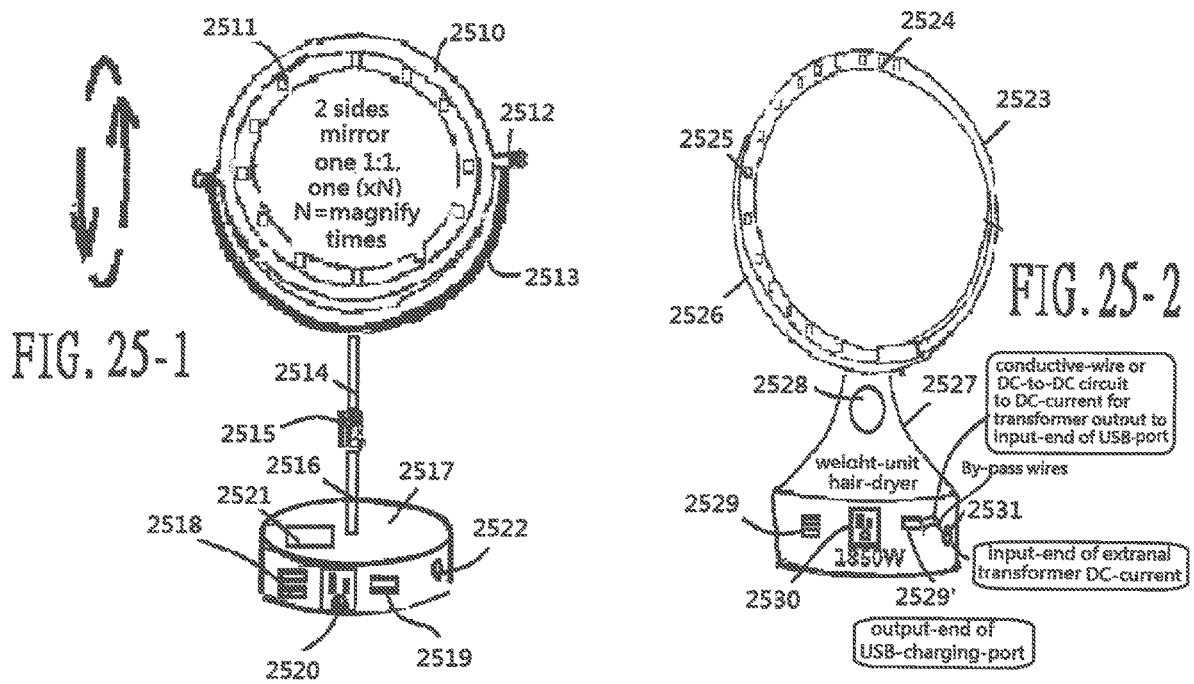
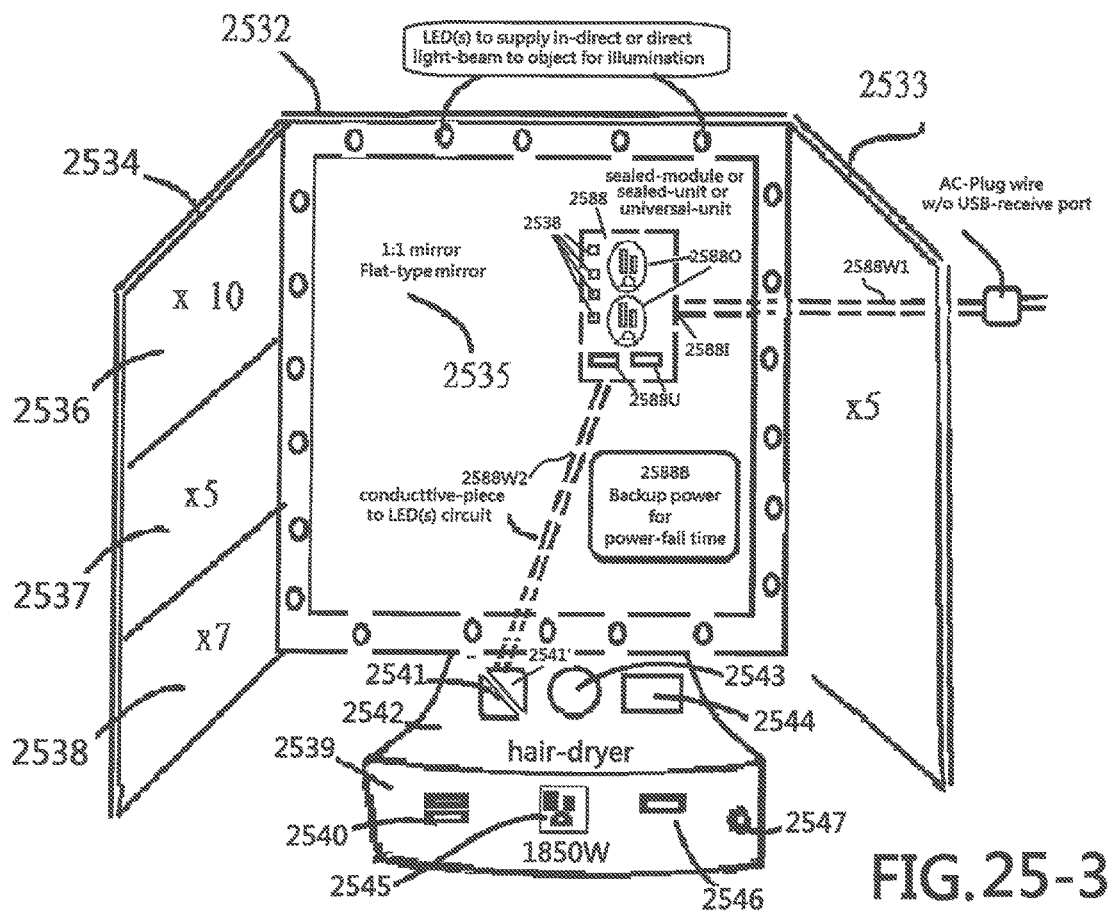

FIG. 30  Wiki-Pedia USB 3.0 test data
FIG. 31  Wiki-Pedia USB 3.0 test data
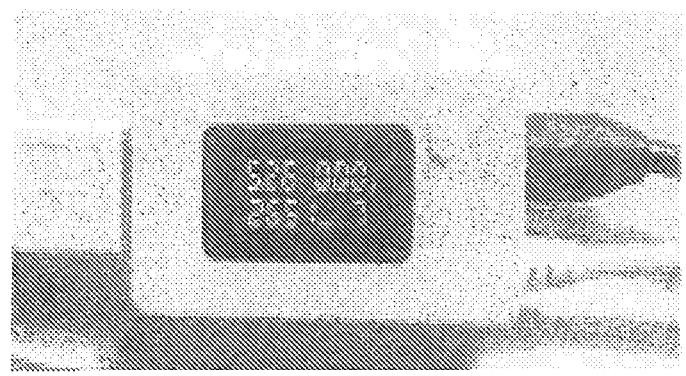

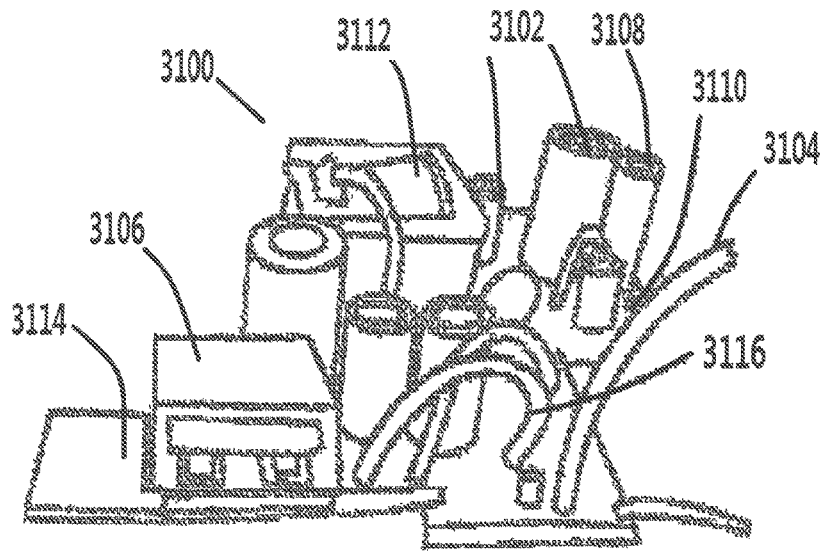
FIG. 32A1
(1) USB-Unit: NO housing, Not sealed and install within LED light housing.
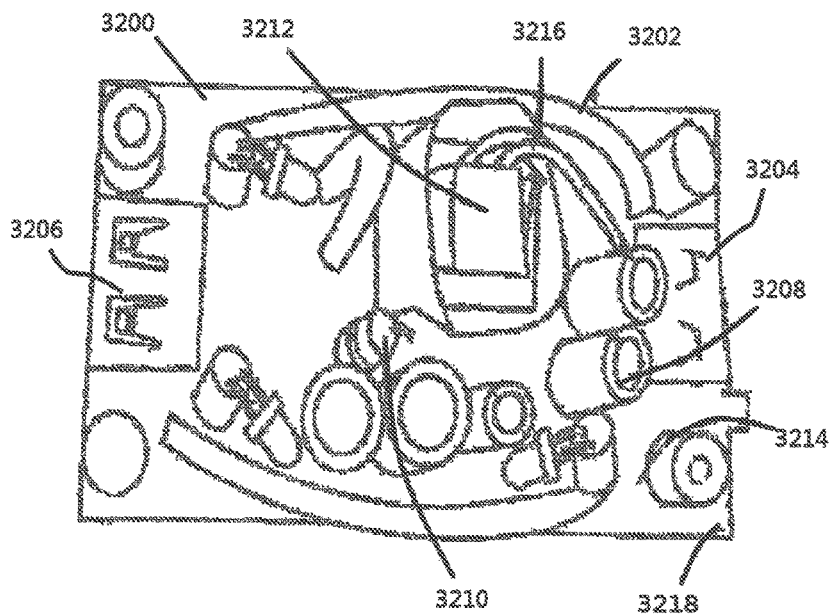
FIG. 32A2
(2) USB Module: More than One USB-port(s) fit within PCB to fit within the said LED desktop or floor light.
Outlet Module: More than one USB-Port(s) fit within PCB to fit within the said LED desktop or floor light.

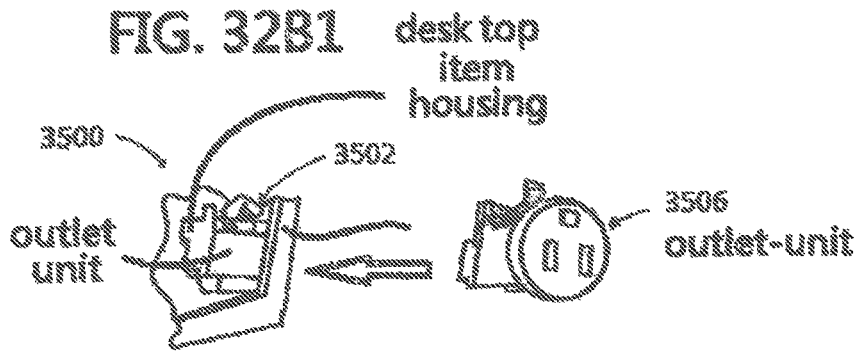
FIG. 32B1
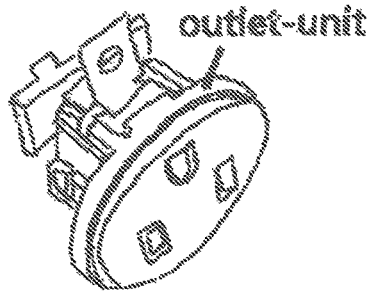
FIG. 32B2
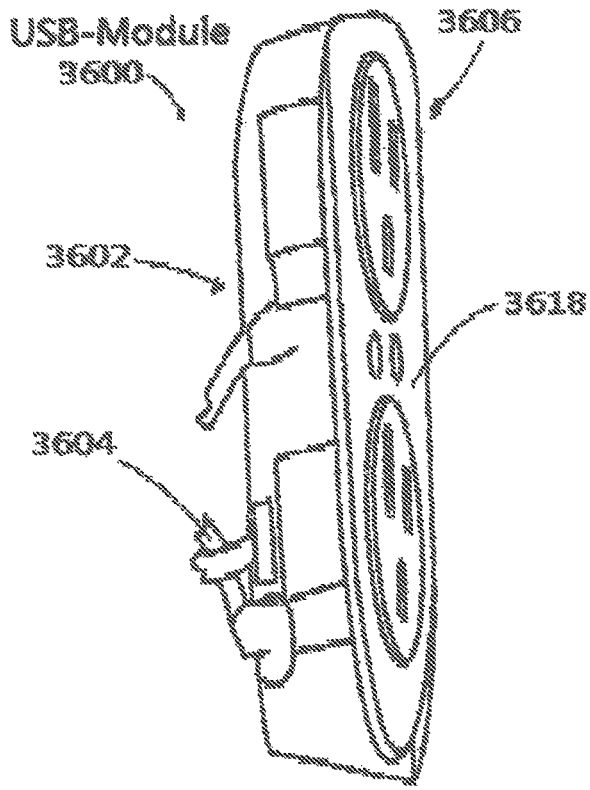
FIG. 32B4
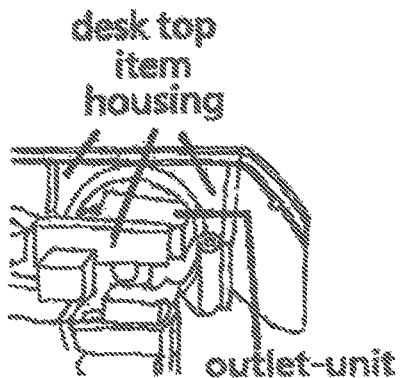
FIG. 32B3

FIG. 32C1
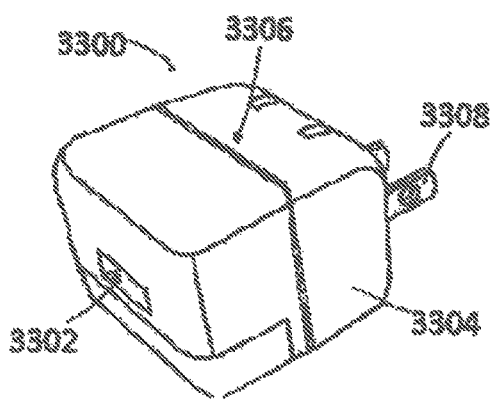
FIG. 32C2
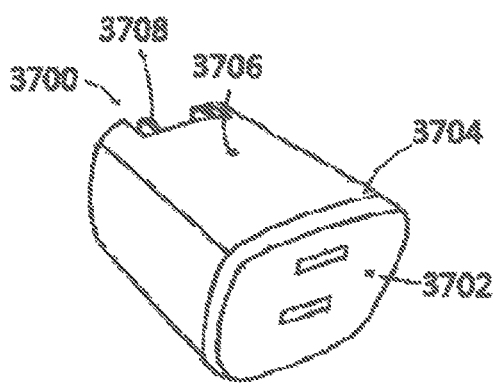
FIG. 32C3
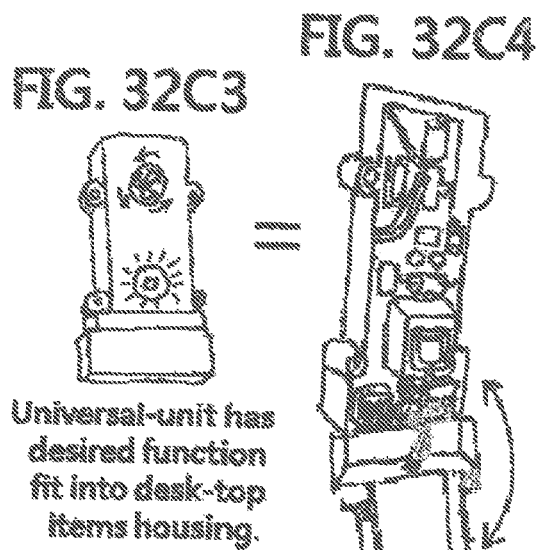
FIG. 32C4
Universal-unit has desired function fit into desk-top items housing.
FIG.32C5
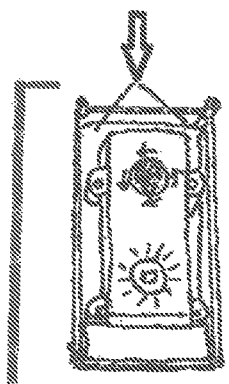
housing of desk top item or lamp housing
FIG.32C6
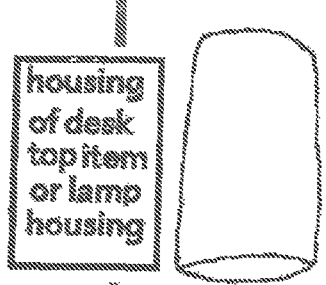
Optional optics-parts fit on desk top items
FIG.32C7
decorative parts fit on desk top item

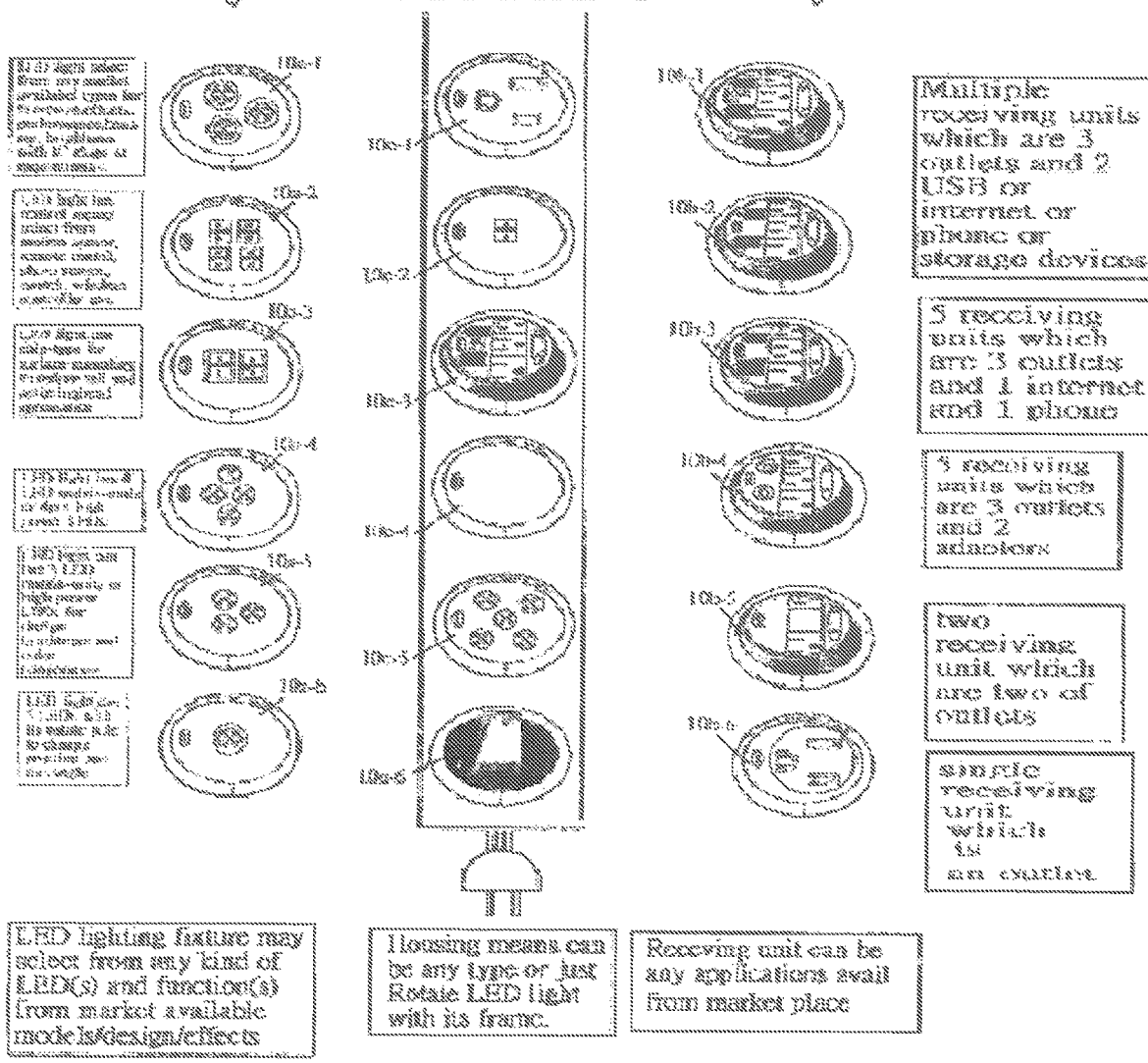

DESKTOP OR FLOOR LED LIGHTING DEVICE HAS USB-PORT(S)

PARENT FILING HISTORY

This filing case is Continue of following parent filing case:

This application is a continuation of (#GGG-11) U.S. Ser. No. 14/951,872 filed on Nov. 25, 2015, which is CIP of (#GGG-10) U.S. Ser. No. 14/875,675 filed on Oct. 5, 2015 which is CIP of (#GGG-9) U.S. Ser. No. 14/870,601 filed on Sep. 30, 2015 which is CIP of (#GGG-8) U.S. Ser. No. 14/834,613 filed on Nov. 10, 2015 which is CIP of (#GGG-7) U.S. Ser. No. 14/834,823 filed on Aug. 25, 2015 which is CIP of (#GGG-6) U.S. Ser. No. 14/834,557 filed on Aug. 25, 2015 which is CIP of (#GGG-5-1) U.S. Ser. No. 14/858,838 filed on Sep. 18, 2015 now is allowanced wait for issued, which is CIP of (#GGG-5) U.S. Ser. No. 14/833,935 filed on Aug. 24, 2015 which is CIP of (#GGG-4C) U.S. Ser. No. 14/827,810 filed on Aug. 17, 2015 which is CIP of (#GGG-4) U.S. Ser. No. 14/827,810 filed on Aug. 17, 2015 now is U.S. Pat. No. 8,931,947 issued on Jan. 13, 2015 which is CIP of (#GGG-3C) U.S. Ser. No. 14/643,026 filed on Mar. 10, 2015 which is CIP of (#GGG-3) U.S. Ser. No. 14/144,703 filed on Dec. 31, 2013 which is CIP of (#GGG-2C) U.S. Ser. No. 14/548,626 filed on Nov. 20, 2014 now U.S. Pat. No. 9,182,111 issued on Nov. 10, 2015 which is CIP of (#GGG-2) U.S. Ser. No. 14/105,717 filed on Dec. 13, 2013 now U.S. Pat. No. 8,911,137 issued on Dec. 16, 2014 which is CIP of (#GGG-1C) U.S. Ser. No. 14/548,861 filed on Nov. 20, 2014 which is CIP of (#GGG-1) U.S. Ser. No. 14/105,607 filed on Dec. 13, 2013 now U.S. Pat. No. 8,915,608 issued on Dec. 23, 2014 which is CIP of (#GGG-2011) U.S. Ser. No. 13/161,643 filed on Jun. 16, 2011 now is U.S. Pat. No. 8,783,936 issued on Jul. 22, 2014

The current invention are continuously filing of filing U.S. Ser. No. 12/950,017(#CCC) Multiple surface LED light filed on Nov. 29, 2010 with rotating device has LED light device(s) and USB device and Outlets device built-in on the rotating substrate with more than one surface to offer multiple function.

The (#CCC) U.S. Ser. No. 12/950,017 Filed Nov. 19, 2010 (Now is U.S. Pat. No. 8,998,462) is continuously filing for (#R) U.S. Ser. No. 11/806,285, and (Inventor's #R) filed on May 31, 2007 which also a multiple functions LED light device which are the continuously filing of the U.S. Pat. No. 7,318,652 (Inventor's #B) for multiple functions Wall Cover filed on Mar. 31, 2005. The current invention is continuously filing of U.S. Pat. No. 7,651,365 (Inventor's #F) filed on Jan. 15, 2005 which is CIP of Oct. 1, 2004. It is the CIP of U.S. Pat. No. 7,810,985 (Inventor's #A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

And this filing case is Continue of following parent filing case:

This application is a continuation of U.S. patent application Ser. No. 14/444,703, filed Dec. 31, 2013, which is a continuation of U.S. patent application Ser. No. 13/161,643, filed Jun. 16, 2011, now U.S. Pat. No. 8,783,936, each of which is incorporated by reference herein.

The current invention is continuously filing of co-pending filing (#CCC) U.S. Ser. No. 12/950,017 multiple surfaces LED light filed on Nov. 29, 2010 with rotating device has LED light device(s) and USB device and Outlets device built-in on the rotating substrate with more than one surface to offer multiple functions.

(#CCC) U.S. Ser. No. 12/950,017 Filed Nov. 19, 2010 (Now is U.S. Pat. No. 8,998,462) is continuously filing for (#R) U.S. Ser. No. 11/806,285, and (Inventor's #R) filed on May 31, 2007 which also a multiple functions LED light device which are the continuously filing of the (#B) U.S. Pat. No. 7,318,652 for multiple functions Wall Cover filed on Mar. 31, 2005.

The current invention is continuously filing of U.S. Pat. No. 7,651,365 (Inventor's #F) filed on Jan. 15, 2005 which is CIP of Oct. 1, 2004. It also the CIP of (#A) U.S. Pat. No. 7,810,985 file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (#FFF) U.S. Ser. No. 13/117,227 filed on May 27, 2011 for Universal Module has USB-Unit(s) or/and Outlet-unit(s) for variety of electric or digital-data device. This application is a continuation of U.S. patent application Ser. No. 14/444,703, filed Dec. 31, 2013, which is a continuation of U.S. patent application Ser. No. 13/161,643 filed on Jun. 16, 2011 now is U.S. Pat. No. 8,783,936 is incorporated by reference herein. This application is a continuation of (#GG-11) U.S. patent application Ser. No. 13/161,643, filed Jun. 16, 2011 now is U.S. Pat. No. 8,783,936 incorporated by reference herein.

This application is has subject matter in common with the inventor's (#FFF) U.S. patent application Ser. No. 13/117,227 filed on May 30, 2011, and entitled "Universal module of USB-unit or Outlet-units for electric or digital data device(s)."

The current invention are continuously filing of co-pending filing (#CCC) U.S. Ser. No. 12/950,017 Multiple surfaces has USB and LED light filed on Nov. 29, 2010 with rotating device has LED light device(s) and USB device and Outlets device built-in on the rotating substrate with more than one surface to offer multiple function.

This application also has subject matter in common with the inventor's (#I-1) U.S. patent application Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on, Nov. 6, 2012 issued (later than parent filing date)

BACKGROUND OF THE INVENTION

This application is has subject matter in common with the inventor's (#FFF) U.S. patent application Ser. No. 13/117,227, filed on May 30, 2011, and entitled "Universal module of USB-unit or Outlet-units for electric or digital data device(s)." The current invention is continuously filing of co-pending filing U.S. Ser. No. 12/950,017(#CCC) Multiple surface LED light filed on Nov. 29, 2010 with rotating device has LED light device(s) and USB device and Outlets device built-in on the rotating substrate with more than one surface to offer multiple function.

This application also has subject matter in common with the inventor's U.S. patent application Ser. Nos.

(#I-1) Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on Nov. 6, 2012 issued (later than parent filing date)

The said universal-module which disclose a sealed-unit with uniform dimensions and shape to fit into the same uniformly dimensioned compartment so that the universal sealed-unit can fit into a variety of LED light devices.

The sealed unit(s) disclosed in these applications share the following features:

a. The sealed-unit(s) has uniform dimensions to fit into the uniform compartment of any kind of LED light device.
b. The sealed-unit(s) has passed all related safety standards and received a laboratory's safety certification so that it can be used with other LED light device's parts and accessories which may or may not meet the safety standard passed by the said sealed-unit(s).
c. The sealed-unit(s) can be any individually salable unit because it has passed all related safety requirements and standards. The other parts or accessories may or may not be just decorative or have other functions to make the LED light device more valuable.

The current invention some preferred embodiments utilizes the sealed-unit concept in the following manner:

From FIGS. 32A 32B, 32C, 32D shown the sealed-unit related drawing shown (A) The current invention utilizes the concept disclosed in the above-cited applications of providing a sealed-unit that has passed all the relevant safety standards, the current invention applies the concept to all electric device(s) which are not limited to an LED desk-top light device. The concept may be also applied to an LED light device, power strip device, wall outlet device, surge protection device, wall adaptor device, charging device(s), smart phone related device(s), computer related device(s), and other consumer electric device(s).

From FIG. 32A 32B, 32C, 32D related drawing shown (B) The USB-unit outlet-unit have desired number and combination sealed-unit including USB-ports and/or outlet-port which the said USB-unit or Outlet-unit may just (B-a) a charging circuit board assembly for USB-port(s) to charge and/or supply the energy storage-unit which built-inside of the said others device only, and/or (B-b) maybe is a conductive-piece assembly for Outlet-unit to deliver or supply the input AC current to the other device, and/or (B-c) USB-unit maybe just a USB-receiving-port(s) or other female-port(s) to get power from the outside transformer, adaptor, invertor which already change outlet's AC current to DC current so can (i) just pass though or pass conductive-piece to USB-output charging-port(s) to charge outside other product(s), or (ii) pass through the said built-in DC-to-DC circuit to change from $1^{st}$ DC current voltage to change to the 5V DC USB-charging-port(s) required current, or (iii) go through the built-in DC-to-DC circuitry to get desired $2^{nd}$ or more different or same voltage to supply to other add additional functions(s), or (iv) directly get 5 Volt DC current from transformer to offer right current to the said USB-Unit to charge and/or supply the current to the said energy storage unit inside the said other electric or digital device or supply the current to the said USB charging-port(s) or said add additional-function(s).

From FIG. 32A 32B, 32C, 32D related drawing shown (C) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input-end such as prongs directly and optional to has surge protection or wireless controller.

From FIG. 32A 32B, 32C, 32D related drawing shown (D) The USB-unit or outlet-unit may each include its own related circuit, conductive piece, contact-piece, custom-pins, receiving-ends, output-ends, input-ends, electric parts and accessories to get the electric power from (D-a) AC power by a prong-cable from outlets; or (D-b) DC power from USB-cable to get power from outside power bank/energy storage unit or assembly which has multiple Amperage current storage capacity not from the computer export-ends which only limited 500 ma too slow for charging; or (D-c) DC power from outside housing transformer, adaptor, invertor unit which already has circuit built-in and already change the AC current to DC current, and though a receiving-wire or delivery-wire or USB-wire has at least 2 male USB-plugs to insert into above USB-Unit or USB-Module female receiving-port (USB Charging-ports) to deliver the DC power though the DC to DC circuit inside the device's housing to get right current and get into a variety of electric device's female receiving-port which has desire contact or connector or Custom-Pin ports for the other device USB receiving port which depend on the other device's design so it is variable.

The USB Charging-ports prefer to use Type A or Type C those are most common for the desktop items so can fit for all kind of the USB-wires at least one-plug of the said 2 plugs on each USB-Wire or jump wire or bridge wire at this time. It is appreciated that prefer to use Type-C because more compact and majority of the other electric device will has this Type-C USB-unit from new device so can make the other device has smaller new Type C USB-unit to make the overall size become more compact and thin. Anyway, the one end of the USB-wire can be any type such as Type C or any kind of Custom-Pin including micro-USB, mini-USB, Type C, or Type D contactors which depend on market design and requirement.

The said USB port type may in Type A, Type B, Type C each of these has female receiving-end and male plug so can build the electric power delivery. It also has digital data delivery but at this invention do not use and do not need to use the electric data or digital data delivery functions and the current invention only for Charging purpose only so can prevent slow charging or overheat issue happened. The current invention for quickly charging-ports is not allow data delivery too.

The desktop items USB port (USB Charging-pots) not allow to use special of custom-pin to fit the other electric device's USB receiving-pots because this will become only can charge one of other electric or digital device. The current invention's USB charging-port preferred to use Type A which is most popular same as all laptop computer USB receiving ports but has quickly USB charging-port function to charge minimum 1 to 5 Amp at output-end 5 Volt (+/−10%) voltage. The Type A USB charging-port can easily built-in on the Desktop items because the desktop items no need to have super compact size like the be charged items such as mobile phone, i-pad which need as slim and thin as possible so these communication or consumer electric products need use special custom-pin such as mini USB, Micro USB, or even type C for the USB receiving port so can allow the mail-plug of mini USB or micro USB can insert into so can make the communication or hand-held ipad as slim and thin as possible. For Desk top still use the Type A will be more popular and can fit almost every USB-wire, jump-wire, bridge wire so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp to higher Amperage and has details discuss on hereafter.

(E) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other devices and no need to change its electric circuit, PCB, trace with current invention use quickly charging USB Charging-ports has 2007 & 2010 definition and has minimum 1.0 Amp up charging capacity.

(F) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus, the current invention uses the quickly charging USB Charging-ports which has 2007 & 2010 definition and has minimum 1.0 Amp up charging capacity.

(G) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(H) The module of the current invention may have different specifications, such as:
  1 module has 1 USB-unit+1 USB-port,
  1 module has 2 USB-ports+1 outlet-unit,
  1 module has 2 USB-ports+2 outlet-units,
  1 module=only has 1 USB-unit, or 1 Outlet
or, any combination of USB-units and outlet-units that still permits a standard module to fit into many of different electric device(s) as needed with current invention has quickly charging USB Charging-ports which has 2007 & 2010 definition and has minimum 1.0 Amp up charging capacity.

(I) The module can also have the following different specifications: 2 USB ports having different current outputs including; 1 Amp, 1.1 Amp, and/or 2.2 Amps to enable the 2 USB-ports to charge different electric devices such as an iPhone™, which needs to have 1 Amp, and an iPad™, which requires 2.1 Amps.

If people want to charge 1 iPhone™+1 iPad™ at the same time, at least 3.1 Amps will be needed, which will be very expensive. Or more high-speed charge for 4.2 Amp for 2 pcs of 2.1 Amp, or more higher speed charge for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date USB-ports from computer or other charger Before 2007 for limited 500 ma or less charging with overheat issues as the wiki reported on below text for cross reference!

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500 ma charging capacity for out of date USB construction and also has overheat or burn problem for bigger than 500 ma so from 2007 has update USB charging-port so market can has a lot of USB-charging device coming from 2010 for Big charging current such as the current invention. The below is copy from Wiki Pedia, The Free Encyclopedia has the details (Charging port and Charging speed and Charging port) to support the current invention for update charging capability.

USB

From Wikipedia, the free encyclopedia

USB 2.0

Battery Charging Specification 1.1: Released in March 2007 and updated on 15 Apr. 2009.

Adds support for dedicated chargers (power supplies with USB connectors), host chargers (USB hosts that can act as chargers) and the No Dead Battery provision, which allows devices to temporarily draw 100 mA current after they have been attached. If a USB device is connected to dedicated charger, maximum current drawn by the device may be as high as 1.8 A. (Note that this document is not distributed with USB 2.0 specification package, only USB 3.0 and USB On-The-Go.)

Battery Charging Specification 1.2:[25] Released in December 2010. Several changes and increasing limits including allowing 1.5 A on charging ports for unconfigured devices, allowing High Speed communication while having a current up to 1.5 A and allowing a maximum current of 5 A.

USB 3.0[edit]

Main article: USB 3.0

As with previous USB versions, USB 3.0 ports come in low-power and high-power variants, providing 150 mA and 900 mA respectively, while simultaneously transmitting data at SuperSpeed rates.[28] Additionally, there is a Battery Charging Specification (Version 1.2—December 2010), which increases the power handling capability to 1.5 A but does not allow concurrent data transmission.[25] The Battery Charging Specification requires that the physical ports themselves be capable of handling 5 A of current[citation needed] but limits the maximum current drawn to 1.5 A.

USB 3.0[edit] as shown on FIG. 30 and FIG. 31 for the charging status.

A small gadget that provides voltage and current readouts for devices charged over USB This USB power meter additionally provides a charge readout (in mAh) and data logging The USB Battery Charging Specification Revision 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5 V, up to the rated current at 3.6 V or more, and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D− and D+ lines. When D+=D−= 2.0 V, the device may pull up to 500 mA. When D+=2.0 V and D−=2.8 V, the device may pull up to 1 A of current.[93] When D+=2.8 V and D−=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The USB Battery Charging Specification Revision 1.2 (released in 2010) makes clear that there are safety limits to the rated current at 5 A coming from USB 2.0. On the other hand, several changes are make and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms (J) If the (10-1) a universal piece, or (10-2) a sealed-unit or (10-3) USB-Unit, or (10-4) USB-module in a circuit board, housing form, or (10-5) Outlet-unit, (10-6) Outlet-module is a conductive-piece assembly each has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wiki release on 2007 has minimum 1.0 Amp charging capability) to receive a wire's USB-male plug (hereafter as USB-plug) to deliver electric power from the USB-female receiving means (USB-Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired voltage, and current flow or amperage (A or ma) by circuit which may (AA-1) circuit install inside the desk top housing has at least one of transformer, adaptor, invertor, converter has circuit-inner to change AC current to DC current.

(AA-1) circuit install within outside housing's and has at least one of transformer or adaptor or invertor or converter has circuit-kits to change AC current to DC current to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accepts ONLY ONE input current not allow more than one input current such as normal time is AC power and change to DC power while power fail which will have a lot of controller or additional circuit need to do which may have more risk for fire case happened.

The USB-module(s) described in the co-pending application is an electric charging module which has at least one (aa) USB-female Charging receiving means (USB Charging-Port as wiki release on 2007) but also has a number of receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's the male plug (USB-Plug) of desire style of the connect, style, size, construction or custom-pin for connection for be charged device(s).

Hereof, Also attached the USB history charter for different years for the USB generation;

Version history[edit]

Version history overview[edit]

| Release name | Release date | Speed and max signalling rate | Note |
| --- | --- | --- | --- |
| USB 0.8 | December 1994 | | |
| USB 0.9 | April 1995 | | |
| USB 0.99 | August 1995 | | |
| USB 1.0 Release Candidate | November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |
| USB 3.0 | November 2008 | Super Speed (5 Gbit/s) | Also called USB 3.1 Gen 1[19] |
| USB 3.1 | July 2013 | SuperSpeed+ (10 Gbit/s)[20] | Also called USB 3.1 Gen 2[21] |

So, the current invention offers a quick USB charging-port to offer the min. 1.0 Amp and the current invention only for Charring function from the charging circuit connected with power source from (4-a) AC power by a prong-cable from the AC outlets from wall or extension cord, power strips and has circuit-inner inside of Desktop item's housing has at least one of transformer, adaptor, invertor and use circuit-inside to change AC current to DC current at desired voltage and has other IC or circuit-insides or DC-to-DC circuit to change the different voltage DC current to USB-Charging port output-end DC 5 (+/−10%) volt or supply the desired voltage DC current to DC light source or DC other function's circuit to use.

or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor has circuit-kits to change the AC current to DC current for variety or different voltage of DC current and though IC or circuit-inside or DC-to-DC circuit to change or adjust from different Voltage DC current and has the USB charging-port output end has DC 5 (+/−10%) Volt;

And though a receiving-wire or delivery-wire has at least 2 male USB-plugs to insert into above USB-Unit or Outlet-unit female receiving USB charging-port for supplying power that power been though the desktop device's inside housing IC or other circuit-inside or DC-to-DC circuit to get desired current type to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items has built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™ or iPad™ USB-unit, which is very small in size, needs to use a very high cost compact transformer or inverter with super big power output in order to achieve a very short time to fully charge the other electric or digital data device(s).

This problem can be resolved if, in order to get the USB-2.0 or new standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money.

Suitable desk top items to which a universal module, USB-unit, or outlet-unit can be added include a desk lamp, desktop lighted mirror, desk top clock, desk top radio, desk top fan, desk top lighting, reading light, wall reading light, head lighting, book light, electric picture display, night light with AC to DC power source or adaptor with prong and wire, projection light with AC to DC power source or adaptors with prong and wire, electric candle set with AC to DC power source or adaptors with prong and wire, or any LED device that can serve as a desk top item as described herein and that can accommodate a USB-unit or USB-ports designed only for charging purposes rather than delivery of digital data.

The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will STAY there for a period of time sufficient to also enable charging of other electric or digital data device(s).

Also, the current invention not only for charger but also has illumination as below on FIG. 3A and FIG. 3B show all different arrangement for AC-power source go through external or built-in AC-to-DC circuit and internal DC-to-DC circuit or electric-components and accessories such as simple conductive-wire or conductive-piece to deliver the DC current which still fall within the said DC-to-DC circuit range and definition for example the external transformer have AC-to-DC circuit to get the first DC current and use the internal conductive-wire to connect with USB charging-port(s) output-end so can offer the desired DC current to USB Charging-port(s) to charge the said other be-charged products by USB-wire or USB-sets.

Wherein the definition for Desktop or floor light items which have desired parts and accessories to make desktop item can stay on desktop surface including:

1. From FIGS. 1, 2, 3, 4, 5, 6, The said one of Desktop items is LED desk top lighting have large size of the LED light or From FIGS. 1, 2, 3, 4, 5, 6 LED desktop light device have its big base with or without weight-unit(s) inside so prevent from the heavy wires or people hit the light to fall down from desktop surface, and/or
2. From FIG. 1, 2, 3, 4, 5, 6, The said desktop item including the LED light device with LED illumination and/or added other functions which enables the LED device to serve as a non-portable desk top" as FIGS. 1, 2, 3, 4, 5, 6 have big size base, and FIGS. 7, 8, 9, 10, 11, 12 have thicker or more bigger size with or without heavy-unit(s) inside depend on design so can prevent from fall down from desktop by heavy and long AC-Plug wire or external transformer or impact force.
3. From FIGS. 1, 2, 3, 4, 5, 6, 7, 8, 9, 10, 11, 12, 13, 14, The said desktop items have USB-charging port or USB-unit has USB-port(s) to supply DC current to other products with or without input-port to charge internal rechargeable batteries while the said desk top items have built in back-up batteries for power fail time use for supplying DC current or the said non-charge batteries for the time related display without stopping while power failure time.
4. From FIGS. 1, 2, 3, 4, 5, 6, 7, 8, 9, 10, 11, 12, 13, 14, one of Desktop items including at least one of USB Charging-port(s); or the said USB-unit, or USB-module has USB-port and/or outlet-port. Or USB-charging pot(s) inside the sealed-unit or universal-unit which install on desktop items
5. From FIGS. 23, 24, 25, 25-1, 25-2, 26, 26-1, 27,28, The said desktop item shows some of the desktop items which people use on desktop and all these functions can add into the said Desk top LED lighting housing or compartment or organizers so can offer more than one functions.
6. From FIG. 24 show one of market or existing desktop items or market available function(s) add into said LED light device which is other one of the desktop items or added function into said LED light device which is the project lighting to project the desired LED light-beam, lighted-pattern, lighted-image, and/or
7. From FIG. 27 show one of market available or existing desktop items or function can add into said LED light device which is alarm clock, LED digital clock to offer time, date, week, month, year, weather related information including temperatures basing on current invention and all above listed co-pending and earlier filed case drawing. Or the added function is offering the multiple colors LED light beam or changeable color LED lighting. and/or combination with color selection and function selection and desired market available LED light effects, performance, and/or 8. From FIG. 28 show one of market available or existing desktop items or function can add into said LED light device which is offer food FIG. 28 or offer show one of desktop items or From FIG. 25 show one of desktop items or added function into said LED light device which is added function into said LED light device which offer the coffee or water or soup or liquid device. And/or
9. From FIG. 29 show one of market available or existing desktop items or added function into said LED light device which is a multiple function of air-flow for wind, air flow, cold air, hot air, humility, air fragrance, air freshener, smell or air, liquid sprayer(s) device. For up-grade or alternative model the desktop items which also offer LED lighted patterns lighted image for desired color and brightness for light-beam, lighted patterns, lighted image or any other LED light effects.
10. The FIG. 25-1 and FIG. 25-2 show the different cosmetic mirrors has the desired magnify properties for 1:1 or ×2, ×3, ×N (N is any number) with flat or round or geometric shape. The said cosmetic mirror with built-in LED(s) or LED-unit(s) or LED-bulb or LEDs-inside the outer-cover. Also, the LES(s) light source also can be recessed or install within the mirror light-passable area(s), window(s), or along the edge outside or inside the contour, or alternative arrangement for LED(s) light source. The LED(s) or LED-unit(s) or LED-bulb or LED-inside the outer-cover those have one or more color selection or mixing and have adjusting or selection or changing the said LED light brightness and LED colors. The said USB-port can install on base or neck of the said cosmetic mirrors and LED light beam is not vertical or horizon to the mirror-surface for upward or side-ward to get directly or in-directly illumination to make the objet been illuminated and reflect to form the lighted image shown on the mirror reflective properties mirror surface with desired magnify size.
11. The mirror can be one side or two sides or multiple side(s) construction or have the detachable child-mirror(s) which have desired magnify-properties for (×n times) and the child-mirror(s) can attach on mother-mirror by magnetic-kits. The said lighted mirror(s) also can be one of multiple-installation mirror can install on desk-top surface or walls or glass by suction-cup while need to install on multiple place. The mirror can install on desktop or glass-wall or smooth-wall by suction-cup which have strong adhesive strength. The said cosmetic mirror also can be power by external transformer and/or built-in replaceable non-rechargeable batteries or rechargeable battery for multiple applications for indoor or outdoor or camping or show-place use however the current invention for multiple application for all kind designs have to have one application to install on the desk top surface.
12. From FIG. 26-1 show the 3 different added-function for said LED desktop items which show on top is the said audio system may including blue-tooth connection for favor song, or pre-record into IC chip with the speakers or with the audio-sensor to make the said LED(s) light-source for have strong and dim light-beam following music temple or sound-activated IC chip to make the said desktop LEDs for color and/or brightness changing, setting or other market available functions.
13. From FIG. 26-1 the center drawing which is LCD or LED displayer for time/alarm or time piece/weather related function to show time, date, week, month, year, temperatures, status shown on the displayer and it have the separated DC battery to supply time operation continuously without affected by the power fail to cause the AC outlet lose power.

The said time/alarm time piece/weather related display can install on desktop items arm, base, pole, base, wall, compartment, organizer's surface for easily reading while people have the said desktop items have added additional-function(s).
14. From FIG. 26-1 lower portion show the said blade-less fan device or other air-flow functions or device which offer the desired pre-program temperature air-flow or just simple no temperature controlled air-flow with or without the said desired fan-speed controller. It also can have other wired or wireless control for other upgrade function(s) or alternative with blade or with temperature controller or other market available functions related to the air, moisture, humility, air-freshener, air fragrance, smell spray function(s) or devices built-in the said LED desktop items. It is appreciated all alternative or replace skill or equal functions for air-flow, humility, moisture, smell functions or devices still fall within the current invention scope.
15. The said semi-permanent device except people replace or move out to use anymore such as
  (a) From FIG. 1, 2, 3, 4, 5, 6, 7, 8, 9, 10, 11, 23,24,25, 26,27,28 is some of desktop items which is desktop non-movable LED light as FIG. 1, 2, 3, 4, 5, 6, 7, 8, 9, 10, 11 because too big size and too heavy, or These desktop item or added function into LED desktop lighting device is too heavy and no any consumer will carry it for a portable device, so this is means semi permanently installed on a desktop except people do not use anymore. This called semi-permanently.

The common sense from people or market traditional concept and acknowledgement the said desktop items which has big size or big-base or base with weight-unit (Rubber or cement or metal piece or stone, recycle material) so can solid to arrange on desktop and these big-size base or add heavy-unit(s) to prevent the LED from falling off the desktop until removed by a user despite a cord of the LED light hanging over an edge of the desktop are common sense against the portable-items which like US prior art Quirky can put into backpack and carry all the time and use for anywhere.
  (b) From FIG. 23, 24,25,26,27,28,29 with at least LED light to supply illumination and USB-port(s) and/or added other additional-functions selected from the
    (b-1) FIG. 23 is LED lava light which sold anywhere in USA and it have the glitter or reflector or wax inside with chemical compound or salt water or motor to make the inner miniatures, reflector, liquid to move with color changing, brightness changing or setting or selection as all market available items for LED light beam for multiple color or single color or low brightness or high brightness with sensor, switch, motion sensor, power fail, RF or wireless controller as market existing items functions as co-inventor's filed cases, and/or
    (b-2) FIG. 24 for project light to project lighted image, lighted patterns or light beam. The said project is including the said project inner image-forming-unit or project outside object shape so can project the said lighted-image, lighted-pattern, light beam.
    (b-3) FIG. 24 LED is project light-beam or lighted-pattern or lighted-image which desired round top-piece which has built-in project lighted image or patterns or light-beam from the ball or half ball surface while have reflector on half-ball surface to project the lighted-image. It also has the project optic-lens on full ball to project inner image-forming-unit for far-away distance surface.

(b-4) FIG. 25 is liquid machine with LED light(s) same as all market items with LED for operation status which is same as current invention said is one of desktop items with LED light.

(b-5) FIG. 26 for air-freshener, air-purifier, air-sprayer, moisture sprayer device as all market items which install on desktop to offer fresh air or smell air to people with LED light to offer colorful or desired accent light for this kind of device as market available items.

(b-6) FIG. 27 LED alarm clock which is LED 8 segments to form the time or LCD display unit which has LED light-source light-beam to passing through the light passable LCD to show the time or weather related data, or FIG. 27 is LED weather station or time piece which has the LED light-source to offer the light-beam or back light to glow the front LCD display for many time and weather data or (b-7) FIG. 28 candie machine has LED light as market and playground exiting items to let people can try their luck while people put into coin.

(b-8) FIG. 29 LED air-flow device which create the desired temperature air-flow including air-flow or cold-air or hot-air or air with moisture, air-with frequent device with built-in LEDs to emit the desired LED light-beam for colorful and brightness which can have all LED light-effects, light-functions for change or setting or select the color and brightness, From FIG. 29, shown one of market available air-flow device to offer air-flow, or other airflow including heat, moisture, air-freshener, and/or (c) From FIG. 1, 2, 3, 4, 5, 6 show the said Desktop LED light device which has angle adjustable bar, pole, tube which can be adjustable as common sense or market all models as FIG. 1, 2, 3, 4, 5, 6 shown the tube, bar, pole has not seen the inner snake-hose or angle-adjustable-knit inner construction, but all marketing items which none-of the desk lighting without the angle adjustable arm, tube, bar so this means all the ugly snake-hose or adjust-angle-kit is inside the said coating, sleeve, envelope, soft-sealing. So, each bar or tube or pipe or pole for angle adjust purpose is "The adjustable arm has inner bendable parts sealed within an outer plastic material or tube, a coating or a metal material that is comfortable to touch"

(d) From FIG. 23, 24, 25, 26, 27, 28, 29 each of the Existing market products as (d-1) FIG. 23 is market available LED laser light offer area-illumination and have built-in USB-Charging port(s) and Outlet-ports and the moving liquid by motor or liquid-compound by heat-means to show the desktop items have built-in (i) offer the area-illumination, and (ii) USB-charging ports and (iii) added outlet-port to supply AC current to other products, and (iv) desired color and brightness with desired setting or adjustable or selection of color and brightness This is FACT to prove the said Desktop items had "At least one added function".

(d-2) Same as other FIG. 27 here is the LED digital alarm clock has the (i) LED for area illumination and (ii) project light from top-cover have design or arts to emit desired color light-beam or lighted-pattern or lighted-image or combination, and (iii) offer the time, date, week, monthly, year and weather including temperature, and (iv) built in speaker on two sides, and (v) has the setting, selection, adjustable total 8 switch on surrounding the LCD or 8 LEDs segments LED light-source, and (v) the said built-in USB and outlet to match the claim "At least one added function".

(d-3) Same as FIG. 29 show the Air-flow device has the (i) LED offer area illumination including light-beam or lighted-patterns or lighted-image or any combination as drawing show and also have (ii) air-flow which can be air, cool air, hot-air, air with humility, air with smell including freshener, or air-fragrance, and have (iii) USB-port and (iv) Outlet ports which have 4 functions inside the LED desktop items have LED for offer the illumination and have the other added functions to meet the claim "At least one added function".

Same as FIG. 24 for LED project light device which have (i) LED to offer area illumination and (ii) project light-beam or lighted-image or lighted-pattern from internal image-forming-unit or outside object shape through the built-in optics-piece including refractive and/or reflective lens so can show the projected light-beam and/or lighted-image and/or light-beam to be seen at the LED project device or areas away from the project device to match the claim said "At least one added function".

Furthermore, the $2^{nd}$ group of other (17) US and China Prior and more discussed for all related US prior arts for $2^{nd}$ time discussion as below;

To make clearer for the current invention has big improvement than all US prior arts which mainly not same categories with current invention as bellow list is 2nd times for more detail's comparison for (15) US and China prior arts as below:

1. Daniel Quirky Ember "Portable study lamp with USB port and power outlets, Jan. 28, 2011.

US Quirky device is a portable study lamp with USB port and power outlet

And as the Sep. 15, 2015 Third party page 45 show very clear "Quirky confession the device is "PORTABLE STUDY LAMP and POWER STRAP→WANT A LAMP INTEGRATED BOTH OF FUNCTION", and the page 45 show apply the power-strap on wall-outlet and light is hanging on the wall . . . (This is totally different the definition of current invention for DESKTOP ITEM, No need dictionary to explain the meaning for "Desktop items" vs." Portable POWER-STRAP & PORTABLE Study Light".

This is strong-evidence for (Quirky "Quirky confession the device is "PORTABLE STUDY LAMP and POWER STRAP→WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;
   a. Non-portable device, and never can put into backpack to carry anywhere often (supported by FIG. 1, 2, 3, 4, 5,6, 7,8, 9,10,11).
   b. Permanently install on desktop which will not move evenly because always put on desktop surface and it is big and heavy and impossible to fit into backpack. (supported by FIG. 1, 2, 3, 4, 5,6, 7,8, 9,10,11).

c. Has Big size or big base or too heavy stop fall out from desk top surface (supported by FIG. 1, 2, 3, 4, 5,6, 7,8, 9,10,11).
d. Has the bendable arms which is sealed by plastic or chemical coated to form soft touch surface (Supported by FIG. 11 and FIG. 13 and FIG. 14)
e. Current invention has adjustable arm or bar or rod which has base which is 90 degree install on the LED desktop base (Supported by FIG. 8,9,11,12)
f. The USB port install base wherein the base and base of flexible arms is on vertical or around 90-degree relation and not can changeable angle (Supported by FIG. 8, 9, 11, 12)
g. All USB-port is face outside install on the base contour side wall to prevent water or ash get into the USB-Charging port(s) to make the electric shortage or overheat because accumulated dust or ash to reduce the electric contact-surface. (Support by FIG. 7, 8, 11, 12 and FIG. 1, 2, 3, 4, 5, 6)
h. Quirkily not use Transformer for outside AC-to-DC power source which is AC-wired because Quirky is one of extension cord and add snake-house arms LED for light. (Supported by FIG. 3→3C) (FIG. 5=>5C) (FIG. 9→9c)
i. Quirkily has no any the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-fragrances or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).
j. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5 Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+ FIG. 23, 24, 25, 26, 27, 28, 29 for added-functions into LED light-device and meet the current invention Claim add limitation)
k. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/ tube (Y-axis) or height need close from people waist to shoulder. The (X-axis) or aid width need to from base-location to people eyes position (Normally people will put big and heavy bas away from right or left arms, so the width needs min. have 1 foot or more. ==> this is not happening on Quirky (Refer to Third-party submission date on Sep. 18, 2015)
Page 45 and 46→Show it is not for Desktop items, Page 25 shown the light use on the wall outlet and on the bed. Page 46 shown on the Floor. →This because quirky is use Power strip as base and add one snake house and put a single LED on top)

Furthermore, Quirky copy co-inventor earlier filed cases (#BB-2008) U.S. Ser. No. 12/232,035 Filed on Sep. 10, 2008 Public Jan. 9, 2009, now is U.S. Pat. No. 7,824, 185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.
→These limitations should be covering the Quirky whatever he said the PORTABLE Lighting!!

2. China patent 2007-2015 3487 Miss Lin Wa0Yeh filed on Jun. 11, 2007 issued Jun. 25, 2008

From the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June.

The current invention listed the major difference at:
a. The LED is Plurality LEDs arrangement for geometric positions to get desired area illumination.
(Reason: On 2007 it is impossible for white color super bright LEDs+Cost issues) Even do not have COB for built-in plurality of the LED dice into one piece including square, rectangular, even 2017 came out for circle type.
b. The current invention details listed the current get from:
b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use Outside transformer) →So this claim should be granted allowance!
b-2: Inside AC-to-DC transformer to get $1^{st}$ DC. The same incorporated with inner one or more than one DC-to-DC circuit to get $2^{nd}/3^{rd}/4^{th}$ DC circuit to let different LEDs or added functions to use which may use same or many different voltages. Such as LED array may need 6 Volt operation voltage which is not all same within 3/5 Volt.
Especially the COB or the High brightness output LED. (This is not happening on the 2007 for the more LEDs==Because update technical for different LED especially for super brightness or super power saving energy, assembly cost need use different working voltage with USB export 5 Volt current).

b-3: Inside AC-to-DC transformer to supply same current to LED or-and another added device. (This is other features no shown on quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

3. U.S. Pat. No. 7,736,033 Patel

Patel teach one lamp has the cigarette lighter round output receptacle and to receiving the (210) screw in by thread round transformer which transfer from 12 Volt to USB output voltage 5 Volt which is not same as the current invention has the UBS-receiving port which directly offer the 5 Volt current to another electric device.

This prior art been argued so many times. Not know why examiner cannot find one of prior art is similar with current application to let us know has real prior art existing. Not use this old prior art.

4. U.S. Pat. No. 8,687,392 (1) and U.S. Pat. No. 8,687,392 (2) Sims et al

This is other application which said the device itself need has the (50 of FIG. 1) capacitor or other energy storage element while the power converter is operating in the standby mode beside the AC-DC power convertor circuit (122 of FIG. 1) and plus other monitor system (54 of FIG. 1) This is not same as current invention for non-itself energy storage device or capacitor to make this expensive circuit for the current invention. So, this is nothing to do with current invention because from AC power source is unlimited power no need to waste money for power saving.

5. U.S. Pat. No. 8,853,884 Genannt berghegger et al

Teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 6. U.S. Pat. No. 8,783,936 Chien This is the co-inventor parent filing case which has all same drawing with current invention. So, it is not the any prior art vs. tis continuously filing case.

The current invention earlier co-pending filed case including:

1. (#BB-2008) U.S. Ser. No. 12/232,035 Filed on Sep. 10, 2008 Public Jan. 9, 2009, now is U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sited-shoulder height or not has horizon-axis for min. half-chest length . . . . The shorter arms not have vertical-height, it only can be treated for PROTABLE or WORKING TOURCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . .

A-3-3: Quirky main-unit is (Power strip) so easily can carry, but same time, while it is power-strip for main-housing→Then it is very easily to portable or put into Backpack . . . . However, All Market Desk Lamp is very difficult to put into backpack and carry. Because Desk top lamp must very goo d installation on desk top surface because need to overcome 3 kind of Force at any time . . . .

(Desk top Lamp) must overcome below 3 force including:

(A-3-3-1) Super Heavy 14 gauge-wire (US safety standard) if has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!

(A-3-3-2) The weight from Top LED-unit has LEDs and housing or another optics-lens, PCB.

(A-3-3-3) Arms or LED-Box/housing weight on horizon-axis so can let LED desk lamp not fall down or These 3 Weight can overcome only while the Desk Lamp has (1) Bigger Main-Base so can let all Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the $1^{st}$ one inventor for his photos because Ivan already show on parent filed case (#AA) and (#BB) and (#CCC) all these 3 cases drawing show very clear Quirky cannot filed USA *patens* so use publication on some medium.

7. China patent is Filed on 2007, this is very earlier date. Almost same year of Steve Jobs (Apply) came out 1st iPhone on 2007.

The difference with current invention:

1. From China patents show the circuitry for incandescent radiation light source (105)

2. From the China patent the circuitry show the Incandescent or other light source is work under the AC current while the Input AC power (100) from outside AC wire (101) and the AC current will go through the conductive-trace or wire to the incandescent bulb (105) and has one on-off switch (103) to turn on or turn off the AC current into the AC power light source.

From whole China patent background, brief drawing, details description did not discuss anything for the LED light source at all only show on the Claim 5 said all kind of light source(s) but lack of support from the anywhere of the whole patent for how to get work for DC-Operated LED can use shown circuitry which is AC current deliver to the light source (105).

Basing on the $2^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;

Evidence A;
FIG. 1+2+3+8+9=U.S. Pat. No. 7,824,185(#BB-05) Ser. No. 12/232,035-9-22-10F (extension cord has outlet and LED and 3 contact-points.

Evidence B.
FIG. 6=U.S. Pat. No. 7,722,230(#41) (#AA-08) Filed on 2008

Evidence C;
Column1 Line44 (USB port)+FIG. 10C=U.S. Pat. No. 8,998,462 (#CCC-10) Multiple Surface LED Light filed on Nov. 19, 2010, U.S. Ser. No. 12/950,017 Public date on 5-24-12 Public Number 2012-012, 7708 now is US patent and issued on Apr. 7, 2015.

Evidence D; (Child Filed patent of #CCC-2010)
FIG. 3+4+6+7+8+9=(#FFF) U.S. Ser. No. 13/117,227 for the PUB PDF File.

Evidence E:
(#UU-2010) filed on Nov. 3, 2010 U.S. Ser. No. 12/938,628 on PUB PDF The current invention is different with the 3' group of (17) US prior art including below:

1. U.S. Pat. Nos. 7,736,033 and 8,545,039 Patel. The Lamp Base with Electric device recharge receptacle & means. The Bhart's disclosure the Outlets device and the Cigar lighter build on the lamp base. The lamp base make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfer the input-end 120 VAC to output-end 5 VDC so this is practically.

2. US Prior Public 2011-017703 rotatable & concealable device which only has the outlets device with manual switch. This is directly for 120 VAC outlets power source directly though metal piece and delivery 120 VAC to the rotatable & concealable device's receptacles to offer 120 V AC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power.

Though EXTERNAL transformer gets 5 VDC current (Outside the computer). The Computer itself input-end current is 5 VDC and output-end current of USB ports also is 5 VDC so its proof, Computer itself is no any USB Charger circuit inside.

5. US Prior art: U.S. Pat. No. 8,562,187 SMED disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The SMED other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the Overheat. The Ivan transformer must be 5 Volt DC with.

So, the '187 SMED 15 Volt DC just to supply power to the Plurality of LEDs and cannot charged other be-charged 5V batteries.

5-2. The '187 SMED not teach the USB ports is Quickly Charging-port min. has 1.0 Amp Charging capacity at the DC 5 Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the Outside Transformer housing or inside the lighting housing.

5-5. The '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the iPad which need 2.1 Amp or higher to charge properly. SMED 15 Volt not only too risk for Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for The current invention has a plurality of LEDs including color changing LEDs (Cool white LED 20 pcs plus Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. Teached the inside wall USB charger device which is not same as the current invention. Also, Cheng's filed date is Jul. 23, 2012 which is too late than current inventions. Also, this is for the Power Box inside wall has USB charger. Not same as current invention.

7. 8, 9, US prior art: U.S. Pat. Nos. 7,742,293, 8,116,007, 8,432,667 STRAUSER teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even STRAUSER had teach the USB plug to power the music-player as below content;

In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it does not supply the power to other device which is different with current invention is music device has built-in circuit and transfer input current to DC 5 Volt to charge the other electric device. So, this is not same as current invention for desktop definition and people will stay for a while to charge the other device.

10. U.S. Pat. No. 8,899,797 which for has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp).

The '797 who is filed on Aug. 26, 2012 after Co-inventor's U.S. Pat. No. 8,783,936 (#GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

11. US Prior art 2006-020, 9530 as below:

1. '9530 show bulb-socket so it is not the Built-in LED lamp. This maximum can add LED bulb Lamp device.

Fact☐Column (0005) Line 10

A terminal housing is disposed relative to the neck second portion, a bulb socket including a seat portion is attached to the terminal housing, and a shell portion of the terminal housing is shaped to receive the base of a light bulb.

2. '9530 show the Transformer and Bulb-socket in parallel connection. So, the light source is getting 120 Volt current which is not built-in LED lamp device Fact shown on Column [0006]

The lamp support may also house a transformer electrically coupled to the power cord in parallel to the bulb socket.

3. '9530 show The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!

FACT shown on [0007] Alternatively, the lamp may include a second socket disposed on the support, the socket having a first end directed internally of the support and coupled to the speaker and a second end positioned externally on the support for connecting to a media device compatible cable.

4. '9530 show no any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-Female-receiving end and Charging wire's USB insert male-plug to deliver the current and the though charging wire's other ends to connect with the electric or digital device.

The audio output cable (17) though Round Plug (17a) to transmit the data to speaker (15) (15a), Audio Output cable (17) one end to Music media device (100) and another end to Speaker (15a) (15b)

FACT shown on [0019] As illustrated in FIGS. 1 and 2, an audio output cable 17 is electrically connected via a plug 17a at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

5. '9530 shown do not has built-in LED light source, only can install the LED bulb at the bulb-base. Not like the co-inventor's (3) issued patents or co-pending case has LED built-in as light source, No Bulb-Base at all.

FACT shown on [0021] line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

6. '9530 shown the contact (44) is Custom Pin-Out type which only can charge one and ONLY one model of the phone. Also, the Recess Slot which also become Big limited to fit one and ONLY one phone.

Fact shown on [0025] As illustrated in FIG. 2, the recess 42 is provided on the top surface of the support 12 for receiving the media player 100. A plurality of contacts 44 are formed at the base or on a Wall of the recess 42.

7. '9530 shown only can charge one and ONLY ONE phone because (A) Recess (42) size is fixed (B) The contact (44) need align precisely to the phone contact so can charge one and Only One. Not like Ivan the charging port is common USB-Port!!

Fact shown on [0026] Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530 show the LEE unit only can charge one and ONLY One phone and the charge contact all is Custom Pin-Out type. The current invention's items have USB-Port which can work with any USB-Port charging wires to connect with the Other electric device and digital device.

FACT shown on [0027] In accordance with an alternative arrangement of the present invention and with reference to FIG. 4, a charging circuit is excluded from lighting apparatus 10, and contacts 44 are electrically connected to a socket 50 dis posed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

Fact shown on (0027) Line 2 Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

10. '9530LEE device can transmit BOTH DATA and CHARGING. This is not happening at Ivan item because Ivan item only has the CHARGING FUNCTION. This is not same on basic CHARGING of CHARGER DEVICE!! So, this is totally different with Ivan's CHARGER patent.

Fact shown on [0027] Line 14 to 19 The cable allows both transmission of data between the computer and the iPod and charging of the iPod's internal battery through the USB port on the computer.

11. '9530 LEE device cable is associated audio media device & get power from the inner charging-circuit and get power from CUSTOM PIN-OUT contact (44) or Outer socket (50)□ This is totally different with Ivan's can charge and ONLY CHARGE many different electric or digital device. Not one and ONLY one as LEE claimed and details description for AUDIO MEDIA DEVICE (100).

FACT shown on [0027] Line 2 Socket 50 is adapted to inter face with the charging and/or data cable associated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, From above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

13. US Prior Art US 2010/0296298 Martin, JR. U.S. Ser. No. 12/761,514 Filed on Apr. 16, 2010

The '298 teach one Rea-Beveled Mirror (12a) of Rear-Beveled cut edge (12) of FIG. 4 and FIG. 5 or the Rear-Beveled Mirror (14a) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12a) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the contour is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12a) (14a) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even brightness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2)

The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12a) or refracted light beams to make bad light-performance. Also, the (3) '298 need install the J-chamber (20) which is not practical for current invention for installation the mirror with beveled-aged (12a). and (4) the current invention preferred $2^{nd}$ side of LED lighted-mirror with normal non-magnify mirror also illumination so this is not existing for the said '298 for single side mirrors for '298 device.==> So this is nothing to do with '298 patent for concept, application, feature, installation, optics-theory, mirror type, optic-focus vs. diffusion, light-beam emit out directly without go through the beveled-ages, two mirrors with rotating features.

14. US 2012-0294015 (SMED) as earlier discussion for all difference.

15. US 2008-0091250 (POWELL) therapy LED desk lamp
  '250 POWELL teach a portable DC power source [0012 line 5 to 8] for easily carry to patient room or do therapy.
  '250 power teach a controller (126) which is (0017)
  (Line 2 to 3) line [selecting the operating mode of the desk lamp 140], or
  (line 4 to line 5] [electronic communication with the LED array 108], or
  [line 6 to line] include a display and user to select a broad-spectrum light for general uses such as reading,
    →These are common LED light device from market place and not a patentable on 2007 when the iPhone came out year!
  Powell same as current invention to have this basic LED desk lamp to add POWELL its features to add
  a. "Therapy treatment light wave light-beam including infra-red, blue, red light beam→(The current invention for reading or working do not have these light color)
  b. Portable device→(not same as current invention is non-portable device and big-size or weight bas permanently install on desktop before replacing it).
  c. [Column 1 (0014) Line5] The '250 for brightness is very bright for 1,000 to 2,000 lux→(This high brightness same as jail-torch light is not use for people reading or working indoor and this brightness will hurt people eyes while long time reading for student, '250 also did not have any anti-glare optic-piece to protect eye, or
  d. [Column 1 (0016) line 6} for 15-30 inch around 1 to 2.5 feet has 450 lux (This is too bright for people reading→ (this is not same as current invention for reading or working or accent light which not allow so bright to heart people eyes especially without the anti-glare protection at all.
  e. [Column 2 line 10] include a controller 226 which can include a display and user inputs
    →Which means this is not like current invention for simple switch or sensor for lower cost desk lamp.
  f. [Column 1 (0011) line 5 to 8] for battery power easily carry to patient room or do therapy.
    [Column 2 (0018) line 10] The desk lamp 240 may be powered by an internal or external portable power source such as battery. The battery power source may provide the desk lamp 240 with power such that AC power is not required."

For both embodiment all had the same portable power source is batteries.
This is different with current invention for LED and added functions need more power and batteries do not supply this kind of other added function for power consumptions.
g. [Column 2 (0018) line 15] The batteries may be stored within or proximate to the base 242 or within the LED module 246. The LED module 246 may include one or more LEDs 208, like LED array 108 as described previously. ==> Different with current invention the plurality is not powered by batteries at all.
So→The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source.
Basing on US patent office have much more the LED desktop light including above discussed LED desktop light of SEMD or others still can get US patents basing on (1) basic LED desktop light with ADDED features so can grant US patents as many of prior arts.
[line 7 to line] allow the user to activate desired therapeutic wave-length so light such as red, yellow, blue, green or infra-red wavelengths or a combination thereof to treat various conditions.
which had a very complicated data-storage
16. Re: US Prior art US 2011=0228449 (KEEBLER et al) Filed on Mar. 18, 2010 Public 9-22-2011
=→Regarding FIG. 3, a plurality of direct current powered devices 305,310,315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1.→so '449 teach all be charge item→Device i-pod or others is not USB female receiving port(s) and the device have different direct current voltage as in shown in FIG. 1.
Also, '449 The said universal power supply system 100, That is lack of
(1) No any USB ports with only 1 output current around 5V+/−20% and min. 1 Amp current up or more Amp.
(2) No any LED light to offer the area illumination for reading or work or accent light Amp current up or more Amp.
(3) Most important offer many different voltage DC currents not like current invention only export the 5 Volt+/−20% to charge be-charged products.
17. US 2010-0046249 (Mai) for Diffusion film
'249 Mai teach a film with diffusion and need use plurality of substrates made of different material to get the (light incidence surface) and (light emission surface) for different surface of plurality of layer.→This is too complicated than market available for much better optics-lens to make the narrow LED light beam as back light and make the said light diffusion to even brightness.
From Co-inventor co-pending case (#K) U.S. Ser. No. 11/498,874 which also had the optics-piece (5') (5") for incidence and (5") emission surface and back LED light to get even brightness filed on Aug. 4, 2006 which is CIP of Ser. No. 10/954,189 filed on Oct. 1, 2004. Also, the both (5') and (5") is made by injection resin, Not even need to make plurality of layers of the film.
From current invention (#K) U.S. Ser. No. 11/498,874 has other many US prior art which is easier than the filed date Aug. 4, 2006 including U.S. Pat. No. 2,779,630 Clausen, U.S. Pat. No. 5,964,516 Lai, U.S. Pat. No. 6,669,468 PESU, U.S. Pat. No. 6,709,126 Leen, U.S. Pat. No. 6,846,098 Bourdelais, U.S. Pat. No. 7,538,832 Hong, US 2006-0062019 Young, US 2007-0076437 all related for the Optics-piece for make light-beam arrangement.
So, Mai teach totally nothing to do with the current invention because current invention will not use this kind of plurality of layer of optic-film etc.
Basing on the above listed 3 group discussion for all (17) US and China prior arts it is no any proper prior art for current invention. Hereafter for more discussion for current invention features.
It is appreciated the current invention is unique and is not same as below listed (12) USA pending or patents cases. This also exemplary for all below allowed patents basing on each one had its own features and each is not able to combine any others pending or patents combination so can get issues:
Other Combination and Comparison for 12 Desk Lamp Related Case(s):
1. {U.S. Pat. No. 6,666,563 Brown} Illumination Device (Apr. 12, 2002 Filed)
2. {U.S. Pat. No. 7,295,608=Reynolds} Desk lamp with therapy LED light (Sep. 26, 2002 filed)
3. {U.S. Pat. No. 7,040,783 CHRISTINSON}Adjustable clamp-on lamp with Ball-head (filed on Apr. 12, 2004)
4. {US 2006,0209-530 SCHAAK} Lamp with personal audio player (Filed Jun. 9, 2006)
5. {'148 Meyer U.S. Pat. No. 7,897,277} Desk lamp with USB-port (124) (Filed on Jan. 30, 2007)
6. {US 2008-009-1250 POWEL} Desk lamp with therapy (Oct. 24, 2007 Filed)
7. {'039 PATEL U.S. Pat. Nos. 7,736,033 8,545,039} Desk lamp with Outlet and USB-Port (Field May 18, 2010)
8. {U.S. Pat. No. 8,562,187 SMED} Powered base for a lamp (May 18, 2011 Filed)
9. {U.S. Pat. No. 8,783,936 CHIEN}Desk top items with LED has USB unit or USB Module (Filed Jun. 16, 2011) Reference Cited for [U.S. Pat. No. 7,897,277 B2* 3/2011 Meyer et. Al 429/100]
10. {8,899,797 SCHAAK}Lamp with desk Organizer and electronics stand (Filed on Aug. 6, 2012)
11. {U.S. Pat. No. 9,103,543 MARQUARDT} Lamp tablet docking station (Filed on Jul. 11, 2013) Reference Cited for [20100039-792 B2* 2/2010 Meyer et. Al 429/100
12. {U.S. Pat. No. 8,915,608 CHIEN} Desk top item with LED has USB-unit or USB-module
(Filed on Dec. 13, 2013)
Hereof, To clear make definition for the above discussed many type of the Chargers and each type has its own USB or Outlet specification such as USB-1.0, USB-2.0, or new standard for USB-3.0 or Outlet for 1,850 Watt (for desktop lighted mirror has the USB-charging ports and hair dryer AC outlets), 1,650 Watt (for regular AC outlets not for hair dryer or heater use) as convention market available type which all fall within the current invention scope and claims but these specification is well known and not related to the current invention's parts-name definition, as below:

1. (#U-1)=One of preferred embodiments as FIG. 32A1 and FIG. 32A2 shown USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the re-chargeable batteries so the energy storage unit can be charged and supply the power to the be-charged device's circuit to use. NOT directly from USB Charging port to SUPPLY the other device DIRECCTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, the current invention's USB-Charging port while on normal time only take 1 and only 1 of the input power or current and passing through inner circuit to come out the DC current on desired voltage and amperage. It does not have more than one different input current such as AC or DC current as input current or it will be totally destroy the output current because inner circuit is fixed for one and only one current specification. While the power fail can use other backup rechargeable or non-rechargeable battery to supply the DC current to act as power-bank or power-fail light while have added additional-function(s) and still have only one input current into USB charging-port(s).

Some applications the USB-Unit is just a USB receiving port which connect with the outside housing's transformer, adaptor, inventor, converter which has its built-in circuit to change from AC power source to DC current and from outside housing into the USB conductive receiving-end(s) allow the inserting USB male-prong to insert to deliver the DC current. =>This kind of USB receiving-port also is fit into a USB-Unit.

2. (#U-2)=One of preferred embodiments as FIGS. 32B1, 32B2, 32B3 32B4 shown Outlet-unit charger: The unit it is an individual POWER SURPPLIER device and only supply power not CHARGE device which has outlet-receptacle(s) which can receive the other device's prongs to deliver or supply the AC current from the OUTSIDE Housing's outlet-unit power-source though the outlet-unit's port(s) conductive piece assembly to other be-charged device's prong to get into other device's circuit to power other device.

This outlet-unit can be housed or without any hosing and install within the said desk-top housing and all live-wired or electric-carried parts & accessories not touchable by people except the Outlet no electric carried outside parts (s).

3. (#U-3)=One of preferred embodiments as FIGS. 32B1, 32C1, 32C2, 32C3, 32C4, 32C5, 32C6, 32C7 shown=USB-Module Charger: This module is not a single USB-Unit Charger. It will be any combination for any number of the (a) USB-Unit(s) or/and (b) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other be-charged or be-supplied devices(s).

This unit can be housed or without any hosing and install within the said desk-top housing and all live-wired or electric-carried parts & accessories not touchable by people except the non-carry electric parts of the said USB-port(s) and/or Outlet-unit(s).

4. (#U-4)=Sealed-unit: This is a unit which has desired combination for any number of USB-unit(s) or/and outlet-unit(s) arrangement or combination and sealed or housing into one piece of the housing, compartment, space, container and the related circuit(s) and construction have to pass each country's required related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories have to sealed or housing or enclosure within the housing, desktop items, container, space so can pass the US Safety standard requirement(s).

5. (#U-5) One of preferred embodiments as FIGS. 32B1, 32C1, 32C2, 32C3, 32C4, 32C5, 32C6, 32C7 shown=Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desk-top items.

6. (#U-6)=USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for Charging function and DO NOT have any electric data delivery. Or/This will slow down the charging speed or make overheat or whatever bad for the said current invention.

7. (#U-7)=Outlet female receiving piece=It equivalent to (Outlet port) to receiving the other electric or digital data device's prong means so can deliver the AC current from outlet-port(s) through the conductive piece or assembly to the other electric or digital data device inserting prongs directly without passing through any electric controller or circuit whenever the prongs insert into the said Outlet female receiving piece.

8. (#U-8)=Desk Top items has more than one functions: Which is a products has LED or other light source which the said LED or other light source including the LED as an indicator light to show charging or charging status, not only limited for LED(s) is a LED light source for supply LED light beam for illumination. The desktop has more than one electric function which means Not only for illumination but also has $2^{nd}$ functions which can make people eye, ear, nose, mouth, skin to see, hear, smell, eat, drink, feel or is a video or an audio or an image or a sound related item. The said $2^{nd}$ function is existing products which available at market for people to buy and put on desktop or any surface where people will stay, work, sleep as above discussed.

The said other light source which including the LED Bulb, CFL, Energy saving bulb, Florescent tube, PL light.

9. (#U-9)=Base of light device: The base including the adjacent pole, bar, stand, step, curved surface, edge, contour or all the surfaces for the base or added, detachable, movable, rotatable, removable compartment or organizer which allow people to have extra space to install pen, pencil, staple, scissors, ear-ring, bracelet, necklace, hair-clipper or other personal carry or wearing items which install or fit of the light device except the light source and the shade. The said USB-port, USB-unit, USB-module, or Outlet-port, Outlet-unit, Outlet-module, or Sealed-unit, or Universal-unit, or rotatable module can fit within or install or attached or overlay or underlay on anywhere of the said base, or compartment(s), or organizer(s) of the LED Light device for desktop or floor-light device which may has any kind of the light source including LED(s), LED-assembly, LED-Bulb, LED tube, EL, OEL, organic EL.

The current invention also including the Base of Light device has built-in USB-Charging ports and this base or base, or compartment(s), or organizer(s) has built-in light-source or added/replaceable light-source such as LED-bulb, LED-assembly, LED(s), LED-tube can sell individually at the market place.

These above (9) details description for some parts & accessories which use for current invention as FIGS. 32A1, 32A2, 32B1, 32B2, 32B3, 32B4, 32C1, 32C2, 32C3, 32C4, 32C5, 32C6, 32C7, 32D1, 32D2, 32D3, 32D for LED desktop or LED floor light device with optional added additional-function(s). It is appreciated that all above listed, discussed, co-inventor pending or co-pending or issued prior arts or embodiment, details, specification, arrangement, constructions has its replaceable, alternative, improvement or equivalent functions should still fall within the current invention scope.

BRIEF DESCRIPTION OF THE DRAWINGS

The desktop system is illustrated in the figures of the accompanying drawings which are meant to be exemplary and not limiting, in which like reference numerals are intended to refer to like components, and in which:

FIG. 3A and FIG. 3B is an working diagram for the power source, USB Charging ports, LED or LED-assembly or LED-bulb light source, Outlet-unit with related circuit-kits, circuit-inner, more than on circuit-inside & IC & DC-to-DC circuit or parts or accessories relation of the base unit of FIG. 1 to FIG. 6 for Desktop LED light or FIG. 7 to FIG. 21 for Desktop or Floor-light applications.

FIGS. 11 and 11A is an isometric top view of the desktop system in a sixth embodiment for solar power unit which can be one of low-light beam can charge solar module such as thin-film solar-module.

FIGS. 12 and 12A is an isometric view of the desktop or floor LED light device having alternative charger system which is wireless charger in an alternate embodiment for desired LED light-source.

FIG. 13 is an isometric view of a base unit for an embodiment of the desktop system.

FIG. 14 is an isometric view of a base unit for an embodiment of the desktop system shown the desktop or floor LED light device has arm, pole, bar, or added compartment(s) or organizer has built-in USB and/or outlet ports and/or desired added additional function including air-flow, time/date/calendar/weather displayer, audio, sensor, switch, wireless signal receiver to get desired functions(s) and setting, adjustable, selection-system for charging or supply DC and/or AC current to the said LED light device(s).]

FIG. 15 is an isometric view of a base unit for an embodiment of the desktop system for geometric arrangement for LED(s)

FIGS. 16 and 16A shown different view of a LED(s) lighting-source for one of embodiments for the desktop system with one of geometric-arrangements for LED light-source.

FIG. 17 is a bottom view of a lighting-source for one of embodiments of the LED desktop or floor-light system has replaceable LED-assembly or LED-bulb(s).

FIG. 18 and FIG. 19, FIG. 19A.

FIG. 20 shown different view of a lighting-source install on the rotatable USB and/or outlet and/or other female-receiving-port(s) for an embodiment of the said LED desktop or floor-light device for desired combination for AC or DC or electric combination or system.

FIG. 21 and FIG. 22 shown the multiple-surface of USB and/or outlet and/or other female receiving-port(s) applications for isometric top view of PARENT FILING (#CCC) is a rotatable power station for an embodiment of the desktop system.

FIGS. 21-2, FIG. 21-3 show the multiple surface USB or Outlet module has desired number and receiving-port(s) including all market available female receiving-ports and can rotating for more than one of surface and each surface has built-in desired female receiving-port(s) combinations.

FIGS. 25-1, 25-2, 25-3, 25-4 show the desktop or wall-mounted LED light device or system to offer the area or object illumination to reflect or illumination for cosmetic-mirror with desired one or two side-mirror with desired magnify-lens from 1 to N-time magnify-radio and mirror-number for at least one color and/or dimmable, adjust brightness is an isometric top view of the desktop system in an eleventh embodiment and built-in AC or DC of USB and/or outlet and/or other female receiving-ports to get AC and/or DC and/or other electric signals including have outlets for hair-dryer or heat-device for cosmetic-kits.

Figure 1:
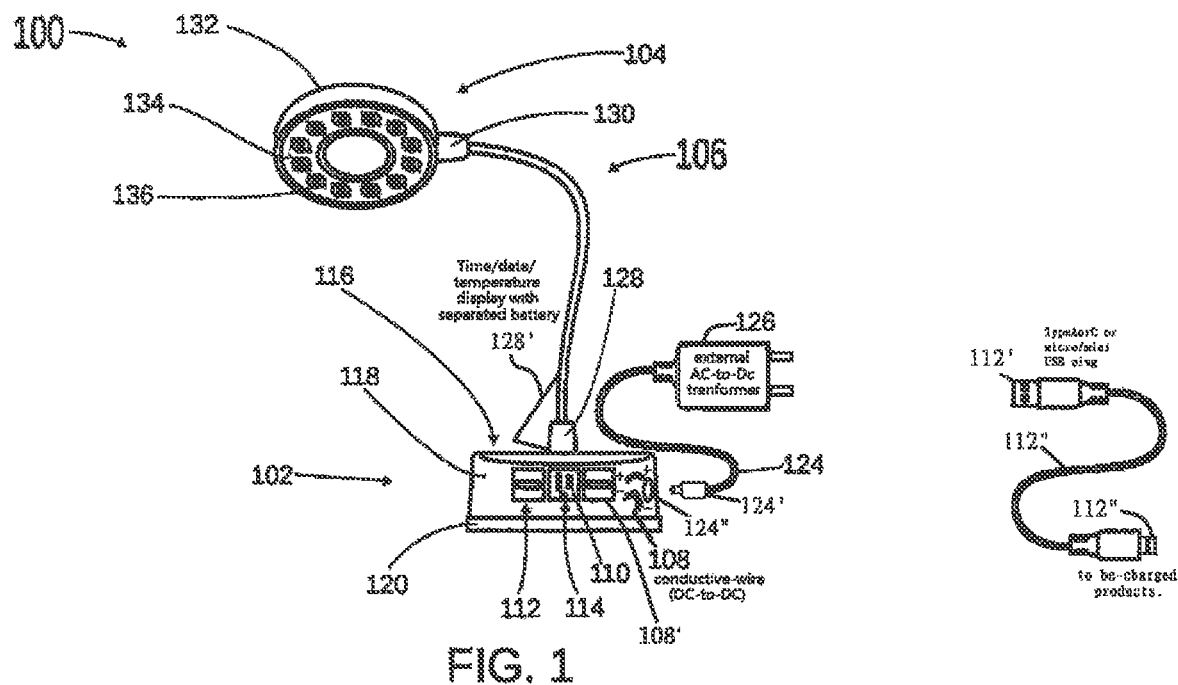
FIG. 1 is an isometric side view of the LED desktop or floor-light system in a first embodiment.
Figure 2:
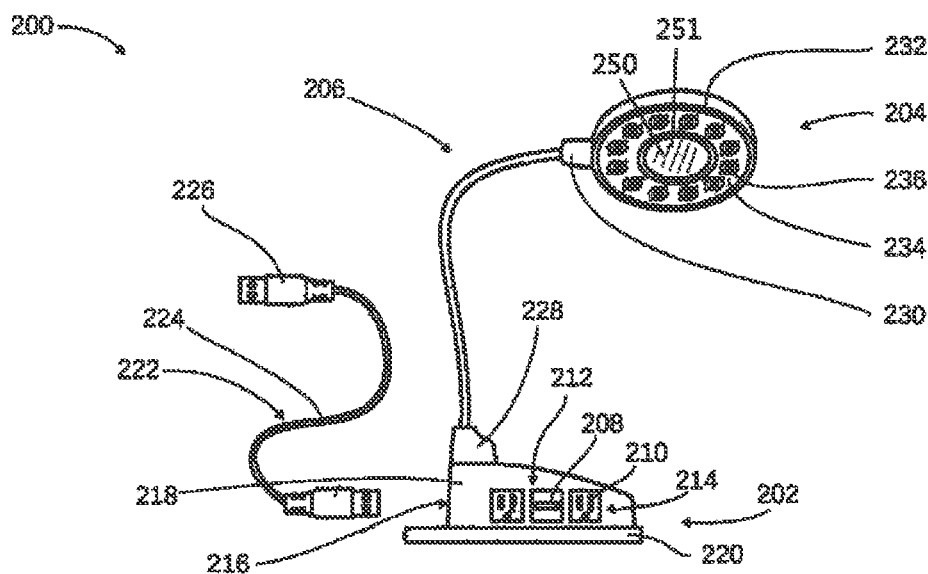
FIG. 2 is an isometric side view of the LED desktop or longer pole or bar or arms for floor-light system in a second embodiment.
Figure 26:
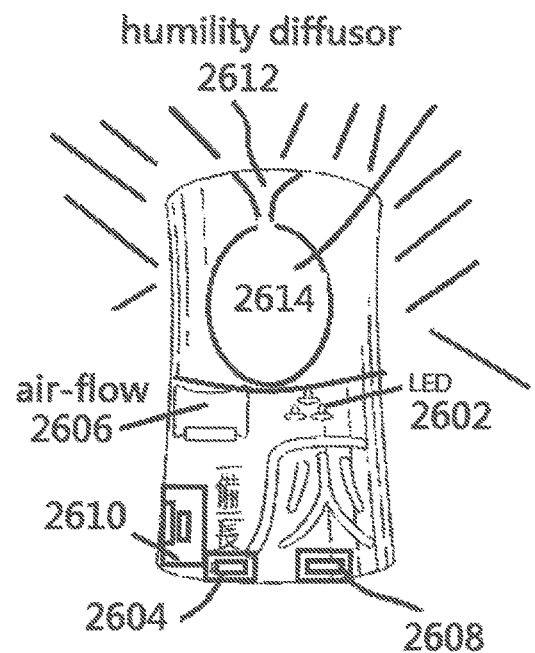
FIG. 26 shown the isometric view of the LED light desktop device or system in a tenth embodiment have color changing and/or color selection for area illumination of LED desktop or floor-light for area-illumination or accent light illumination and built-in USB and/or outlets and/or other added addition functions including air-flow, liquid diffusion, liquid sprayer, air freshener, fragrance sprayer built-in one of LED desktop or floor light device.
Figures 4, 25:
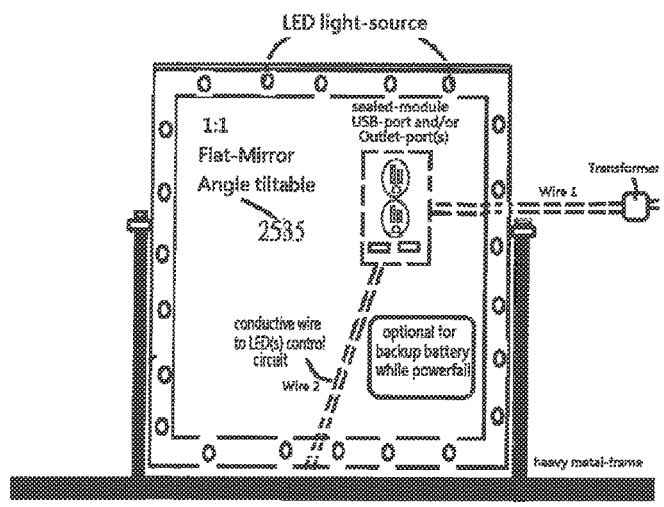
Figures 1, 26:
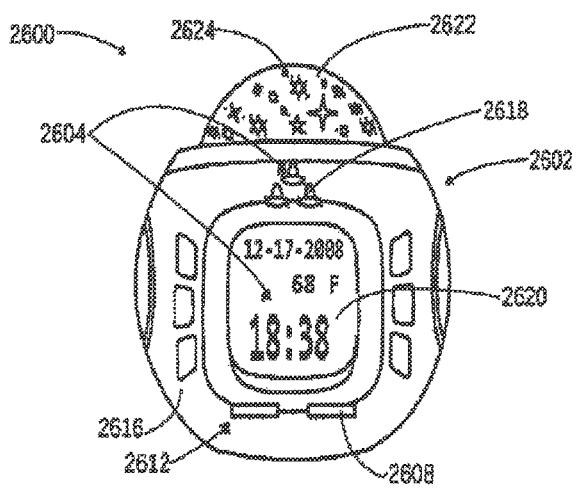
Figures 2, 26:
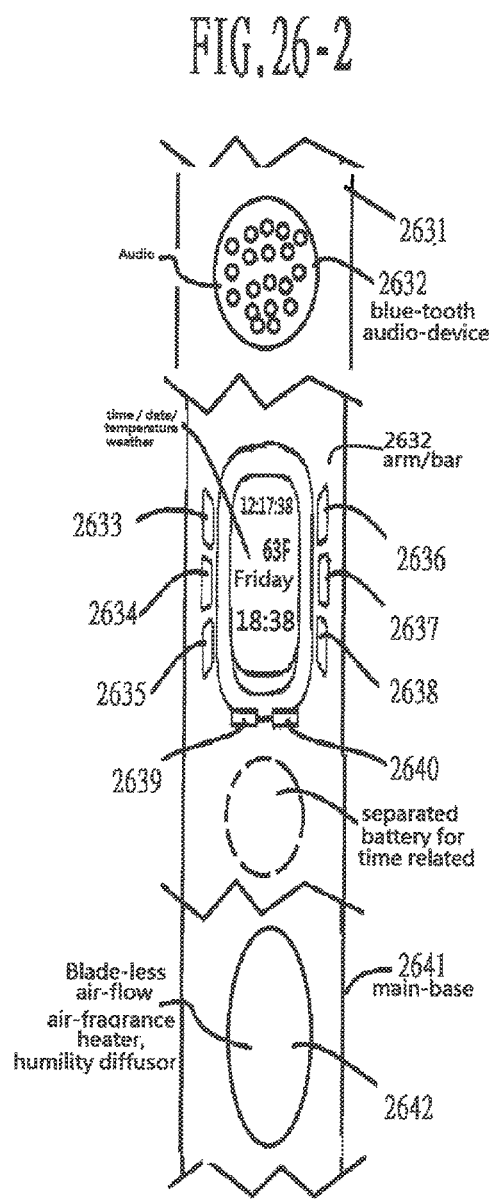

From FIG. 26-1 and FIG. 26-2 shown the all the added additional-function(s) for LED desktop or floor-light including (1) the top shaped or arts projected image or pin-hole image, or (2) area or accent-light by $2^{nd}$ or other LED(s), or (3) time/date/weather displayer, or (4) air-flow, fragrance-sprayer, humility diffuser, liquid sprayers, or (5) audio-system by pre-recorded or blue-tooth or wireless-communication with sensor, switch, adjustable-kits, wireless-controller, z-way or blue-tooth, wifi, APP for setting, adjusting, selection.

Figure 27:
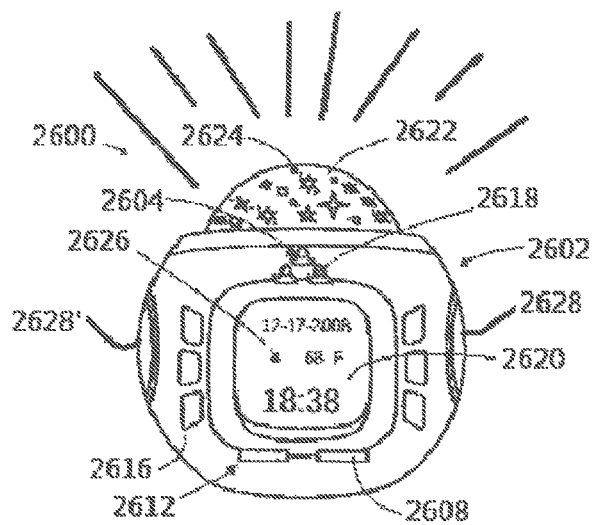

FIG. 27 is an isometric top view of the desktop or floor light LED device or system in an eleventh embodiment have all the added additional-function(s) for LED desktop or floor-light including (1) the top shaped or arts projected image or pin-hole image, or (2) area or accent-light by $2^{nd}$ or other LED(s), or (3) time/date/weather displayer, or (4) air-flow, fragrance-sprayer, humility diffuser, liquid sprayers, or (5) audio-system by pre-recorded or blue-tooth or wireless-communication with sensor, switch, adjustable-kits, wireless-controller, z-way or blue-tooth, wifi, APP for setting, adjusting, selection.

Figure 28:
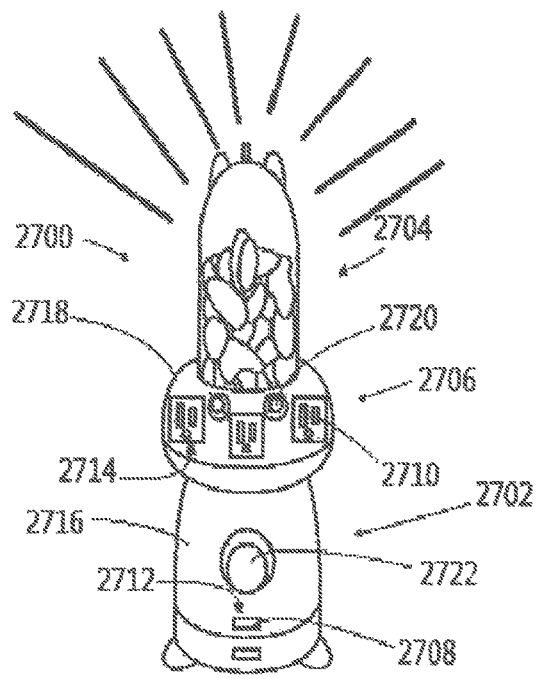

FIG. 28 is an isometric side view of an implement for use with the desktop system have LED light for area-illumination and also have LED charging-status light(s) and also food-supplier functions, those all are built-inside the said LED light for area-illumination and built-in USB and/or outlets and/or other added addition functions.

Figure 29:
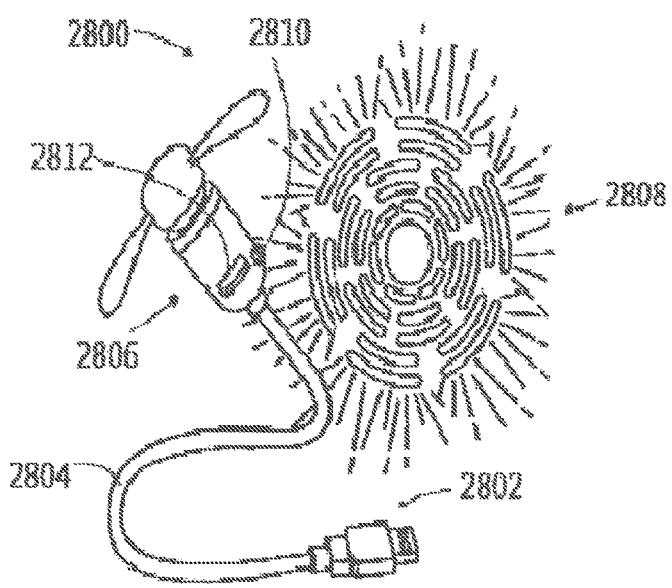

FIG. 29 is an isometric side view of the desktop system in a twelfth embodiment have LED light for area-illumination and also have LED charging-status light(s) and also air-flow functions, those all are built-inside the said LED light for area-illumination and built-in USB and/or outlets and/or other added addition functions with FIG. 1 to FIG. 6 desired AC connectors.

FIG. 30 and FIG. 31 shown isometric view of a USB-ports of wiki-media for the 2 charging status drawing as attachment drawing.

FIGS. 32A1, 32A2, 32B1, 32B2, 32B3, 32B4, 32C1 32C2, 32C3 32C4, 32C5, 32C6, 32C7, 32D1, 32D2, 32D3, 32D4 to show preferred embodiment for the above discussed for parts as below listed.

FIGS. 32A1 is USB-unit: The Unit means it is an individual charger has only charger purpose to have one input-current and passing though inner own circuit to make input current change to one output current to charger other device from its own USB port(s). This unit can be housed or without any hosing and install within the said desk-top main-base or housing and all live-wired or electric-carried parts & accessories not touchable by people except the USB-port(s). From FIG. 32A1 show the USB-unit (3100) has the built-in circuitry (3102) which connect with the input current wire (3014) to change the input AC current go through the built-in AC-to-DC circuit (3112) and electric parts and accessories (3108) (3109) (3116) to get DC current to supply the built-in USB-port (3106) to allow USB-related wire male-plug to insert into to build the electric delivery from USB-port (2106) through USB-related wired mail-plugs to supply or charge other electric device.

The USB charger only take 1 and only 1 of the input power from AC-to-DC circuit where AC house power basing on different country has one range current voltage and current. And, the AC-to-DC current passing through inner circuit to come out the DC current on desired voltage and amperage. It does not have more than one different input current such as AC and/or DC current as input current for USB-charging-port or it will be totally destroy the output current because inner circuit is fixed for one and only one current range and specification such as 108 to 110 Voltage or 108 to 250 Voltage for AC current and go through AC-to-DC circuit to supply standard USB charger-port needed current without variable DC voltage.

FIGS. 32A2, is USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top main-base or housing and all live-wired or electric-carried parts & accessories not touchable by people except the USB-port(s).

From FIG. 32A2 is USB-module (3200) which for Desktop items or lamp which has AC-to-DC circuit (3212) and pre-determined electric parts (3210) & accessories (3216) to change input AC current into DC current. The said USB-module has more than one of USB-ports (3204) (3206) so can supply more than one of the inserting male-plug of USB-wire to build the DC current delivery from Desktop items or desktop lamp to other electric device.

From FIGS. 32B1, 32B2, 32B3, 32B4 is Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to other device's prong to get into other device's conductive-piece or-and circuit to power other be-supplier AC current device. This unit can be housed or without any hosing and install within the said desk-top main-base or housing and all live-wired or electric-carried parts & accessories not touchable by people except the USB-port(s).

From FIGS. 32B1, 32B2, 32B3 is the outlet-unit (3500) is well install between the LED desk top item or lamp main-base or housing between the walls and inner housing-parts. The outlet-unit (3506) has the fasten screw to hold the outlet-unit (3506) solid between the outside wall and inner housing-parts. The said outlet-unit has 2 or 3 receiving-ends and inner conductive-metal piece to hold the inserted-prongs to build the AC current delivery. From FIG. 32B4 is one preferred embodiment for outlet-module (3600) which has more than one of outlet-ports and each outlet-port having its own inner conductive-metal pieces to build connect with input AC-current from outside wire (3602) (3604). The said USB-module (3600) has its own housing so can easily pre-assembly so can save the installation or assembly into said desktop items or lamp.

From FIGS. 32C1 32C2, 32C3 show Sealed-unit: This is a unit which has desired combination for any number of USB-unit(s) or/and outlet-unit(s) arrangement or combination and sealed into one piece of the own housing and passed all USA required related safety standard(s) and get test labs' certification for this sealed unit only which not including the other housing parts or accessories non-related to the USB or Outlet charger. This sealed unit any live-wire or electric-carried parts & accessories have to sealed so called sealed unit so can pass the US Safety standard requirement(s). This sealed-unit has the prongs to plug-in LED desk lamp or LED desk items outlet receiving ports to change the desk top lamp or items AC current through the sealed-unit inside AC-to-DC circuitry to supply DC current to other device through sealed-unit own USB-ports. From FIG. 32C 1 can see the sealed-unit (3300) has folding prong (3308) arranged on its own housing and the housing has built-in AC-to-DC circuitry to change input AC current to DC current and through the front has USB-port (3302) to allow the male USB-plug inserts into to build the DC current delivery. The DC current also supply the power to the said inside LEDs and emit the light from front lower window.

From FIG. 32C2 similar with FIG. 32C1 only different at the said USB sealed unit (3700) has two USB-ports to allow USB male-plug inserts into to deliver the DC current to other products.

From FIGS. 32C4, 32C5, 32C6, 32C7 show Universal Charger: This is charger which has finished housing and electric-contactor such as prong, or wired, or quickly-connector(s) which not only can incorporate with the said desk-top item, but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong plug-into outlet on wall or power strip's outlets. This is definition for universal charger for current desk-top items.

Figure 3:
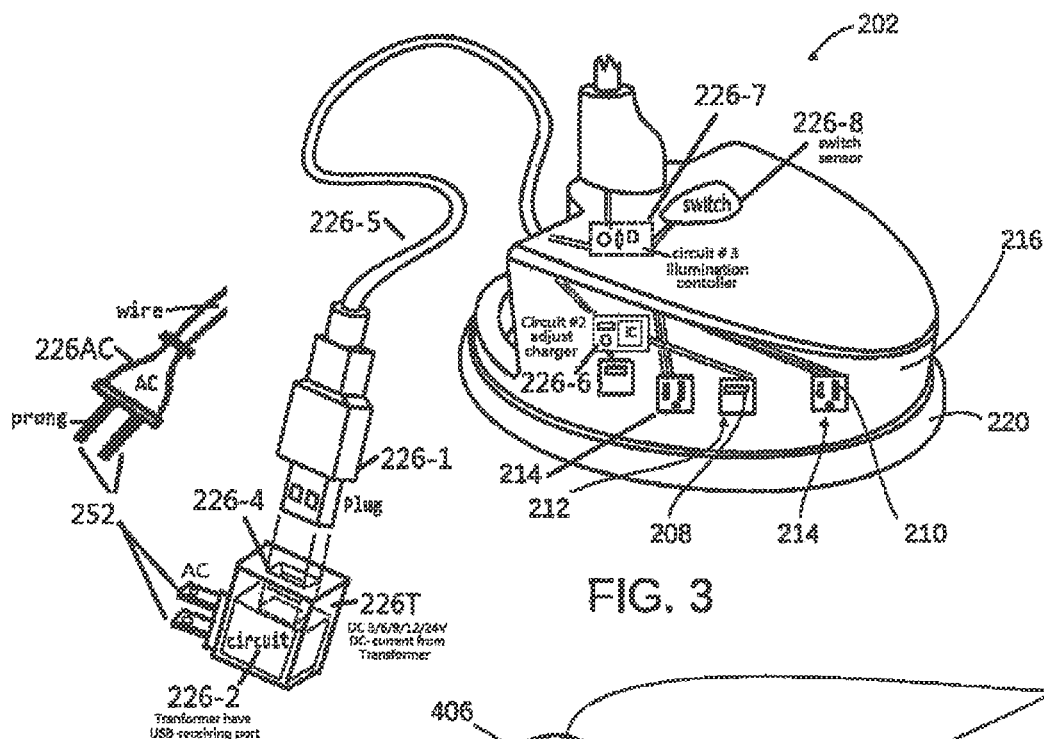
FIG. 3 is an isometric view of the base unit and different external transformer with quickly USB or Adaptor connection-kits of FIGS. 1, 2, 4, 5, 6 in an alternate or equal function or available-skill or replaceable arrangement and configuration with desired top LED(s) or LED-assembly or LED-bulb for built-in or replaceable type(s).
Figure 4:
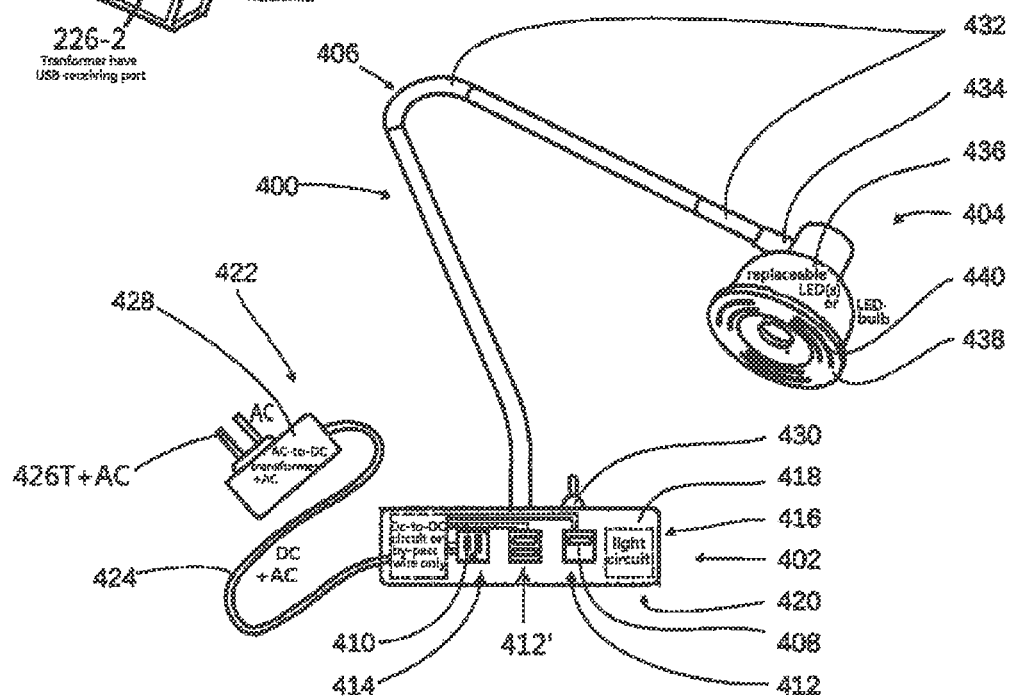
FIG. 4 is an isometric side view of the desktop system in a third embodiment having Chip-on-Board (COB) LED light-source.

From FIG. 32C3 show the universal-unit has the two built-in functions for fan and LED light which can easily install within the LED desktop lamp or items main-base or housing including arm-base (14*t*) (14*s*) as FIG. 14 shown. The said Universal unit has its own preferred functions which may selected From FIG. 23, 24, 25, 26, 27, 28, 29 or any other functions to built-in the main-base or compartment or arm-base (14*s*) (14*t*) of FIG. 14 discussed. Furthermore, the Universal-unit or Sealed-unit both has its own housing with desired conducive-piece such as (i) prong or AC-plug-wires (ii) conductive-wires for connect with LED light-source(s) or Light-bulb(s) its related circuitry including IC, function or setting or changing, or select switch, or (iii) others electric parts & accessories so can connect with power-source from AC-outlet or external transformer into the sealed-unit(s) and/or universal-unit(s) inner AC-to-DC circuitry to get desired DC currents to supply DC current to LED-light-source and related circuit(s) to get desired light-functions, color, brightness by sensor or micro-wave sensor or select/adjust/! setting/! variable switch or electric components. The said sealed-unit(s) or Universal-unit can simple to install the said LED desk-top item such as cosmetic mirror base or housing, frame, back housing, back space (While mirror is flat piece or type) by chemical adhesive compound, glue, screw, attachment kits, install kits, fix kits so can instantly to install the USB-ports with or without outlet-ports for desired combination on LED desk-top items as FIG. 25-2 drawing shown the flat type cosmetic mirrors.

FIGS. 32D1, 32D2, 32D3, and 32D4 show the rotating-module for all kind of applications.

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source (not AC and DC) which is not like has AC input or Battery power pack to supply more than one power source into to make to the USB port which is not practical and increase a lot of trouble for construction and expensive. The current invention as co-inventor parent filed including:

The current invention is a continuation filing of (#GGG-11) U.S. Ser. No. 14/951,872 filed on Nov. 25, 2015, which is CIP of (#GGG-10) U.S. Ser. No. 14/875,675 filed on Oct. 5, 2015 Which is CIP of (#GGG-9) U.S. Ser. No. 14/870,601 filed on Sep. 30, 2015 which is CIP of (#GGG-8) U.S. Ser. No. 14/834,613 filed on Nov. 10, 2015 which is CIP of (#GGG-7) U.S. Ser. No. 14/834,823 filed on Aug. 25, 2015 which is CIP of (#GGG-6) U.S. Ser. No. 14/834,557 filed on Aug. 25, 2015 which is CIP of (#GGG-5-1) U.S. Ser. No. 14/858,838 filed on Sep. 18, 2015 now is allowanced wait for issued, which is CIP of (#GGG-5) U.S. Ser. No. 14/833,935 filed on Aug. 24, 2015 which is CIP of (#GGG-4C) U.S. Ser. No. 14/827,810 filed on Aug. 17, 2015 which is CIP of (#GGG-4) U.S. Ser. No. 14/827,810 filed on Aug. 17, 2015 now is U.S. Pat. No. 8,931,947 issued on Jan. 13, 2015 which is CIP of (#GGG-3C) U.S. Ser. No. 14/643,026 filed on Mar. 10, 2015 which is CIP of (#GGG-3) U.S. Ser. No. 14/144,703 filed on Dec. 31, 2013 which is CIP of (#GGG-2C) U.S. Ser. No. 14/548,626 filed on Nov. 20, 2014 now U.S. Pat. No. 9,182,111 issued on Nov. 10, 2015 which is CIP of (#GGG-2) U.S. Ser. No. 14/105,717 filed on Dec. 13, 2013 now U.S. Pat. No. 8,911,137 issued on Dec. 16, 2014 which is CIP of (#GGG-1C) U.S. Ser. No. 14/548,861 filed on Nov. 20, 2014 which is CIP of (#GGG-1) U.S. Ser. No. 14/105,607 filed on Dec. 13, 2013 now U.S. Pat. No. 8,915,608 issued on Dec. 23, 2014 which is CIP of (#GGG-2011) U.S. Ser. No. 13/161,643 filed on Jun. 16, 2011 now is U.S. Pat. No. 8,783,936 issued on Jul. 22, 2014

The current invention is a continuously filing of co-pending filing U.S. Ser. No. 12/950,017(#CCC) Multiple surface LED light filed on Nov. 29, 2010 with rotating device has LED light device(s) and USB device and Outlets device built-in on the rotating substrate with more than one surface to offer multiple function.

The (#CCC) U.S. Ser. No. 12/950,017 Filed Nov. 19, 2010 (Now is U.S. Pat. No. 8,998,462) is continuously filing for (#R) U.S. Ser. No. 11/806,285 (Inventor's #R) filed on May 31, 2007 which also a multiple functions LED light device which are the continuously filing of the U.S. Pat. No. 7,318,652 (Inventor's #B) for multiple functions Wall Cover filed on Mar. 31, 2005. The current invention is continuously filing of U.S. Pat. No. 7,651,365 (Inventor's #F) filed on Jan. 15, 2005 which is CIP of Oct. 1, 2004. It is the CIP of U.S. Pat. No. 7,810,985 (Inventor's #A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

And this filing case is Continue of following parent filing case:

This application is a continuation of U.S. patent application Ser. No. 14/444,703, filed Dec. 31, 2013, which is a continuation of U.S. patent application Ser. No. 13/161,643, filed Jun. 16, 2011, now U.S. Pat. No. 8,783,936, each of which is incorporated by reference herein.

The current invention is continuously filing of co-pending filing (#CCC) U.S. Ser. No. 12/950,017 multiple surfaces LED light filed on Nov. 29, 2010 with rotating device has LED light device(s) and USB device(s) and Outlets device built-in on the rotating substrate with more than one surface to offer multiple function(s).

(#CCC) U.S. Ser. No. 12/950,017 Filed Nov. 19, 2010 (Now is U.S. Pat. No. 8,998,462) is continuously filing for (#R) U.S. Ser. No. 11/806,285 (Inventor's #R) filed on May 31, 2007 which also a multiple functions LED light device which are the continuously filing of the (#B) U.S. Pat. No. 7,318,652 multiple functions Wall-cover filed on Mar. 31, 2005. The current invention is continuously filing of U.S. Pat. No. 7,651,365 (Inventor's #F) filed on Jan. 15, 2005 which is CIP of Oct. 1, 2004. It also the CIP of (#A) U.S. Pat. No. 7,810,985 file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (#FFF) U.S. Ser. No. 13/117,227 filed on May 27, 2011 for Universal Module has USB-Unit(s) or/and Outlet-unit(s) for variety of electric or digital-data device. This application is a continuation of U.S. patent application Ser. No. 14/444,703 filed on Dec. 31, 2013, which is a continuation of U.S. patent application Ser. No. 13/161,643 filed on Jun. 16, 2011, now U.S. Pat. No. 8,783,936 is incorporated by reference herein. This application is a continuation of (#GG-11) U.S. patent application Ser. No. 13/161,643, filed Jun. 16, 2011, now is U.S. Pat. No. 8,783,936 incorporated by reference herein.

This application is has subject matter in common with the inventor's (#FFF) U.S. patent application Ser. No. 13/117,227 filed on May 30, 2011, and entitled "Universal module of USB-unit or Outlet-units for electric or digital data device(s)." The current invention are continuously filing of co-pending filing (#CCC) U.S. Ser. No. 12/950,017 multiple surfaces has USB and LED light filed on Nov. 29, 2010 with rotating device has LED light device(s) and USB device and Outlets device built-in on the rotating substrate with more than one surface to offer multiple function.

This application also has subject matter in common with the inventor's (#I-1) U.S. patent application Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on, Nov. 6, 2012 issued (later than parent filing date)

These parent filing case cover all desktop items and lighting device and desk top items. The current invention and related filing case has features at least cover as below feature and function including:

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527,629, 12/622,000, and 12/624,621 has below details filing and issued date (#I-1) Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on, Nov. 6, 2012 issued (later than parent filing date)

The said universal-kits or universal-module have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (#I-1), U.S. Pat. No. 8,305,846 (#J-2), U.S. Pat. No. 8,231,246 (#EE-1), U.S. Pat. No. 8,002,456(#GG-08), U.S. Pat. No. 7,726,839(#V-08), U.S. Pat. No. 7,726,841(#W-08), U.S. Pat. No. 7,726,869(#Y-08), U.S. Pat. No. 7,618,150 (#S-07), and U.S. Pat. No. 7,722,230(#AA-08) and U.S. patent application Ser. No. 12/566,322(#M-1), Ser. No. 12/073,889 (#X-08), Ser. No. 12/894,865(#T-1), Ser. No. 12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000(#HH-09), Ser. No. 12/295,562 (#HH-1) also utilizes concepts shared by the present invention.

FIG. 1 is a front view of a desk top item (100) with LED (136) and USB-unit(s) has USB Charging-port(s) (108') (112) as above discuss specification released on 2007 and upgrade on 2010 which can have charging capacity minimum 1.0 Amp to 5 Amp or higher however The USB Charging-port(s) (108') (112) do not have digital data or electric data delivery while need such big and quickly charging speed. So, before 2007 all the charging from the out-of-date USB port is too small current carry and only can supply 500 ma or lower charging capability and may has the overheating for fire risk. So from 2007 to 2010 come out the current invention's said USB charging-ports has more strictly for USB Charging port(s) (108') (112) material and all details so can allow to quickly charging from minimum 1.0 A to 5.0 Amp and from 2007 to 2015 come out more higher for 2.1 Amp or 2.4 Amp so can combine to big current charging as FIGS. 32A1, 32A2, 32B1, 32B2, 32B3, 32B4, 32C1, 32C2, 32C3, 32C4, 32C5, 32C6, 32C7, 32D1, 32D2, 32D3, 32D4 including one USB-unit, USB-module, Sealed-unit, Universal-unit, or USB module which same as USB power station can have 4.8 Amp, 7.2 Amp, 9.6 Amp for public area for many people use at same time.

The current inventions disclosure the time-table and USB development on the above discussion to make clear different for USB Charger limitation before 2007 and also make big difference for any USB Charging-port preferred only has Charging-Function and not have the digital/electric data delivery while for USB Charging ports if want to get safety and quickly Charging capacity as above reports shown evidence.

From FIG. 1, the USB-Unit(s) has USB Charging-ports (112) (108') for charging the energy-storage unit or assembly including the rechargeable batteries (not shown) inside the other electric or digital data device(s) according to a first preferred embodiment of the invention which has 2 USB-ports (112) (108') and 1 outlet-port (114) at the front/top/side of compartment or organizer or base for easily use by consumer. It is appreciated that some applications the said outlet-port(s) preferred to put on back because for some concerns for high-voltage output. The location for the USB-Unit(s) or Outlet-unit(s) preferred to arrange on desired easily reachable location of the LED desktop or floor-light items housing so people can easily to reach without move or turn direction of the items for every time to charge the other be-charged device(s). However, for Outlet-unit(s) or Outlet-Module(s) can put on back because it ONLY SUPPLY power to the other electric device(s) such as printer, scanner, Fax machine which can just one time plug and not every-day need to plug into the Outlet-unit or Outlet-Module. The laptop carry computer need every day repeat use Outlets-Unit or Outlet-Module so need to put on front or sides for easily operation.

The first preferred embodiment (100) is a 12 LED USB light powered by a USB plug-wire (122) (124) (126) which can be a USB-plug (126) to connect with outside transformer (226T of FIG. 3) or AC-Plug (226AC of FIG. 3) has wire from different outlet to get AC power source.

From FIG. 3 shown the $1^{st}$ type: The AC Plug Wire (124) (124') to get DC current from external transformer (126) can connect with the circuit-kits (inside transformer) which outside the desk lamp housing has at least one of the transformer (226T of FIG. 3) to change the outlet's AC current into $1^{st}$ DC current at outside AC-to-DC circuit-kits (inside transformer) has the USB-receiving port(s) (226-4 of FIG. 3) to accepted the USB-Plug-wires (226-5) to build the 1st DC current delivery from Outside AC-to-DC circuit-kits (inside transformer) housing to the Desk Lamp housing (202). Or From FIG. 3 shown the $2^{nd}$ type: The AC-Plug wire (226AC of FIG. 3) can connect with the AC outlets power-source and get the AC current into the inside desktop or floor-light housing's AC-to-DC circuit-inner (226-6 of FIG. 3) which has at least one of the transformer or AC-to-DC electric-system (not shown) to make the input desktop or floor-light housing AC current to change to 1st DC current and has other electric parts & accessories such as DC-to-DC circuit or related electric-parts & accessories to adjust and arrange to the $2^{nd}$ or more DC current and deliver the $1^{st}$ or/and $2^{nd}$ and/or more desired DC current to said USB Charging-port(s) or/and to LED light source and/or added additional-function(s).

The said both $1^{st}$ type or $2^{nd}$ type of AC-Plug wire (122) (124) (126) or AC-plug wire (226AC of FIG. 3) are preferred plug to get AC power-source. From FIG. 1 and FIG. 2, the said USB-plug-wire (112') (112") or USB-ports (112) (108') both has the said 2007 specification quickly charger USB charging-ports and includes an adjustment arm or bar or stand or pole (106) (206). Hereof, the 12 LEDs (136) or alternative LED(s) or LED-bulb is built-in or replaceable or detachable or movable offering the area or accent or night time use illumination which belong to the current invention for LED desktop or floor lighting existing functions.

From FIG. 1 the alternative design is to get external transformer (126) which has built-in AC-to-DC circuit to create desired USB Charging-port (108) (112) needed current input into the said LED desktop or floor-light items (100) and the said USB-Charging-port(s) (108') (112) to export the DC current to outside other be-charged items which is only use conductive-piece (108) to deliver the said external transformer output USB-Charging-port need current to the said USB-charging-port(s) current input-end(s) so no need any other circuit(s) need to change external transformer output DC current that is input-into the input LED desk-top items current. The said conductive-piece without changing any input-current but the said conductive-piece(s) is still belong to the said one of DC-to-DC current definitions even it just pair of electric-conducive wires or piece.

FIG. 1 is a front view of desk top items (100) has built-in LED light source (134) having current invention definition for USB-unit(s) (inside not shown) has USB charging-port(s) (108') (112) 2010 release spec which can charge energy storage unit or assembly up to 1.0-5 Amp or higher and the said USB Charging ports only can charge the energy storage unit or assembly without any digital data transmit functions. The $1^{st}$ embodiment (100) can charge rechargeable batteries inside other be-charged electric or digital data device(s) minimum from 1.0 Amp or higher as 2010 definition of USB Charging-ports and, according to a first preferred embodiment of the invention, which has 2 USB-units (108') (112) and 1 outlet-unit (114), built-In or detachable or replaceable 12 LEDs (136), and is powered by a AC plug-wire (124) from outside housing transformer (226T) the said AC-to-DC circuit change the AC current to DC current from AC outlets. The said USB charging-port(s) which can supply more higher than 1.0 Amp so can work with 2010 definition quickly charging USB charging-port (108') (112) which has min. 1.0 A up to higher amperage after 2007 and reissue on 2010. The said AC wire (124) to connect with AC-to-DC transformer (226T) to get DC current into female receiving-adaptor and supply DC current only through the pair of conductive-wires to USB receiving-port (108') (112) to allow build the electric deliver.

FIG. 2 is a side view of the LED desktop-light or floor-light items of the first preferred embodiment, the inner side (250) of the 12 LEDs (236) is a lighted-mirror or lighted magnify-lens or lighted magnify-mirror (251) which can show the image to let people to see or magnified-image or text or reflected-image or create lighted-objects to become super big size to let people can easily read and use the flexible hose (206) to bend and/or to fix distance against the tiny objects to let people not hold by hand for long time.

FIG. 2 is a side view of the first preferred embodiment of a LED desktop or floor item (200) with built-in or detachable or replaceable LEDs (236) and 1 USB-unit (208) and 2 outlet-units (212) (214) on the side or desired location of the base or compartment or organizers.

The at least one of built-in or detachable or replaceable LED light-source for this embodiment is 12 LEDs (236) or alternative LED-bulb, or equal functions COB or others. The current one of preferred embodiment has the USB-Plug (226) and wire (224 (222) is one of built-in or plug-in to the said LED desktop-light or floor-light housing. As above FIG. 1 discussed $1^{st}$ Type prefer model which powered LED light (136) and is powered from the USB plug-wire mean (122) (124) (126) and has USB Charging port(s) (108') (112) to quickly charge the energy storage unit or assembly including rechargeable batteries (not shown) inside the other electric or digital device.

FIG. 3A and FIG. 3B shows the preferred working charter for same AC power source though the different AC-to-DC circuit which is built-in-housing or external-transformer and though the circuit-kits, circuit-inner get the $1^{st}$ DC power at desired DC voltage and also optional has the AC current arrange to supply AC current to said Outlet-unit or outlet-module. The $1^{st}$ DC current can directly to offer to the LED light source, or to the USB charging-port, or to the added additional-function(s) depend on different consideration. It also can has the more than one of IC or DC-to-DC circuit (including conductive-wires or piece) or more than one circuit-inside to make change or adjust or arrange for $1^{st}$ DC-current to $2^{nd}$ DC-current or more desired DC-current(s) to supply to the Built-in LED, LED bulb, EL element, organic EL element (Or called OEL), or other DC operated IC, sensor(s), wireless signal receiver, switch, download APP, or other added additional-functions.

From FIG. 3A and FIG. 3B shown all preferred circuit(s) combination or system. The brief description as below;
→This is AC power source connect outside AC-to-DC transformer for $1^{st}$ DC current.

3A-A: (a) The $1^{st}$ DC-current is (5V DC→Directly to offer to quickly USB-charging-ports) by pair of conductive-wire or piece to deliver the input $1^{st}$ DC-current to input-end of USB-charging-port(s), and/or
(b) supply the $1^{st}$ DC current (5 VDC) though the DC-to-DC circuit (including just pair of conductive-piece), or IC, wireless-receiver or sensor or switch or more than one of the circuit-inside to get $2^{nd}$ or more DC-current at DESIRE Voltage→To make operation for the Built-in LEDs or DC-current operated light source or optional other added additional-function(s) such as air-flow device, time/date/calendar/weather displayer, audio system, air-freshener, fragrance-spray, humility-diffuser or others $2^{nd}$ LED accent or night time use light, and/or;
(c) Optional can add the separated AC wire or conductive-piece to supply the AC-current to the inside Outlet-unit or Outlet-module input-end to supply AC-current to AC-operated related products having AC-prongs or AC-Plug-wire.

3A-B: (d) The $1^{st}$ DC current is ANY DESIRED DC-Voltage which may higher than USB charging-port(s) DC 5 Volt but good to directly or through DC-to-DC circuit to supply to the DC-operated built-in or replaceable or detachable LED(s) or LED-bulb or other DC-operated electric parts & accessories or elements for desired functions. And Also;
(e) The $1^{st}$ DC current through the IC or DC-to-DC circuit or more than one of circuit-inside to change the $1^{st}$ DC current to $2^{nd}$ DC current has 5 Volt DC so can through the change or adjust to give the current to the said USB charging-ports for right USB output-end current to meet Quickly USB charging-ports requirement, and/or;

(f) Optional to has AC current which get from AC wires which may inside the custom made special outside transformer (3A-B-T) or is separated AC wires outside the market regular 6,9,12, 24 DCV transformer to save the cost to make the special custom-made transformer and Also;

(g) OPTIONAL to has the $2^{nd}$ AC light-source which has built-in AC-to-DC circuit to allow the AC-current can operate the said $2^{nd}$ AC light-source which is not same as the above LED(s) or DC powered light source.

From FIG. 3B

→This is AC power-source connect directly and get into housing for $1^{st}$ AC current and connect with inside AC-to-DC circuit or transformer system to get $1^{st}$ DC current.

3B-A: (h) The $1^{st}$ AC current is (110-250 Volt AC-current) though the inner AC-to-DC circuit or transformer or more circuit-inside including DC-to-DC circuit(s) to change or arrange the $1^{st}$ DC current is (5V DC)→Directly to offer to quickly USB charging ports; and/or (i) The $1^{st}$ AC current is (110 to 250V AC-current) may go through the inner IC or more circuit-inside or sensor, switch, wireless receiver kit, or controller(s) to supply the AC-current to the $2^{nd}$ or added additional-functions that is AC-operated light-source with pre-determined built-in circuit(s) including the light-source has built-in AC-to-DC circuit so can use market available all kind of CFL bulb, fluorescent tube, cold cathode/neon tube, energy saving bulb, LED bulb has screw base or other base can fit into without any problem for limited the only DC-current operated LED bulb, and/or (j) Optional has the AC conductive wire to connect with Outlet-unit or outlet-module or universal kits or sealed unit which has built-in AC receptacle kits or assembly.

3B-B: (K) The $1^{st}$ DC current has higher DC voltage and big Amperage and though the said IC or DC-to-DC circuit, or more than one of circuit-inside help to changed or adjust or arrange to DC 5 Volt so can make USB Charging-port output end has 5V DC current to charge other products' inner rechargeable batteries. Also;

(L) The 1st AC current is (110 to 250 V AC-current) may go through the inner IC or more circuit-inside or controller(s) to supply the 110V AC-current to the AC-operated light-source which has built-in circuit so can use 110V AC-current to make functions including CFL-bulb, fluorescent tube, cold cathode tube, energy saving bulb, LED-bulb has screw base or other types of base, and/or (M) Optional has the $1^{st}$ AC-current has conductive wires to connect with the outlet-unit or outlets-module to deliver the AC-current to be-supplied other products, and/or (N) Optional has the $1^{st}$ DC current come from inside-housing AC-to-DC circuit or transformer-system is higher DC voltage which may from market available existing AC-to-DC transformer which has 6, 9, 12, 15, 18, 24 Voltage to supply power to the DC powered light source or other DC power products or get desired functions. Also;

(0) other circuit and AC-to-DC and/or DC-to-DC or conductive-piece combination to get desired AC or DC or both current to supply for desired light-source, USB-port(s), outlet-port(s), or combination, and other desired added additional-functions by AC-plug-wire, USB-Plug-wire or both or any combination for desired plug, wire and connectors.

FIG. 3 shows a first design of a second preferred embodiment (202) of the invention having the outside transformer (226T) connect with AC power-source which get power from the any kind of outlet by prongs (252) of external transformer (226T) or regular AC-Plug & Wire (226AC) and the said LED desktop-light or floor-light item having 3 receiving-prong(s) including 2 USB Charging-port(s) USB-unit(s) (208) or one Big USB-Module (not shown) inside the housing with different power output (2 USB units has 3 USB-ports and 2 outlet-unit and each has 1 outlet-port) to charge the energy-storage unit or battery-assembly by USB Charging-ports (208) or SUPPLY AC-current power by outlet-unit (214) for different electric or digital data device(s), for example 1,000 ma, 2,100 ma, 2,400 ma, 3,100 ma, 4,500 ma, 6.9 Amp, 9.0 Amp or other current depend market wanted for family or office use need a big charging capacity to charge in short time (D.C. current output from 2 USB-units has 3 USB charging-ports or much more ports for much higher Amp current on 5.2 volt DC-current) and A.C. current output from the 1 outlet-unit (214) to SUPPLY to different AC-operated electric or digital data device(s). For examples, the said iPhone™ and iPad™ for DC current by USB-unit's (212) USB Charging-port(s) (208), and other AC-operated device such as laptop computer for AC-operated items by outlet-unit (212).

The said LED desktop or floor light device can supply DC or AC or both current to different requirements items for charging DC or supplying AC current. Here of the Desktop or floor lamp has the at least one or more built-in or detachable or replaceable or movable DC or AC or Both light-source available from market place for any desire type including bulb, CFL, fluorescent tube, or Energy saving light source, EL or OEL, LED. And all the AC-operated light-source has built-in circuit so can work with AC-current that have to install on the inside lamp holder including CFS bulb, LED-bulb, or PCB holder but not including the incandescent or filament bulb(s) which just only AC-current without or lack-of any built-in circuit to get desired operated-current.

From FIG. 3 show the more than one circuit-inside (226-6) is a adjust-circuit #2 for charger and circuit #3 (226-7) is for illumination or controller and switch (226-8), the inside housing has plurality of conductive-wires to deliver the current from outside transformer (226T) get into the housing (216) and through the AC-to-DC circuit (226-2) or circuit-inner (226-2) and more than one of circuit-inside (226-6) (226-7) are Circuit #2 and Circuit #3 to adjust or change or arrange the $1^{st}$ or $2^{nd}$ or $3^{d}$ or more desired DC current to light source, and/or USB Charging ports. And/or added additional-function(s) as above FIG. 3A, FIG. 1, FIG. 2 shown and details.

FIG. 3 a first design of a second preferred embodiment (202) which has 2 USB-unit(s) (212) has USB charging-port(s) (208) to charge DC-current to the energy-storage units or assembly by the said USB Charging-port(s) has minimum 1.0 Amp, and an outlet-unit (214) has outlet-ports (210) to supply the AC-current to the prong(s) of the said other be-supplied electric or digital device. Both has different power type and output to use USB charging-port(s) to charge or use outlet-port(s) to supply different current to the said other be-charged or be-supplier electric or digital data device(s).

The USB-unit(s) (212) has USB charging-port(s) (208) which has minimum DC-current charging capacity at 1.0 Amp which equivalent 1,000 ma, or higher Amperage such as 2,100 ma or 3.4 Amp or 4.8 Amp, 8.2 Amp, 9.6 Amp or more powerful-units to charge the rechargeable batteries inside of the different be-charged electric or digital data device(s) such as an iPhone™ and iPad™ that have different requirement for charging current.

The Outlet-unit (214) has outlet-port (210) which get AC-current power from the outlet's power-source which has unlimited AC current and will go through the conductive material and piece or assembly to supply the power to the outlet-unit (214) at the LED desktop-light or floor-light items housing to the prongs or plug while the male prongs of the other electric or digital device insert into the said desk lamp outlet-port(s)(210).

FIG. 4 shows a second design of the second preferred embodiment (400), which has 2 USB-units (412) (412') has 3 USB charging-ports (408) here prefer the 2 USB-port unit has 2.4 Amp+3.1 Amp=5.5 Amp and 1 USB-port USB-unit has 3.1 Amp so total has 8.6 Amp can very quickly charge the be-charged products in short time and 1 outlet-unit (414) has 1 outlet-port (412) to allow people to charge by USB charging-port (408) or supply power by Outlet-port (412), for example, DC current from USB Charging-ports (408) for an iPad™, iPhone™, and AC current from outlet-port (412) for laptop computer or other device which can get AC current power from the outlet-unit. The USB-unit get power from outside transformer (426T), adaptor (426T), inverter (426T) to get desired $1^{st}$ DC current and the outlet-unit get AC power while AC prong (426) connect with wall-outlets and directly deliver AC current same as wall outlets current to outlet-unit (414). Hereof, the Desk lamp is non-LED light source lighting because the outside transformer (426T+AC) is a special custom made model has extra AC conductive wire so can offer the extra AC current into housing and operate the AC power light source including CFL bulb or incandescent bulb or other AC power source or other electric products powered by AC current, or one piece super powered LED light source or plurality of LEDs install on PCB powered by DC current from transformer output-end DC current. The USB charging-port export-end DC 5V get from $1^{st}$ DC current which may higher than DC5 Volt and though the more than one inner-circuit (charger adjust circuit) (light circuit) or DC-to-DC circuit or IC to make the higher voltage $1^{st}$ DC current change or adjust or arrange to DC5 Volt so can safety to charge the energy storage device.

FIG. 4 shows a first design of a second preferred embodiment (400) of the invention having the external transformer (426T+AC) to get the AC or DC or both power-source which get power from the outlet (not shown) by prongs (426) and the said LED desktop-light or floor-light item (400) having 2 USB-unit(s) (412) (412') with different power output (2 USB units has 3 USB-ports) including 3.4 A from USB-port (412') or 2.4 A from USB-port (412) which has its 3 USB Charging-port(s) and the 2 USB-charging-port(s) can be share 3.1 Amp DC-current and each-port(s) has minimum 1.0 A charging capacity to charge the energy-storage unit or assembly including rechargeable batteries inside of the computer, communication, or consumer electric products including the power-bank which has a lot of rechargeable batteries assembly inside. This embodiment mainly to have over 2. lamp including 3.1 Amp, 4.2 Amp, 5.3 Amp, 7.2 Amp to allow people can charge the iPhone™ and iPad™ such at same time form 1 USB-unit have two-ports, higher of Amp for each of two ports-unit can charge pair of the said iPhone™ and iPad™ for DC current for less period of time needed.

And 1 outlet-unit (414) has 1 outlet-port (410) has different current and to supply the AC current into the said other be-supplied electric or digital data device(s)'s while the male-prong(s) of other device's insert into the said outlet-unit's female receiving-port(s) (410). The one of other be-supplied products is a laptop computer for AC current to operate the different function to meet market requirement. Here of the Desktop-lamp or floor-lamp has the light-source available from market place for any desire type including AC-powered light source with built-in circuit to make it desired functions including LED bulb, CFL, fluorescent tube, or Energy saving light source, or DC powered light source including EL, OEL (Organic Electro-luminescent element or light source), LEDs or LED-bulb(s). Both for AC or DC or both operated light-source(s) is one of built-in or replaceable or detachable or movable construction for different market requirement with shade or cover or housing for get pre-determined light effects, accent, color, shape.

FIG. 4 shows a second design of the second preferred embodiment (400) which has 2 USB-units (412) (412') and 1 outlet-unit (414) to allow people to charge DC current power to an iPad™, iPhone™ by the USB Charging port(s) (408), or supply AC power to the laptop computer, or other device by outlet-unit(s) (410) or outlet-Module(s)(410). Both can get power from the USB-unit(s) (408) or outlet-unit (410). The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) Installation location
(c) Installation space, compartment, room, housing, construction
(d) USB Charging-port 1.0 A, 2.1 A, 3.1 A, 1.2 A, 2.4 A, 3.6 A, 4.2 A, 4.8 A, 7.2 A, 9.6 A or any combination for the USB ports
(e) Power source come from: (e-1) AC Plug wire, (e-2) USB plug wire, (e-3) Outside housing Transformer, or invertor, or adaptor, or converter (e-4) back-up battery for power fail-time to turn on desired light-source, (e-5) separated battery for time/date/calendar/temperature display for non-shut-down power. (e-6) Function of desk top items: The desktop item its original existing function for examples The lighting device offer the area illumination or as above discussed products.

Figure 5:
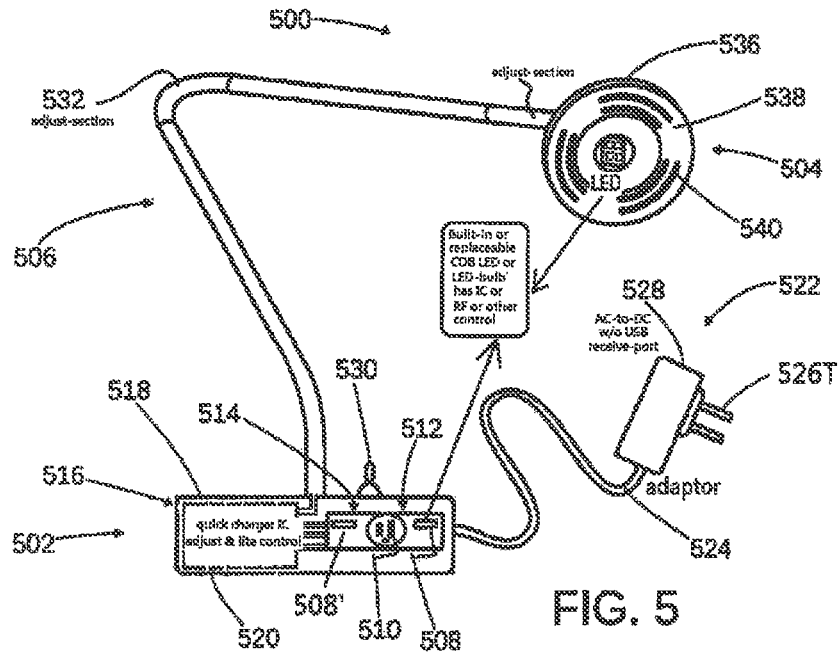
FIG. 5 is an isometric side view of the desktop system in a fourth embodiment and front of horizon-arm or bar or tube have built-in or replaceable Chip-on-board (COB) or LED-bulb for wider angle illuminations.

FIG. 5 shows a third preferred embodiment of a desk top item (500) in the form of an LED desktop-lamp or floor-lighting fixture with adjustable arms (506) to enable adjustment of the height, orientation, direction, and/or angle of the LED lamp (500) to provide the best illumination. The built-in 1 USB-unit (512) has 2 USB charging-port (508) has minimum 1.0 Amp or higher charging capability here preferred each USB-port is 3.1 Amp so 2 pcs has 6.2 Amp to quickly charger the be-charged device(s) and 1 outlet-unit (512) has 1 outlet-port (514) built into one sealed-unit or one module that has a lower cost than the above-discussed items while apply or incorporated with (1) a plurality of separated-piece of the said USB-units and outlet-units, or (2) use the existing UL or test lab. Approval unit directly to install on recess-construction base so no need to have built-in AC-to-DC or external transformer unit. Wherein to apply or incorporate with the base with recess-construction on bottom will allow to incorporated safety approval USB-module or Outlet-module or Both to quickly add inside the recess-construction base or flat-back of the said LED desktop or floor-light product or cosmetically single-side mirror back surface by traditional fix or attachment or chemical compound or glue or screw or rivets or double-side tape. Also, the recess-bottom base also can have co-inventor's wire-arrangement U.S. Pat. No. 9,559,472 U.S. Ser. No. 13/870,253. Or Desktop USB power station with added items U.S. Pat. No. 9,488,364 U.S. Ser. No. 13/870,447 both is issued later than the current invention parent filed case (#GGG-5-1) U.S. Ser. No. 14/858,838 filed on Sep. 18, 2015 now is allowanced From FIG. 5 is powered by a UL listed adaptor (526T) OR transformer (526T) plugged into a outlet that supplies 110 Volt AC-current and transfer by adaptor (526T) to $1^{st}$ DC-current for USB-unit (510) has 1 USB charging-port (508) or though the more than one of circuit-inside, DC-to-DC circuit or IC to change $1^{st}$ DC to desired voltage $2^{nd}$ or more DC-current for USB charging-port output-end (508) has DC 5V for charger, rather than by a USB plug and wire (not shown) before 2010 for quickly charging-capacity type which is out-of-date earlier than USB Charging-ports definition release on 2007 and update on 2010 for charging higher than computer old-USB port's only supply 500 ma and had heat issues and problem. The 2007 and 2010 new USB Charging-ports has minimum charging capability 1.0 Amp up to 5 Amp and Not Allow the digital data delivery while Charging the said energy-storage unit or assembly which may is rechargeable batteries. Any out-of-date before 2007 USB charger is not possible to get safety and steady and quickly charger compare with 2007 release and 2010 update for new USB Charging-ports which has non-over heat and has NO digital data delivery while charging.

FIG. 5 shows a third preferred embodiment (500) of a desktop or floor item in the form of an LED lighting fixture (536) with adjustable arms (506) to enable the built-in or detachable or replaceable LED light-source LED lamp to be moved to a desired height, orientation, direction, and/or angle to get the best illumination to people for working, study or cosmetic purpose. The built-in USB-Module or Outlet-module which has 2 USB-units (512) (512') and 1 outlet-unit (514) inside one USB or Outlet-Module which have a lower cost than other above-discussed 2 separated USB-units (512) (512') and separated 1 outlet-units because they do not need to be made as compact and only need one housing for Module or Universal set so can save some cost for housing number(s). The desktop or floor application LED light item is powered the transformer (526T) or a UL listed adaptor (526T) that receives power from a outlet power-source for 110 Volt AC current rather than the USB plug and wire of the above discussed preferred embodiment. This is kind of DC current from outside housing transformer (526T) already changed from AC to DC current can save a lot of work and labor for inner circuit because no need change AC to DC inside the desk top or floor LED light items housing. The inside housing circuit can be a simple only need 2 conductive-wire or piece can deliver transformer output-current go directly to USB-ports needed current, or add other functions such as light sensor, photo sensor, motion sensor, blue tooth, infra-red wireless controller, wireless controller with WIFI, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

Other features of this kind of Module or Universal-kits can be a finished product with safety approval certification so can just simple to attached on flat-surface or recess-construction-bottom of base of desktop items. This will be very convenience just use all wall plug-in USB or Outlet module which has USB-port(s) or Outlet-port(s) or both to change the 2 prongs to AC-plug-wire and add 2 conductive-wires to connect with LED light source and its related circuit so can directly fasten or install on fix or assembly on the said flat-surface or section or area or recessed-construction bottom of base. This no need any built-in housing or external transformer AC-to-DC circuit and DC-to-DC circuit and/or other parts to make the desktop or floor LED light-device with USB-port or Outlet-ports or both for FIG. 1, 2, 3, 4 above discussed preferred embodiments.

Basing on the convenience to apply the USB and/or Outlet module or Universal-unit so the current invention become very simple and can instant to upgrade non-USB and/or Outlet for charging or supply AC-current LED desktop or floor light-device to become the upgrade LED light.

Wherein, the said module or universal-unit for all over the world so no need to change any inner circuit just change the plug-in prongs to AC-plug having 2 conductive-wire to connect with LED light-source(s) and its circuit. No need the said external transforme for single supply only the one specification of DC current, and no need prong(s) specification because no need plug-in wall outlet, then, This is most simple to incorporated the safety approval for USB and/or Outlet module or universal-kits for LED desktop or floor lighting items with same pre-determined light-performance, USB and/or outlet ports to charge or supply DC or AC or both current to other be-charged or be-supplier other electric products.

Figure 6:
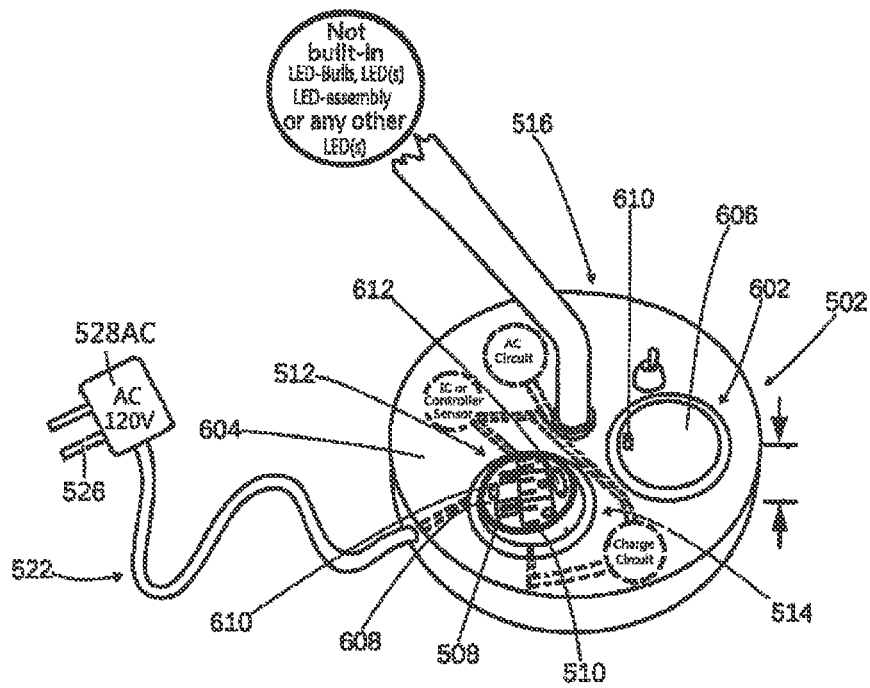
FIG. 6 is an isometric view of the base unit of FIG. 5 in an alternate configuration and light-source can be COB LED, LED(s), LED-assembly, LED-bulb for non-built-in type(s).

From FIG. 6 show other preferred embodiment has AC plug & wire (528AC) to get outlets power-source and AC-current get into housing. The 110V AC-current through the inside housing AC-to-DC circuit or transformer (Not shown) to get the $1^{st}$ DC current and the $1^{st}$DC current can be (A) 5 Volt DC-current by inside circuit (Charger Circuit) and can directly to USB output-end, OR (B) the said $1^{st}$ DC-current is DC 6/9/12/15/18/24 Volt DC-current is higher than USB-port needed current, and $1^{st}$ DC-current go through the inside more than one circuit-inside, IC, or DC-to-DC circuit to change or adjust or arrange the said $1^{st}$ DC current become $2^{nd}$ 5 Volt DC-current so can safety charge the other electric products. Here of the said Light source can be AC powered and get power from inside housing AC conductive wires (AC circuit) to make the AC powered light source built-in circuit can work the input AC-current to make the said AC light-source to operate pre-program functions including CFL, LED Bulb, fluorescent tube and other AC powered products to proper operation.

From FIG. 6 also shown the base has built-in Rotating multiple surface USB and/or Outlet Module or universal-kits or power station which has the built-in USB-module (510) has 2 USB-unit with 2 USB port (508) preferred for 2 USB ports has 2.4+2.4=4.8 Amp, Outlets-module (514) has 3 outlet-units with 3 outlet-port (512) and has controller (610) (612) to install the preferred motion sensor, touch/conductive switch, wireless communication device, wifi set, APP receiver and code setting device, remote controller, IP Cam or other added function for the said Universal-unit. Module-unit, USB-unit, Outlet-unit or the desktop item(s) while the said Desktop items has much thicker base so can install the said Rotating multiple surface USB and/or Outlet Module or universal-kits or power station inside the thicker housing.

From FIG. 6 shown the wired plug (528AC) has prong (526) has no any circuit inside so can deliver the wall-outlet 110 Volt AC-current direct to the USB and/or Outlet module or universal-kit install on recessed-construction-bottom of the base (516) 3 outlets to let people to connect with the desk top laptop, or speaker or lava light or other electric or digital devices which need 110 Volt AC current to operation. The said base not only has rotatable multiple surface USB Module or universal-kits or power station but also has additional outlet-nodule or outlet-universal-kits(s) to allow to charge or supply AC power to the other electric or digital device which need AC current input to make operation. It also can have more outlet-unit(s) up to 1 to N number (N can be any number) as long as the base can fit within the plurality number of the said Outlet-unit(s) so the current invention's desk top items base can replace the market existing power-strips which lay on the ground to supply the same 110 Volt current.

Figure 7:
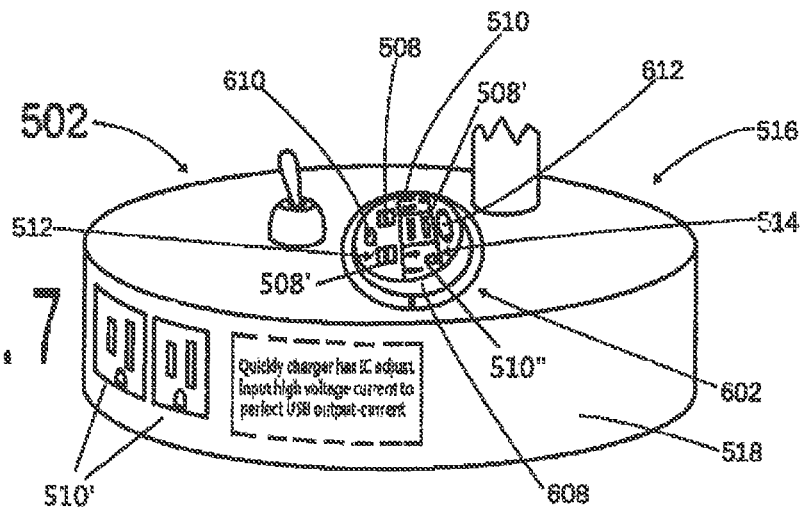
FIG. 7 is an isometric view of the base unit of FIG. 5 in an alternate configuration for one of multiple-surface USB-unit or outlet-unit or USB/Outlet Module, or USB/Outlet Universal-unit.

FIG. 7 also shows the fourth preferred embodiment (502), which The big base (518) of the Desk top item has sufficient space within so can install all kind of USB-unit(s) (512), Outlet-unit(s) (510), USB-module(s) (510"), Outlet-module(s) (510'), Sealed-unit (508') controller (610) (612) for all kind of operation for desktop items or products arranged into a rotating or non-rotating multiple surface power station (608) which has number of the said USB-unit(s), outlet(s) and/or Outlet-unit(s), Universal unit has number has relatively universal compartment, or space, or room to fit within, The said such big base (518) of the desk top item (502) can also be powered by wind power, chemical power, battery power, a generator, transformer, adaptor, inverter, inductor, etc. Also, the multiple surface Power station (608 of FIG. 6) has the inside IC or more than one of circuit-inside to help or adjust or change the input high voltage $1^{st}$ DC current to become a safety USB charging-ports DC 5 Volt current.

FIG. 7 shows that the base of the desk top item (502) of the first preferred embodiment incorporate with different LED light-source application (Light source is not shown) may be made thicker or higher to accommodate bigger size electric parts and accessories to save a lot of the cost of super compact, slim, or cute size electric parts and accessories. Furthermore, the thicker or higher base (518) can also accommodate a rotating USB-universal-unit(s) or USB-module that can be rotated from a first surface to a second surface so that the first surface of the USB-module will look nice when the USB-universal-unit(s) or module is not in use. Details of the rotating USB-universal-unit(s) or USB-module or power station (608) or said USB-module (608) can be understood from FIGS. 19, 20, 21, and 22, the details of which are explained in the inventor's PARENT FILING U.S. patent application Ser. No. 13/117,227(#FFF-11) and Ser. No. (12/950,017) (#CCC-10). It will be appreciated that the details disclosed in the co-pending application may be applied to the present embodiments without departing from the scope of the current invention.

All the above discussed the USB Charging-port(s) of current invention as the definition released on 2007 and update 2010 for (A) Quickly charger which minimum had 1.0 Amp to 5.0 Amp charging capability (B) While quickly charger with higher over 1.0 Amp capacity, not allow for any digital or electric data transit or deliver by same USB-unit or USB-Module or USB Charging-ports (C) the out of date earlier than 2006 has limited for charging capacity less than 500 ma or so and has risk for overheat because the USB-ports the specification or construction or conductive cross section is too few to carry bigger current go thought and cause over-heat and has fire risk (D) The USB charging-ports of current invention only allow one of input power-source for normal time or power-fail time. The current invention is not workable for more than one input power source current. During the normal time is AC and During power-fail time will use backup-DC battery power as input power which depend on the market requirement.

(E) The USB charging ports as current invention only has Charge DC-current by USB-ports or SUPPLY AC-current by Outlet unit. No any digital/electric data delivery or transmit for quickly charger USB-Port as current invention (F) The current invention has housing, space, compartment, organizer(s), room to install the said at least of USB and/or outlet port(s) and the related circuit and related electric parts & accessories inside the desktop desired housing which is same or separated with the USB and/or outlet ports locations, area.

(G) The current invention has movable, removable, Universal USB-Charger unit which has its safety certifications to install, movable, removable, replace the installation location or application and other features too.

(H) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device.

(I) The said USB-Wires has 2 male-plugs. The 2 male-plug can be any type including Type A, Type B, Type C or desired combination and number for desktop or floor LED light construction.

(J) The said USB-Wire has 2 male plugs, the every-one plug matching the USB-female receiving ports for Pins. Maybe the same or different on the size can be standard Type A, Type C, Mini USB, or Micro USB specification as long as the receiving-end match the Plug-in-end for pins.

Figure 8:
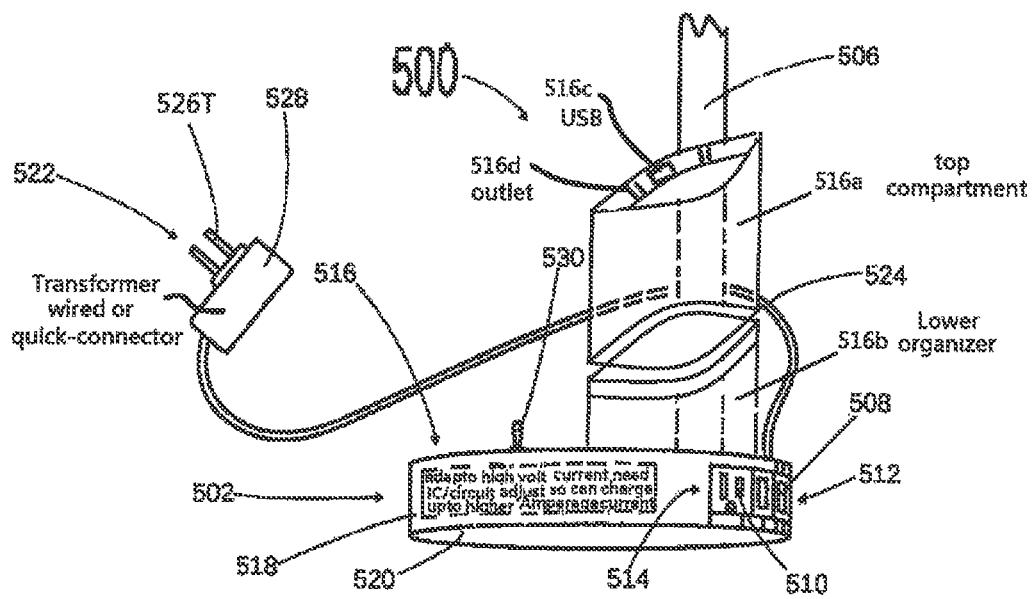
FIG. 8 is an isometric side view of the base unit of FIG. 5 in an alternate configuration and with added, movable, rotatable, replaceable compartment(s), organizer(s) to allow people to get extra-space for stationary, pend, jewelry, hair-clipper, bracelet, necklace, key, staple, staple-pins.

From FIG. 8 shows the first preferred embodiment (500) incorporate with different LED light-source application (Light source is not shown), which has a thicker or higher base (518) to provide a bigger space to arrange bigger size electric parts and accessories to save the cost of super compact, slim, or cute electric parts and accessories, and which also can load rotating multiple surface USB and/or Outlet Module or universal-kits or power station (608 of FIG. 6) which is parent filing (#CCC) as above disclosure which has built-in plurality of the said USB-unit(s) or a rotating USB-Module so that a first surface of the USB-module (608) or power station (608) will look nice when the USB-unit(s) or USB-Module is not in use. Details of the rotating USB module are shown in FIGS. 19, 20, 21, and 22 (page 11/22 to 13/22).

From FIG. 8 shown the outside housing transformer (526T) has prong (522) to connect with outlets from wall or extension cord to get AC power source and pass though the circuit-kits (528) inside the transformer (526T) to change the 120V AC to desired $1^{st}$ DC current and deliver by conductive wire (524) into the desktop item's base (518) which has the more than one of circuit-inside or IC or DC-to-DC circuit (as notes details) which to change or adjust or arranged for (5001) USB charging-port output-end DC current or for (5002) DC powered Light source or for (5003) DC powered other functions & products those use the $1^{st}$ or $2^{nd}$ or third or fourth DC current so can make the (5001-1) USB charging-port (5002-1) DC powered light source (5003-1) DC powered other electric products or controller or sensor or switch or IC or electric parts or accessories can work properly. Furthermore, the light source on the embodiment (500) can be a AC powered light source including CFL Bulb or Incandescent or fluorescent tube if the desktop items (500) incorporate the above discussed special custom made transformer (426 T+AC) as FIG. 4 discussed.

From the FIG. 8 also shown the preferred embodiment (500) which the said Desktop or floor LED-light item is a lighting has preferred light source may select from AC powered light source has its AC to light-source trigger circuit inside the light-source including CFL, energy saving bulb or fluorescent tube as light source(s) or others LED related light-source. The said LED-light-device which has big base (518) and the rear-side of base has 3 or plurality of the outlet-unit(s) from Number 1 to any number so it can connect with other electric or digital data devices to supply or charge the other devices. The special design for current invention's transformer (426T+AC) inside or outside base which not only supply the $1^{st}$ or $2^{nd}$ or $3^{rd}$ DC current to the USB-units and DC light source but also supply AC current to the said plurality of the AC Outlet-unit(s) while the said custom made special transformer, inverter, adaptor has special design for 110 Volt AC current not passing though the current changing circuit-kits of the said special transformer of the special model for current invention.

From FIG. 8 the plurality of outlet-units or Outlet-module can install on rear-ends or sides of base of the lighting device so it can have nice and net wires arrange on the surface such as desk top or floor for floor lamp base. This kind of arrangement for base of lighting device will save people to use a lot of power strips or power cords or extension cord which is ugly and occupied too many wall-outlet space and outlets. This is other feature for current invention has a plurality of Outlet-unit or outlet-module on the base of ling device. It can add the surge protection or over-heat protection or electric-shock protection or over-load protection for such more than 3 outlet-unit or 3 outlet-module so can have 1 more Plus feature of this Outlet-unit on the base of lighting device. It is appreciated the multiple USB and/or outlet port(s) application also can make like above discussed for apply or incorporated USB and/or Outlet module or universal-kits on recessed-construction bottom of base to hide the USB-module or Outlet-module or USB-universal-unit or Outlet-universal-unit or desired combinations of the USB and Outlet port(s) inside one housing to install or fix or glue of fasten or assembled inside recessed-area(s) or the said Bottom of the base of LED desktop or floor lighting. It is appreciated that this recess-bottom as the co-inventors (#SSS) (#TTT) for all its drawing not only can install module or universal-kits but also can install the wire-arrangement related construction and wires. It is appreciated the said co-pending (#FFF) (#SSS) (#TTT) all related drawing, concept, construction, idea for recessed-construction of USB and/or outlet module, universal-kits, power-station should be inside the current invention scope, coverage, claims for all above discussed fore recessed-construction of the bottom of base.

Figure 9:
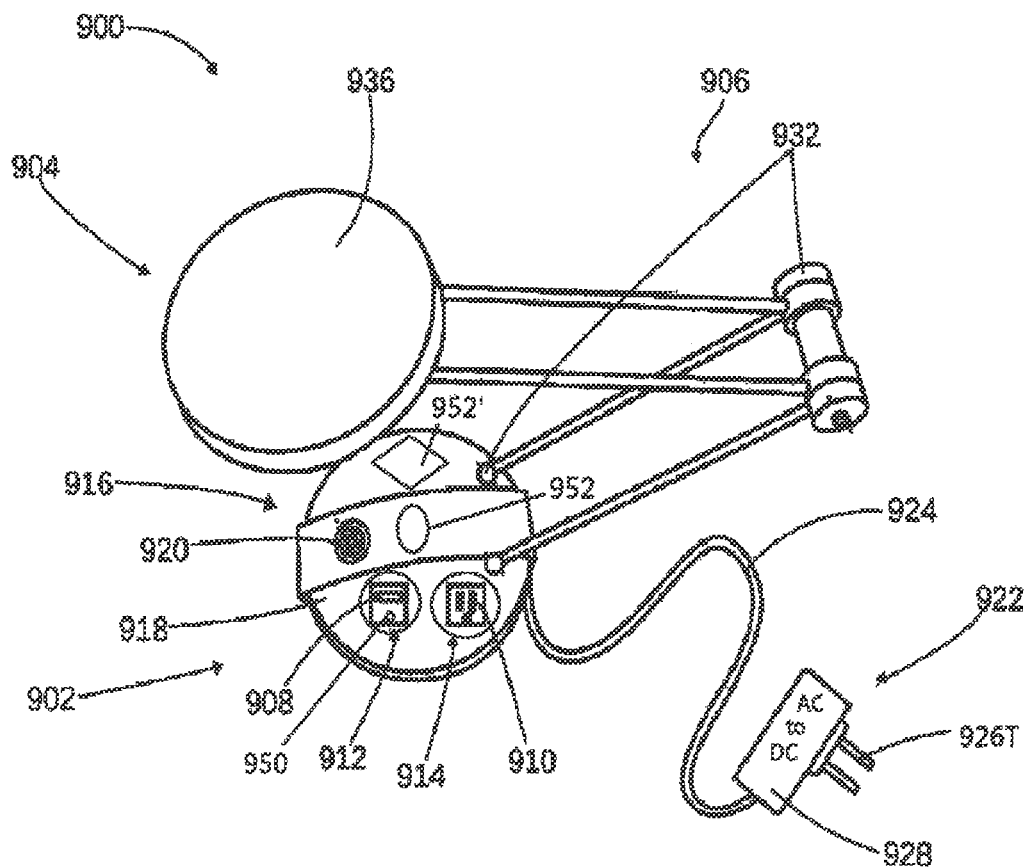
FIG. 9 is an isometric top view of the desktop system in a fifth embodiment of desktop or floor LED light device with desired length and adjustable-angle kits.
Figure 10:
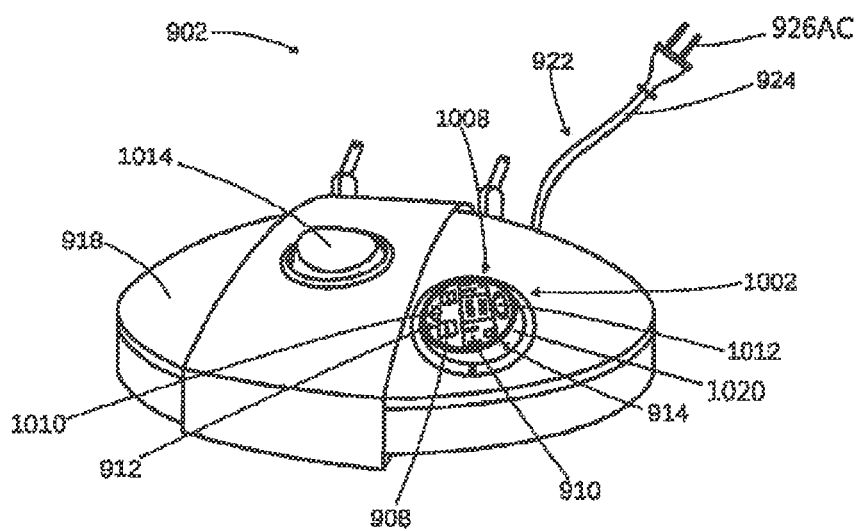
FIG. 10 is an isometric view of the base unit of FIG. 9 in an alternate configuration.

FIGS. 9, 10, show fifth (900) (902) and sixth (1100) (1102) preferred embodiments in which desktop or floor LED-lighting items (900) (1100) with DC light source including LED, LEDs, LED-Bulb, EL, Organic EL (OEL) also have a thicker or higher base (918) (1118), and which can add rotating multiple surface power station (920) (1020) or it can called USB-modules or outlet-module with a plurality of USB-unit(s) or/and Outlet-unit(s) or/and a plurality of other receiving means (hereafter as other-ports) to increase the number of function(s), feature(s), effect(s), and/or performance(s), the said rotating USB and/or Outlet Module or universal-kits or power station (920) (1020) or rotating USB-module or rotating outlet-module having more than 1 surface and the capability of changing the surface for different purposes.

From the FIG. 9 shown the any kind of light source (936) desktop or floor LED-lighting (904) which has 2 rotatable USB and/or Outlet Module or universal-kits or Module (912) (914) and each of rotatable module has built-in desire number of the USB-Units or/and Outlet-unit or/and USB-Module (912) or/and Outlet-module (914) or/and sealed-unit (912) (914) or/and universal-unit (912) (914) to get desired functions. It also has switch (952) or controller (952') to turn-on or turn-off the said Light source (936) for desk lamp (904). The base (918) has LED indicator light (950) on the rotatable module's surface to show the charging status. The Multiple surface power station 1 USB port can offer up to 3.1 Amp for quickly charger.

From the FIG. 9, shown the base of the said desktop or floor LED-lighting which may has any type of the light source which has the Rotatable module which has desire number of USB-Unit(s) or/and outlet-unit(s) and optional LED light-source for charging status indicator lighting. The said base not only has rotatable USB-module or USB-universal-unit and but also has additional outlet-unit or outlet-module(s) to allow to charge or supply AC power to the other electric or digital device which need AC current input to make operation.

From the FIG. 10 shown the thicker and curved base (918) for desktop or floor LED light (902) has desire light source (not shown) for illumination. The desktop or floor LED-lighting (902) has wired plug (926AC) to connect with wall-outlet and has AC current input into inside housing circuit-inner to transfer the wall-outlet's 110V 60 Hz or other home electricity-system current into USB-unit(s) needed the 1st DC current and also supply the wall-outlet's 120V 60 hz current to the Outlet-unit(s). The said bulb, florescent light or LED-bulb light source is turn-on or turn-off by the switch or sensor or remote control, or wireless, or blue tooth, or WIFI controller with update APP software can download from internet or other network so receiver is installed on the base surface. The said $1^{st}$ DC current also can be any other high voltage $2^{nd}$ DC current which voltage is higher than 5 Volt $1^{st}$ DC current for other DC products operation current only need to go through the DC-to-DC circuit or IC or more than one of circuit-inside can easily to change or adjust or arrange for all kind of DC functions or DC powered products on the said desktop items.

From the FIG. 10 shown the any kind of light source desktop or floor LED-lighting (902) which has 1 rotatable Module (1020) and rotatable power station (1020) or USB/Outlet module (1020) has built-in desire number of the
1. USB-Units (908) or/and
2. Outlet-unit (910) or/and
3. USB-Module (combine the 2 USB-units into one piece and in one housing or PCB) or/and
4. Outlet-module (combine the 3 outlet-units into one piece and in one housing or PCB) or/and sealed-unit (has more than one of UBS-unit(s) or/and
5. sealed-unit(s) (USB-unit of Outlet-unit inside a sealed housing) or/and 6. universal-unit (at least has one USB-unit or/and outlet-units has housing to fit into more than one of the housing or compartment which within many of the desk top items housing)

to get desired functions. It also has controller or switch to turn-on or turn-off the said Light source for desk lamp or desktop item's existing function(s). The one LED indicator light (950 of the FIG. 9) on the one of the rotatable module's surfaces to show the charging status From FIG. 11 and FIG. 11A shows a other preferred embodiment (1100) which is powered by solar power and stores the $1^{st}$ DC current which is solar electricity inside rechargeable batteries to provide enough $2^{nd}$ DC current power which at the lower DC voltage or higher DC voltage depend on the solar module and rechargeable batteries designed and the 2nd DC current to charge other electric or digital data device(s) through circuit-inside housing or IC or DC-to-DC circuit so can change or adjust or arrange the $2^{nd}$ DC current become 3rd DC 5 Volt DC current get into the built-in USB-unit(s) which has only conductive piece without any transformer outside or inside the housing of desktop items, and outlet-unit(s) incorporated with proper circuit-inside or DC-to-AC circuit or IC, or controller for quickly charging capacity, or voltage pump-up circuit, so can offer the AC power to AC products or functions to meet market requirements. The current embodiment (1100), the Solar or chemical powered Desktop lamp or floor LED light-device which get current from Solar or Chemical already is DC current so no need transformer to make the current change from AC to DC same as the FIG. 12 and FIG. 12A which is for other charging system by wireless electricity to create the magnetic-field and activate the built-in be-charged products magnetic-coil to change to tiny electricity to get into be-charged products inside rechargeable-battery or energy-storage-unit(s). However, the electricity→magnetic-filed→activate the be-charged inside magnetic-coil to change to electricity is toy grade charger which is too low-efficiency and maybe only 5 Watt or 10 Watt for very slow charging capacity so normally the wireless-charger system still keep the USB-port(s) for getting the external transformer or built-in AC-to-DC high amperage DC current to charge while people no patient to wait for slow wireless charging time. Furthermore, the wireless charge-system because need higher charging speed so it will create not only heat but also will need high power magnetic-filed which will cause people for fatal sick such as brain-hurt or Leukemia to cause people pain and die while people put the high power magnetic-filed on bed side-take within 3-5 feet.

From the FIG. 13 also shown the preferred embodiment (13a) which the said desktop or floor LED light item (13a) for prefer replaceable or detachable or built-in LED(s) or LED-bulb light source (not shown) may select from AC powered light source which has inner built-in circuit(s) to get desired operation or working current not direct to use input AC current including LED bulb, CFL, fluorescent-tube as light source or DC operated LED bulb, EL or Organic-EL bulb; the said LED light item which has big base (1316) and the rear or side or wall has plurality of the outlet-unit(s) from Number 1 to any number where prefer same number of market available power strip or extension cord or power station's number so can replace the existing power strip or extension cord or power-station to offer people to use power strip or extension cord or power station on desktop or floor light items' that people's arm can reachable the said desktop or floor light for short distance, so it can connect with other be-charged or be-supplied electric or digital data devices to supply or charge the other devices for DC or AC or both current. The said inside or outside housing regular or special custom-made AC-to-DC circuit or transformer, not only supply the DC current to the USB-units but also supply AC current to the said plurality of the AC Outlet-unit(s) depend on market requirement(s). The said plurality of the outlet-unit(s) or Outlet-Module(s) also can add the safety protection function such as surge, over-charge, over-heat, electric-shock, current-leakage or other related safety protection like extension cord, power strip or power station had. The same application can apply for all base of the desktop or floor LED lighting device so can have nice wires arrangement for plurality of outlet-unit(s) or Outlet-module (s) on the said base of all kind of lighting device. The current embodiment (13a) show mainly for only the light base has the built-in USB charging-port or/and outlet-ports which no need to sell the top light shade so consumer can pick-up desired shade and desired light-source which is detachable, replaceable, movable for some states however in some states need including detachable or replaceable light-source while sell the basic base with arms. It is appreciated that the current invention is not only claim for full set of light device but also including the light device's base with pole, stand, bar, stem for people to assembly separate purchase of shade, light source.

FIG. 13 shows a desk top item (13a) which has a super big size base (13a) so that a plurality of rotating USB-modules (13c) or power station (13d) can be installed to enable a group of people to charge their electric or digital device(s) at the same time by the USB-unit(s) (13e) (13f) or USB-Module(s)(13g) (13b) or SUPPLY AC current by Outlet-Unit(s) (13c) (13d) or Outlet-Module(s) (13e) (13f), such as for use in a public area has a lot of people walk by including train station, bus station, airport, meeting room, hotel lobby . . . etc.

FIG. 14 shows desktop or floor items with LED light-source including LED(s) or LED-bulb (not shown) or other AC power light-source had built-in circuits to get the desired working-current including CFL or fluorescent-tube (not shown). The said desktop or floor LED light items having USB-unit(s)(14r) (14q), USB-module (14g) (14h), or outlet-unit(s) (14p) (14j) (14i) allow people to charge energy-storage unit or assembly inside the other be-charged or be-supplied outside electric or digital device(s) by USB-unit(s)(14r) (14q) or USB-Module(s)(14g) (14h), or supply the AC current to prong(s) device by outlet-unit(s) (14i) (14j) or outlet-module(s)(14i) (14j), the items including for example a radio, time piece, weather station display, fruit blender, food machine, liquid machine, LED lighting, light fixture, image projector, image, lighted mirror, power station, rotating power station, electric fan, heater or any conventional items with LED or LED(s) built-in to offer the area illumination, or shown digital time, or shown image, or shown the charging status. The said other additional-functions or the said USB-unit(s) or Outlet-unit(s) can install on the anywhere of the base, pole, steps, compartment, organizer, or additional-function housing, or recessed-construction of the bottom of base, or flat-areas of the said Desk top items and not limited only on the base one surface. The all application has at least one of the $1^{st}$ DC current created by the AC-to-DC circuit inside housing or outside the transformer or USB/Outlet-module housing and the $1^{st}$ DC current through the DC-to-DC circuit (including simple conductive-wires or piece) or IC to more than one circuit-inside to get $2^{nd}$ or $3^{rd}$ or more different current. The said $1^{st}$ or $2^{nd}$ or $3^{rd}$ DC current has the desire voltage to offer the current to at least one of the said DC light source (not shown), USB charging-port(s) (14g) (14h), DC operate other electric parts & accessories or DC powered added function(s) including audio system (14*d'*), blade-less air-floor device (14*d*), or fragrance-sprayer (14*d*), humility diffuser (14*d'*) or cosmetic-mirror (not shown), time/date/week/temperature displayer (14*d"*) with adjustable, setting, dimmer-switch (14*f*), sensor (14*c*), wireless-receiver control set (14*d'"*), or other additional-function(s) (not shown).

FIG. 14 shows desk top item has LED indicator light (14*c'*) to shown the charging status or power-on-off status and USB-unit(s) (14*h*) (14*i*), USB-module(s) (14*r*) (14*q*), or outlet-unit(s) (14*i*)(14*j*) install on the pole (14*s*) or base (14*t*) or part (14*u*) (14*v*) of the said desktop or floor LED-light items (1402) to allow people to charge other electric or digital device(s), the items has at least one of the existing functions including an audio (14*d'*), timepiece or Digital Alarm clock (14*d"*)(2628 & 2628' of FIG. 27), time or temperature, weather station display (14*d"*) & pinholes image project (2622 or 2624 of FIG. 27) & music player with LED(s) (2628 & 2628' of FIG. 27), fruit blender, food machine (FIG. 28), liquid machine (FIG. 25), LED lighting (FIGS. 1,2,5), light fixture (FIG. 3,4,6 and FIGS. 7 to 13), projector (FIG. 24), electric fan (14*d*)(FIG. 29), lighted cosmetic mirror (FIGS. 25, 25-1, 25-2, 26-4), power station (FIGS. 6,7,8,10,13). heater or any conventional items (14*d*) (FIG. 29) with LED light-source built-in as indicator light (14C') or the said LED or LED(s) is light-source to offer the area or object or object-reflected illumination (FIGS. 1,2,5 as light source) (FIGS. 25-1, 25-2, 25-3, 25-4 as lighted mirror), or shown digital time (FIGS. 26,29), or shown image (FIG. 25), or shown the charging status (FIGS. 6,7,9,13 and FIGS. 26-1,27 on module surface). The said other functions or the said USB-unit(s) or Outlet-unit(s) can install on the anywhere of the base, pole, steps, recessed-bottom of base, flat areas of the said desktop or floor LED-light items and not limited only on the base one surface.

Figure 25:
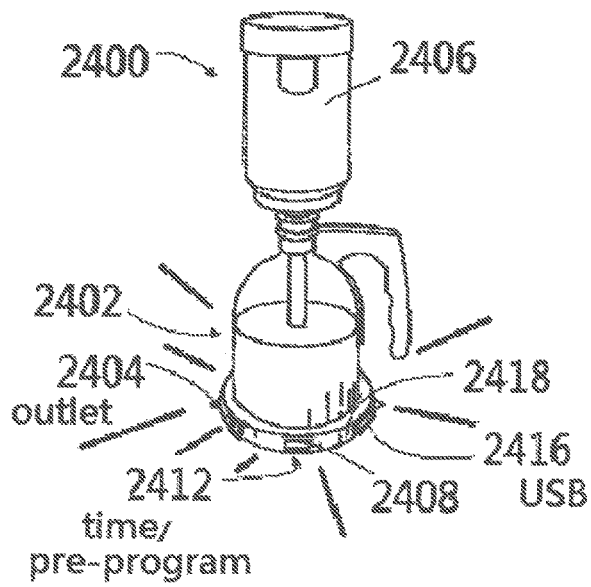
FIG. 25 is an isometric top view of the desktop system in a ninth embodiment have LED light for area-illumination and also have LED charging-status light(s) and also liquid-supplier functions, those all are built-inside the said LED light for area-illumination and built-in USB and/or outlets and/or other added addition functions.

From FIGS. 15, 16, 17, and 16A show different LEDs type (1614) (1714) (1814) or LED-bulb (1720) has different size, brightness, color temperature, power consumption, specification, and construction, with anti-glare to easily viewing, with anti-reflection optic-lens or film for clear reading arrangement while used for LED lighting that has at least one of function(s) is offering the area illumination in the above-discussed preferred embodiments and same as for other lighting items including the floor light device or wall mounted lighting or clip-on lighting device which has built-in USB-port(s) or Outlet-port(s) or USB/outlet module, universal-unit to make it can fit into desired location with desired simple assembly and lower-cost such as use module or universal-unit with AC-plug-wires instead of 2 prongs so can assembly the USB and/or Outlet module or universal-kits directly attached on the said desktop or floor LED light items with or without the pair of conductive-wires to connect with the LED(s) and its control-device as above discussed and following drawing FIG. 25-3 and FIG. 25-4 disclosure the details.

From FIGS. 18, 19, 19A, 20, 21, and 22 show details of parent filing (#CCC) the Rotating Multiple Surface USB and/or Outlet module, or USB and/or Outlet universal-unit(s), or power station (1904) has detachable, replaceable, movable or built-in the LED light-source and the USB charging-port(s) and Outlet-ports where USB-module with at least one USB-units and a plurality of additional receiving means (hereafter as Additional-ports) such as USB-unit(s), outlet-unit(s), Internet-unit(s), adaptor-unit(s), audio-input-port(s), or other light source means, or other light sources with appropriate parts and accessories.

From FIGS. 21 and 22 (2A) (2B) (3A) (3B) show details for each port name, and how to make the rotating from the $1^{st}$ surface to other surface and each different surface has DC power LED light and USB Charging-ports and Outlet-ports. The more details can check the parent filing (#CCC) has more details discussion.

From FIG. 22, the Rotating Multiple Surface USB and/or Outlet module, or USB and/or Outlet universal-unit(s), or power station (1904) has detachable, replaceable, movable or built-in the LED light-source and the USB charging-port(s) and Outlet-ports inside FIGS. 7, 9, 10 and FIG. 13 also show parent filing case (#CCC) has all kind of different combination for LED(s), USB charging-ports, Outlet-ports with selected USB-unit, USB-Module, Sealed-unit, Universal-unit, Outlet-unit, Outlet-module and all kind of the combination to install the PARENT FILING (#CCC) multiple surface USB and/or Outlet module, or USB and/or Outlet universal-unit(s), or power station with how to change from the $1^{st}$ surface to other surface with locking means and it also can has the self AC plug & wire to get power for this multiple surface power station has multiple function(s) inside an elongate shape similar with the power strip or extension cord products which still fall within the current inventions for lighting device has geometric base shape scope.

FIGS. 23, 24, 25, 25-1, 25-2, 25-3, 25-4, 26, 26-1, 26-2, 27, 28, 29 show all kinds of desk top items which offer function(s), effects(s), and/or performance(s) to people's eye, nose, mouth, and/or ears for a period of time while people are working, resting, sleeping, or standing which at least has following feature:

(A700) Light source for illumination or indicator light (A701) Quickly USB or wireless charging-port has minimum 1.0-10.0 Amperage or wireless 5 Watt to 20 Watt charging capacity (A702) At least has USB charging-ports or wireless-charging function and one more desktop or floor LED-light or items its existing or preferred additional-functions (A703) has the at least one current-type selected from $1^{st}$ DC current, $2^{nd}$ DC current, $1^{st}$ AC current, $2^{nd}$ AC current or more to get charger and at least one of additional-function of desktop or floor-light items selected from illumination or its original existing function(s) or desired combination.

FIGS. 23, 24, 25, 25-1, 25-2, 25-3, 26, 26-1, 27, 28, and 29 show all kinds of desk top items which offer function(s), effects(s), performance(s) to people's eyes, nose, mouth, and ears so that people stay nearby for a period of time as they work, rest, sleep, or stand. The desk top items each have (A) LED (for area illumination, or object-illumination, or indicator light to shown charging status, or create image for time or projection or visible image as above discussed) and (B) have a USB-unit(s) has its own quickly Charging-sport(s) has minimum 1.0 Amp to 10.0 Amp charging capacity as specification release on 2007 update on 2010 to charge energy-storage unit or assembly including rechargeable-batteries inside of the other electric or digital data device(s). It also can use non-rechargeable batteries for some additional-functions which one of them is at least one of time/date/week/temperature for non-stop while power fail, or a power-fail light, or sensor light, or microwave-sensor light, or other preferred functions.

and are arranged to 1. generate, exhibit, or provide light beams, or offer area or object illumination
2. show or present the image including of a projection, reflection image, a time display, a clock, 3. Offer audio-functions or play music, sound from pre-recorded or blue-tooth data
4. Display photos, digital signals,
5. Create or produce the air flow at a desired temperature, moisture, steam, smells,
6. Offer the liquid, coffee/tea, and/or food, or
7. Offer the object image or object reflected image such as cosmetic mirror with magnify image by one or more piece of mirrors or multiple sides rotatable or foldable mirror(s).
8. to serve as any other conventional market available electric or consumer device that people will stay around for period of time while their other devices are charging.

At least one of the desktop or floor-light device(s) may include at least one of its existing function(s) for people eye, ears, nose, mouth, skin to feel or sense or eat or smell or see or hear and the device let people to can easily to reach, touch, operate, or manage the said desk top device.

The device has desire number of the USB-Unit or USB-Module or Outlet-unit or Outlet-module or Sealed-unit or Universal-unit are installed or assemble or arranged on or within the device's substrate(s), base, pole, recessed-construction bottom of base, or housings or housing-part(s). And the non-portable type of the said desktop or floor LED-light device has big-base or heavy-unit or have inner weight-unit so not for portable-device and it is arranged on the location, or place where people will stay for period of time, such as a desk, table, bed, chair, land, grass, or wherever else people work, rest, sit, stand, sleep or a take nap.

The said desktop or floor LED-light items may offer electric signals, wireless signal, or visible or audio or smell or food or air functions related to people's eyes, ear, nose, mouth, or body, such as illumination, sound, images, brightness, visual effects, smell, water, liquid, food, wind, moisture, airflow or any conventional functions of electric devices, such as LED lighting, a clock, projector machine, image to see, cosmetic lighted mirror, digital photo frame, time display, air freshener, electric perfume freshener, moisturizer, electric fan, electric heater, electric steam spreader, electric cooler, electric air conditioner, or other conventionally available items has its own existing function(s) that can be placed to let people easily reach, touch, operate, or manage the objects.

The desk top items may be powered by a direct current (DC) power source limited solar, generator, DC battery power bank, Or alternating current (AC) power source having appropriate electric parts and accessories or components, such as circuit, IC, DC-to-DC circuit, sensor, a motion sensor, timer, time delay, timer, resilient kits, conductive kits, transformer, inverter, adaptor, wire, prongs, UL listed adapter, PIR remote contoller, infrared controller, wireless controller, blue-tooth controller, Internet controller, Wifi controller, master power controller, APP software, and/or AC power outlet-unit(s) to offer electric current at a voltage (Volt) and amperage (Amp or ma) sufficient to achieve a desired charging time and desktop its own existing function(s).

The USB-unit(s) has its USB Charging-port(s) only serve as a Charger for charging energy-storage unit or assembly including rechargeable batteries inside the other electric or digital device(s) and do not have an electric data transfer function. If plurality of USB-unit(s) or USB-module(s) or Outlet-unit(s) or Outlet-module(s) were provided, the USB-units can be arranged to have different output power to charge different electric or digital data device(s). If additional outlet-units are provided the outlet-units may be AC outlet-unit(s) that serve as an AC power source with optional surge protection features.

Electric or digital data device(s) that may be charged by the USB-unit(s) by its USB Charging-ports for quickly charger capacity minimum has 1.0 A-10.0 Amp or higher capacity include an MP3 or MP4 player, smart phone, computer, iPhone™, iPad™, video game, digital visual equipment, communication equipment, and other consumer electric products including the rechargeable batteries application such as Power bank for storage power tank.

The preferred desk top item's function(s) may be turned on or turned off for a predetermined time by switch, sensor, timer, photo sensor, motion sensor, time delay, and/or master control power controller, infra-red wireless, remote controller, wireless controller, APP software, WIFI or internet or network wireless controller, Z-wave remote controller.

All receiving port(s) in the desk top items, including USB-units or USB modules, may have a removable cover to allow kids or others to safely touch the items and prevent dust, or water from getting into the receiving means.

The USB-unit or USB-module in the form of the Sealed-unit or Universal unit to charge other electric or digital device(s) can be removable from the desk top items and carried with people to use when people leave the desk top items. For this purpose, the USB-unit(s) or USB-module(s) can be disassembled from the desk top items and re-assembled into the said desk top items by quick connector means, adaptor means, assembly means, or fixing means, with each of the USB-unit(s) or USB-module(s) having its own safety certification(s) so that the individual USB-unit(s) or USB-module(s) can be tested by safety authorities and sold separately.

The USB-unit(s) includes USB charging-ports which is an electric charging unit which has a USB-female receiving end to receive a USB-male plug from the USB-wire which has 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to convert or transform the electric current to a desired voltage, and current sufficient to charge Energy-Storage unit or assembly inside of the other electric or digital device(s) through the USB male plug insert into desktop items USB-female receiving port.

The items of these embodiments may be in the form of lighting, a desk lamp, table lighting, lava light, projection light, cosmetic lighted mirror, power station (Parent case #CCC), time piece, electric fan, air freshener, indicator coffee machine, indicator sound device, and visual device has LED(s).

Figure 23:
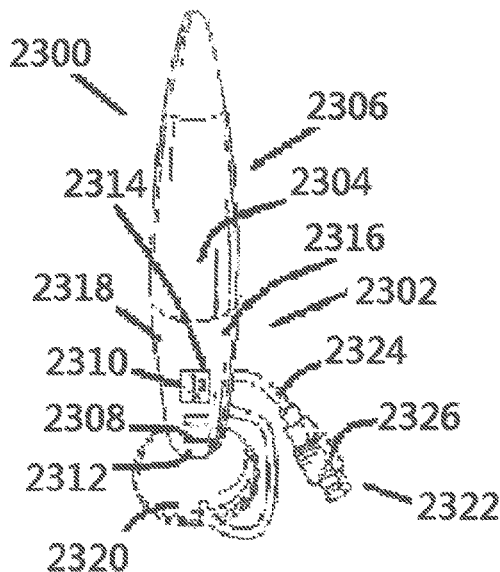
FIG. 23 is an isometric view of one of the desktop LED light devices or systems in a seventh embodiment have Lava LED light for area-illumination and built-in USB and/or outlets and/or other added addition functions.

From FIG. 23 show the desktop or floor LED light has a base (2320) and top have LED(s) (not shown) fit with the lower-housing (2318) to make the LED light-beam emit out from the center-tube to outside for illumination. The center-tube has desired solid-plastic-resin or filled of liquid with optional miniatures items such as floating or reflective or glitter or different density liquid or wax to with lower-heater or high-power LED(s) to generate the heat to make the inside liquid to move so make glitter, reflectors, floating items, miniatures items to moved to make desired illumination or accent light for $1^{st}$ function. And, the said LED light (2300) has the top cover and the lower-housing (2318) has built-in at least one of USB-port (2308) and/or Outlet-port (2310) with desired AC or USB plug-wire to connect with built-in or external transformer AC-to-DC circuit to get the desired at least one of DC-current to make the pre-determined for illumination and charging DC-current and/or supply AC-current and/or additional-built-in functions.

Figure 24:
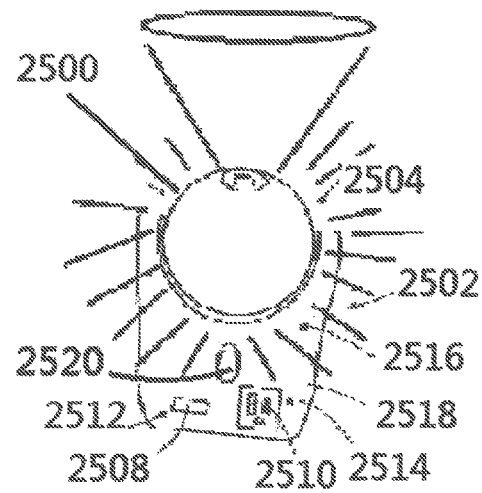
FIG. 24 is an isometric top view of the desktop LED light device or system in an eighth embodiment have project image and $2^{nd}$ LED light source built-inside the said LED light for area-illumination and built-in USB and/or outlets and/or other added addition functions.

From FIG. 24 show the desktop or floor LED light (2500) has project lighted patterns or image or light-beam to outside from the built-in at least one of project-assembly which has at least one of each of (1) LED light-source (2) image-forming-piece such as film, slide, or others (3) top or outer-cover has refractive optics-properties to produce the wider and magnify lighted image and/or patterns and/or light-beam to emit to outside of the desktop or floor LED light-device. This kind of the desktop or floor LED light-device has project and also offer area-illumination form the geometric-shape body here is sphere or ball or more than half-ball. The said LED light-device (2500) has the base (2518) which has built-in USB-port(s) (2508) of the USB-unit or USB-module (2510) and outlet-port(s) (2510) of the outlet-unit or outlet-module. The LED-device also have the said switch or sensor or wireless-receiver-kit, dimmer-switch or conductive switch (2520) so can make adjustment or selection or mixing or setting the LED(s) for colors or the brightness for predetermined functions or light-effects including color changing, color selection, brightness dimmer-able.

From FIG. 25 show the desktop or flood LED light-device (2400) for a liquid supplier products which the base (2416) has built-in plurality of LED(s) (not shown) to emit light from the edge (2418) to offer the desired single or multiple color or color changing area-light or accent-light or area-illumination and also have the time/date/temperature/setting time/on-off switch by LCD or LED displayer (2412) to let people know the status and setting and adjusting and pre-program time to brew coffee or water. The said LED light-device (2400) has built-in at least one of USB-port and/or optional Outlet-port(s) to allow people to charge the be-charged DC-operated device(s) and/or also supply AC-current to other be-supplied AC-powered device(s).

From FIG. 26 show the desktop or floor LED light-device which have air or humility related device. From FIG. 26 show the LEDs (2602) has desired color to emit the variable brightness light-beam from top or whole body (2604) to offer area or accent or glow light for people working, reading, cosmetic-time. The said LED light-device has built-in the air-flow related parts and accessories inside the housing and offer air-flow or air-fragrance from the export-opening or window or areas (2606). It also optional have the humility-diffuser (2612) with export-opening on top of the housing (2604) to spread out the desired humility on winter season while air is dry or internal space have heater so humility-diffuser will offer proper humility to make people skin and body can feel comfortable. The said LED light-device has at least one of the LED illumination with at least one of the additional function selected from (1) air-flow and/or air-fragrance (2) humility diffuser (3) built-in USB-ports (2608) (4) built-in outlet-ports (2610) (5) Built-in color changing and/or color selection and/or color mixing for illumination, and (6) wireless charging (Qi) for other or alternative charging system. It is appreciated that the USB-port(s) and/or Outlet-port(s) can install within the recess-area(s) of bottom of the base for alternative or replace or same function with the USB-ports install on the top outside housing areas or locations so can keep the desktop or floor nice and net without seeing mess wires and plugs.

From FIG. 25-1 and FIG. 25-2 show the different base (2517) (2527) LED lighted mirror with at least one sides and at least one side with magnify object optics-properties so can make people to see the tiny areas of the face or neck or body to make proper decoration or cosmetic. The said magnify object ratio can be shown as (×1)(×N) (N is any number to show the magnify times or radio to real size of object). The LED light-device (2510) (2523) has built-in LED(s) in a soft-strips to allow LED light-beam emit to sides and offer the in-directly light-beam to at least one of the front or back surface to make sufficient light-brightness to illuminate the objects or offer area-illumination for desired colors from 2,500 to 4,500 of white visible light-beam such as warm-white, cool-white etc. The alternative for built-in LED(s) also can install on PCB to offer direct light-beam to object which depend on the different construction or treatment for light-beam output-area(s) or window(s) or location(s). The said LED(s) (2511) (2525) preferred to install on outside of the center mirror reflective and/or magnify mirrors-lens (2510A) (2510B). The said at least one side mirror is two sides which has the frame (2513) (2526) and two-end bar (2512) to make it rotatable to change from the $1^{st}$ mirror to $2^{nd}$ mirror for different magnify-radio and both side with LED(s) illumination as FIG. 25-1 and FIG. 25-2 shown. The said desktop or floor or wall LED light-device (2510) (2523) may have pedal stand or suction-cup/screw or heavy-weight-unit-stand which has geometric shape with space to install the said USB-port(s) (2519) (2529), and/or male-plug or USB-plug of external transformer, USB-module, Outlet-module or Universal-kit DC-current into the said LED light-device internal circuit or DC-to-DC circuit or simple conductive-piece to supply the DC-current to the said USB-port(s) to charge the be-charged items. The said LED light-device here is LED lighted mirror which has pole (2514) (2516) which have one of height-adjustable tighten-kits to adjust and hold the desired height for mirror height. It also can have at least one of desired built-in additional-functions(s) except of the said LED area or object illuminations selected from (1) USB-port(s) (2519) (2529) or USB-Module (2518) to offer DC-current to charge other be-charged products, and/or (2) Outlet-ports (2520) (2530) to supply AC-current to other be-supplied products, and/or (3) Air-flow or Air-Fragrance or humility diffuser device (2528), (4) cosmetic-mirror to supply object illumination and/or reflective and/or magnify radio image (2510A) (2510B), or (5) wireless receiving-kits to get wireless controller or setting or adjusting or mixing or selection functions or color or brightness or on-off system (2521), or magnetics-side-mirror with desired magnify-radio to attached on the main-housing of main-mirror (not shown), or/audio-system with built-in speaker or blue-tooth wireless connection (not shown or same as FIG. 27), or other additional-functions list above.

From FIG. 25-3 and FIG. 25-4 show the flat-reflective-mirror which is at least one piece or desired combination of the said different combination of the said mirror (2532) (2533) (2533) assembly. The said flat-construction of mirror is one of (2532) (2533) (2534) or mirror-assembly which is desired combination of the said mirrors (2532)(2533) (2534) for 2 or 3 with different function such as mirror of the (2532) is 1:1 mirror without magnify radio. The mirror of (2533) is (×3=means magnify 3 times of object size). The mirror of (2534) which has 3 different mirrors in one-piece frame and have (×10=10 time magnify) and (×5=5 times magnify) and (×7=7 times magnify) are assembly in one frame or holder. However, these single piece mirror or combination mirrors-assembly is one of big size which can be from A4 or B2 or Multiple-times of the A4 or B2 so it is very heavy and need use the metal base or base with super heavy weight-unit to let the mirror stand on desktop or floor without move or fall-down by impact-force or connected-electric-wire or earth-quake or shaking. So, the base of the said big size flat-construction mirror need strong and heavy base (2542) or "U-shape metal base". Basing on the different construction of base (2542) have built-in USB-port(s) (2540) (2546) which supply DC-current to charge outside be-charged products, and/or outlet-port(s) (2545) which supply AC-current to supply the be-supplied products, and/or sensor, switch, adjust-knob (2541), or wireless-receiver-kit, radar-sensor, microwave-detector (2543), or IR/RF/Blue-tooth/Wifi/Z-way/Zigbee wireless signal or control receiver-system (2544), or air-flow (not shown), or humility diffuser (not shown), time/date/weather/temperature display (not shown), or audio-system (not shown), or other additional-function(s) discuss on above of current invention of all pending filed cases listed on above and all idea, concepts, design its alternative, replaceable, equal function, or similar application, added or reduce some parts or accessories, all these above discussion should still belong to the current invention scope, idea, construction, concepts and fall within the current invention claims and scope. Same as the flat-design lighted mirror for LED(s) arrangement for indirectly or directly light-beam emit to outside or objects which depend on market requirement all should still fall within the current invention scope.

While the flat-design lighted-mirror have the metal U-shape base which has no inner space of U-shape metal weight base, so the most simple way is to add or assembly or install or glue or rivet the said USB and/or Outlet unit (2588), or module (2588), or universal-unit (2588) which has its own housing and built-in desired combination of the said USB-port(s) (2588U) and/or Outlet-ports(s) (2588O) with the said AC-plug (2588T) or USB-plug (2588I) wire (2588 W) with AC-plug (2588T) to insert or connect with outlet to get AC-power-source. Some USB and/or Outlet unit (2588) or module (2588) or universal-unit (2588) have built-in LED(s) (2538) or without the built-in LED(s) so it can simple to add pair of the conductive-wire (2588W1) or conductive-piece (2588W1) to create the 2 DC-current output-end (2588W2) or output-wire (2588W2) to connect with build-in Flat-design lighted-mirror inner circuit(s) (2541') which can control all built-in flat-construction all LED(s) for color selection, brightness adjustment, timer, sensor or no-sensor, microwave-detector or not. Auto shut-down brightness, wireless turn-on and control the LED(s) for all desired function(s). Same details for FIG. 25-4

From FIG. 26-1 shown the desktop or floor LED light-device (2600) have the multiple function in one light-device. It is appreciated each of the function can incorporate with the basic 2 functions of current invention which are (1) LED area or object or accent illumination and (2) USB-port(s) charging function to become the additional-functions selected from (i) top or outer-cover with design or artwork or window(s) (not punch-through) or shape-holes or film or slide or printed-piece or painting-piece so can have area or accent or object illumination, or (ii) the built-in LEDs emit light beam and glow the body for accent light to see color changing, color selected, mixing color light effects from body or housing (2626), or (iii) the built-in time/date/week/weather/temperature display shown on screen (2620), or (iv) the said built-in LED(s) also can work as motion sensor, power fail, microwave detector light device with the switch, sensor(s), PIR or moving or microwave-detectors (not shown), or (v) the said LED light-device (2600) has at least one switch, sensor, adjustment switch, dimmer switch shown on front housing (plurality of the rectangular or square unit), or (vi) the two speaker to play the pre-recorded or blue-tooth connection digital data for music, melody, sound, voice, song. This embodiment shown the above (i) (ii) (iii) (iv)(v) (vi) 6 type of additional-function(s) which also has USB and/or outlet port(s) on rear-side of the said desktop or floor LED light-device (2600).

From FIG. 26-2 show the three of preferred additional-function(s) add on the desk or floor LED light-device bar (2631), arm (2632), pole, main-base (2641), stand, pedal-stand, tube, frame, dividers, compartments, organizers top or sides or wall including (i) audio-system including speaker (2632) install on the bar (2631) or pedal-stand, tube to play music or pre-recorded or blue-tooth connected digital data for music, melody, sound, song. Or (ii) the air-flow or air-freshener or air-fragrance or humility-diffuser built-in on main-base (2641) of the said desktop or floor LED light-device(s), or (iii) The said display of LED or LCD time display, and/or date, and/or weather, and/or week, and/or calendar, and/or temperatures, and/or alarm clock, and/or alarm clock related parts install on the bar, arm, tube, pole of said desktop or floor LED light-device; so all the said desktop or floor LED light-device have basic 2 functions USB-charger and LED area/accent/object illuminations as current invention basic claim, but also optional can have above 3 preferred additional-function(s) or other type of additional-functions as above all discussed and co-pending filed other function with all alternative or equal function or replaceable-functions should all belong to current invention features, concept, idea and appreciated should inside the current inventions claim scope.

From 27 is same as the FIG. 26-1 only difference at the unit have speaker (2628) (2628') which play the music, melody, song, voice, or other audio digital data which is pre-recorded or connect with blue-tooth or save inside digital data storage-unit(s). The all displayer for all kind of digital data can powered by separated battery so can keep accurate time/date/week/calendar/weather/temperatures while AC-power source is shut-down. Also, the said top area or external-cover can project the shaped-hole(s), cut-out, printed-arts, painting-arts to surrounding areas, space or project inside rotating optics-lens which has texture or marking or waved-thickness image or film or slide image to outside for projected image/patterns/light-beam light or accent light.

From FIG. 28 show the LED desktop or floor light-device which has container to load the food or sugar for people eat with built-in LED(s) which offer area-illumination and lighted the surrounding-areas, space too. The said desktop or floor LED light-device has built-in USB-port(s) (2708) so have current invention basic function for (1) area-illumination and (2) USB-charging port(s) (2708). The said optional additional-function(s) including (i) food supplier device (2704), and/or (ii) Outlet-port(s) to supply AC-current to other be-supplier product(s) (2710), and/or (iii) the air-flow or air-freshener or humility-diffuser or air-fragrance or heat-air, cold-air device (2722), and/or (iv) motion sensor, PIR sensor, microwave detector, moving-detectors (2720).

From FIG. 29 show the desktop or floor LED light-device (2800) is one of fan device which offer the air-flow with blade or without blade (as above discussed (2777 of FIG. 28)). The current invention the air-flow device (2800) have the soft-blade free of skin injury (2812) which rotated by the lower motor (2806) and the said motor and its axis (not shown) will rotating for get air-flow but also the said blade (2812) each one have built-in many pre-arranged or pre-programmed LEDs and it can be program or design for certain geometric-arts or clock dial face or digital time display or words display same as all market LED-display can show out the words, logo, arts, drawing, number, message, time, date, clock, or any other digital data such as (2808). The said desktop or floor LED light-device (2800) can show the geometric image (2808) or any other geometric light-effects, it also has built-in USB-port(s) (2812) or adaptor to get power from external transformer or USB-module, Outlet-module, or universal-unit with desired AC-plug or USB-Plug or AC-prong.

FIG. 30 and FIG. 31 shown an isometric view of one of Wikipedia test record for USB 3.0 USB-unit data for an embodiment of the desktop system.

Hereafter has detail description for drawing pages of FIGS. 32A1 to 32D4 some preferred embodiment for the above discussed for parts as below listed.

FIGS. 32A1, 32A2, 32B1, 32B2, 32B3, 32B4, 32C1 32C2, 32C3 32C4, 32C5, 32C6, 32C7, 32D1, 32D2, 32D3, 32D4 to show preferred embodiment for the above discussed for parts as below listed.

FIGS. 32A1 shown (1) USB-unit: The Unit means it is an individual charger has only charger purpose to have one input-current and passing though inner own circuit to make input current change to one output current to charger other device from its own USB port(s). This unit can be housed or without any hosing and install within the said desk-top main-base or housing and all live-wired or electric-carried parts & accessories not touchable by people except USB-port(s).

From FIG. 32A1 show the USB-unit (3100) has the built-in circuitry (3102) which connect with the input-current wire (3104) to change the input AC-current go through the built-in AC-to-DC circuit here is transformer (3112) and electric parts and accessories (3108) (3110) to get DC-current to supply the built-in USB-port (3106) to allow outside USB-related wire male-plug to insert into to build the electric delivery from USB-port (2106) through USB-related wire-unit mail-plugs to supply or charge other be-charged electric device.

The USB Charger only take 1 and only 1 of the input-power from AC-to-DC circuit and AC power source is basing on different country has one range current voltage and current, and the said house AC power source passing through inner or outside housing AC-to-DC circuit to come out the 1st DC-current on desired voltage and amperage. It does not have more than one different input-current such as AC or/and DC current as input-current at normal-time or power-fail time or it will be totally destroy the USB output-current because inner-circuit is fixed for one and only one current selected from range and specification such as 108 to 120 Voltage or 108 to 250 Voltage for AC current (Full range AC voltage).

FIGS. 32A2 show USB-module: This unit is not a single USB-Unit Charger. It will be any combination for any number of the USB-Unit(s) or/and Outlet-unit(s) has its own number of the USB-port(s) or/and Outlet-port(s) to connect with other electric or digital data device's male-prong(s) or Plug(s) to charging or supplying the DC or/and AC-current to other be-charged or be-supplier product(s). This module can be housed or without any hosing and install within the said desk-top or floor LED light-device main-base or housing or compartment or organizer wall, top, sides; and all live-wired or electric-carried parts & accessories not touchable by people except the USB-port(s) and/or outlet-port(s)

From FIG. 32A2 show USB-module (3200) which for Desktop or floor LED-light items or lamp which has AC-to-DC circuit (3212) and pre-determined electric parts (3202) (3208) (3210) & accessories (3216) to change input AC-current into DC-current. The said USB-module (3200) has more than one of USB-ports (3204) (3206) so can supply more than one of the inserting male-plug of USB-wire to build the DC-current delivery from Desktop or floor LED-light items or lamp to other be-charged electric device.

From FIGS. 32B1, 32B2, 32B3, 32B4 show Outlet-unit (3506) and Outlet Module (3600): The unit it is an individual POWER SUPPLIER device has outlet-receptacle (3606) (3618) which can receive the other device's prongs to deliver or supply the AC-current from the outlet-unit's (3506) power-source though the outlet-unit's (3506) port(s) to other device's prong (not shown) to get into other be-supplied device's conductive-piece or-and circuit to power other be-charged device. This unit (3506) can be housed or without any hosing and install within the said desk-top main-base or housing and all live-wired or electric-carried parts & accessories not touchable by people except the USB-port(s).

From FIGS. 32B 1, 32B2, 32B3 show the outlet-unit (3500) is well install between the LED desktop or floor LED-light item or lamp main-base or housing or compartment or organizer top or wall or sides or between the walls and inner housing-parts. The outlet-unit (3506) has the fasten screw to hold the outlet-unit (3506) solid between the outside wall and inner housing-parts. The said outlet-unit (3506) has 2 or 3 receiving-ends and inner conductive-metal piece to hold the inserted-prongs to build the AC-current delivery. From FIG. 32B4 is one preferred embodiment for outlet-module (3600) which has more than one of outlet-ports (3606) (3618) and each outlet-port has its own inner conductive-metal pieces to build connect with input AC-current from outside wire (3602) (3604). The said USB-module (3600) has its own housing so can easily pre-assembly for LED-light housing or recessed-section of bottom of base, so can save the installation or assembly into said desktop items or lamp. The said recessed-sections is located on bottom of base so can easily to make the edge or shape to fit the said existing module or universal-unit so can easily to build the said USB-port(s) and/or outlet-port(s) without need to redesign the new AC-to-DC or DC-to-DC circuit to fit within the inner housing space.

From FIGS. 32C1 32C2, 32C3 show Sealed USB-module: This is a module which has desired combination for any number of USB-unit(s) or/and outlet-unit(s) arrangement or combination and sealed into one piece of the own housing and passed all USA required related safety standard(s) and get test labs' certification for this sealed-module or sealed-unit only which not need to do the sealed-module or sealed-unit any related functions anymore.

The said LED light-device including the other housing parts or accessories non-related to the USB or Outlet charger is only need to do test for whole unit certification.

This sealed-module or sealed-unit any live-wire or electric-carried parts & accessories have to sealed so called sealed-module or sealed-unit so can pass the US Safety standard requirement(s).

This sealed-module or sealed-unit have prongs to plug-in LED desk lamp or LED desk items outlet-receiving-ports to change the desk top lamp or items AC-current through the sealed-unit inside AC-to-DC circuitry to supply DC-current to other device through sealed-module or sealed-unit own USB-ports.

From FIG. 32C1 can see the sealed-unit (3300) has folding prong (3308) arranged on its own housing and the housing has built-in AC-to-DC circuitry to change input AC-current to DC-current and through the front has USB-port (3302) to allow the male-USB-plug inserted into to build the DC-current delivery. The DC-current also supply the power to the said inside LEDs and emit the light from front lower window.

From FIG. 32C2 similar with FIG. 32C1 only different at the said USB sealed-unit (3700) has two USB-ports to allow USB male-plug inserted into to deliver the DC current to more than one of be-charged other products.

From FIGS. 32C4, 32C5, 32C6, 32C7 show Universal USB-module or Charger: FIG. 32C3 to FIG. 32C7 is USB-module or charger which has finished housing and electric-contactor such as prong, or wired, or quickly-connector(s) which not only can incorporate with the said desk-top or floor LED-light item(s) but it also can use for other applications.

One of preferred embodiment is market available USB-2.1 or 2.4 Amp USB-module or Charger have 2 USB-ports with fold or non-foldable prongs. This can install within the current invention desktop or floor LED-light items housing or recess-areas of base-bottom by AC-plug-wired or outlet-plug-wire to get AC-power-source and have at least on pair of wire to connect with the circuit for LED(s) and LED(s) like the FIG. 25-3 of FIG. 25-4.

The Universal-unit not only can incorporate with desktop or floor LED light as FIG. 25-3 or FIG. 25-4. The said USB and/or Outlet Universal-unit have prong can also carry with people to any place while traveling and plug-into all kind of AC-outlets to charger the computer, communication, consumer electric items or any electric or digital data devices while prong plug-into outlet on wall or power strip's outlets. This is definition for universal charger for current invention.

From FIG. 32C3 show the universal-unit have two built-in functions for fan and LED light which can easily install within the LED desktop or bigger size of floor LED-lamp or items main-base or housing including arm-base as FIG. 14 (14*t*) (14*s*) shown.

The said Universal unit has its own preferred functions which may selected From FIG. 23, 24, 25, 26, 27, 28, 29 or any other functions to built-in the main-base or compartment or organizer or arm-base (14*s*) (14*t*) of FIG. 14 discussed.

Furthermore, the Universal-unit or Sealed-module or sealed-unit all have its own housing with desired conducive-piece such as
 (i) prong or AC-plug-wires
 (ii) conductive-wires for connect with LED light-source(s) or Light-bulb(s) its related circuitry including IC, function or setting or changing, or select switch, or
 (iii) others electric parts & accessories so can connect with power-source from AC-outlet or external transformer into the sealed-unit(s) and/or universal-unit(s) inner AC-to-DC circuitry to get desired DC-currents to supply DC-current to LED-light-source and related circuit(s) to get desired light-functions, color, brightness by sensor or micro-wave sensor or select/adjust/setting/variable switch or electric components.
 (iv) The said sealed-unit(s) or Universal-unit can simple to install the said LED desk-top or floor LED-light item such as cosmetic mirror base or housing, frame, back housing, back space (While mirror is flat piece or type) by chemical adhesive compound, glue, screw, attachment kits, install kits, fix kits so can instantly to install the USB-ports with or without outlet-ports for desired combination on LED desk-top items as FIG. 25-2 drawing shown the flat type cosmetic mirrors.

FIGS. 32D1, 32D2, 32D3, and 32D4 show the rotating-module for all kind of applications.

From above discussion for the USB Charging-port which has minimum 1.0 Amp to 10.0 Amp or higher amperage to allow people to get short time charger without any digital or electric data delivery is different with out of date 500 ma slow charger and has digital data delivery which will cause the overheat and fire risk. The current invention also has one and only one power source (not AC and DC) which is not like has AC input or Battery power pack to supply more than one power source into to make to the USB port which is not practical and increase a lot of trouble for construction and expensive. The current invention as co-inventor parent filed including:

The current invention and all application is a continuation filing of
 (#GGG-11) U.S. Ser. No. 14/951,872 filed on Nov. 25, 2015, which is CIP of
 (#GGG-10) U.S. Ser. No. 14/875,675 filed on Oct. 5, 2015 Which is CIP of
 (#GGG-9) U.S. Ser. No. 14/870,601 filed on Sep. 30, 2015 which is CIP of
 (#GGG-8) U.S. Ser. No. 14/834,613 filed on Nov. 10, 2015 which is CIP of
 (#GGG-7) U.S. Ser. No. 14/834,823 filed on Aug. 25, 2015 which is CIP of
 (#GGG-6) U.S. Ser. No. 14/834,557 filed on Aug. 25, 2015 which is CIP of
 (#GGG-5-1) U.S. Ser. No. 14/858,838 filed on Sep. 18, 2015 now is allowanced wait for issued, which is CIP of
 (#GGG-5) U.S. Ser. No. 14/833,935 filed on Aug. 24, 2015 which is CIP of
 (#GGG-4C) U.S. Ser. No. 14/827,810 filed on Aug. 17, 2015 which is CIP of
 (#GGG-4) U.S. Ser. No. 14/827,810 filed on Aug. 17, 2015 now is U.S. Pat. No. 8,931,947 issued on Jan. 13, 2015 which is CIP of
 (#GGG-3C) U.S. Ser. No. 14/643,026 filed on Mar. 10, 2015 which is CIP of
 (#GGG-3) U.S. Ser. No. 14/144,703 filed on Dec. 31, 2013 which is CIP of
 (#GGG-2C) U.S. Ser. No. 14/548,626 filed on Nov. 20, 2014 now U.S. Pat. No. 9,182,111 issued on Nov. 10, 2015 which is CIP of
 (#GGG-2) U.S. Ser. No. 14/105,717 filed on Dec. 13, 2013 now U.S. Pat. No. 8,911,137 issued on Dec. 16, 2014 which is CIP of
 (#GGG-1C) U.S. Ser. No. 14/548,861 filed on Nov. 20, 2014 which is CIP of
 (#GGG-1) U.S. Ser. No. 14/105,607 filed on Dec. 13, 2013 now U.S. Pat. No. 8,915,608 issued on Dec. 23, 2014 which is CIP of
 (#GGG-2011) U.S. Ser. No. 13/161,643 filed on Jun. 16, 2011 now is U.S. Pat. No. 8,783,936 issued on Jul. 22, 2014

The current invention is continuously filing of co-pending filing U.S. Ser. No. 12/950,017(#CCC) Multiple surface LED light filed on Nov. 29, 2010 with rotating device has LED light device(s) and USB device and Outlets device built-in on the rotating substrate with more than one surface to offer multiple function.

The (#CCC) U.S. Ser. No. 12/950,017 Filed Nov. 19, 2010 (Now is U.S. Pat. No. 8,998,462) is continuously filing for
 (#R) U.S. Ser. No. 11/806,285 (Inventor's #R) filed on May 31, 2007 which also a multiple functions LED light device which are the continuously filing of the U.S. Pat. No. 7,318,652 (Inventor's #B) for multiple functions Wall Cover filed on Mar. 31, 2005. The current invention is continuously filing of U.S. Pat. No. 7,651,365 (Inventor's #F) filed on Jan. 15, 2005 which is CIP of Oct. 1, 2004. It is the CIP of U.S. Pat. No. 7,810,985 (Inventor's #A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

And this filing case is Continue of following parent filing case:

This application is a continuation of U.S. patent application Ser. No. 14/444,703, filed Dec. 31, 2013, which is a continuation of U.S. patent application Ser. No. 13/161,643, filed Jun. 16, 2011, now U.S. Pat. No. 8,783,936, each of which is incorporated by reference herein.

The current invention is continuously filing of co-pending filing (#CCC) U.S. Ser. No. 12/950,017 multiple surfaces LED light filed on Nov. 29, 2010 with rotating device has LED light device(s) and USB device(s) and Outlets device built-in on the rotating substrate with more than one surface to offer multiple function(s).

(#CCC) U.S. Ser. No. 12/950,017 Filed Nov. 19, 2010 (Now is U.S. Pat. No. 8,998,462) is continuously filing for (#R) U.S. Ser. No. 11/806,285 (Inventor's #R) filed on May 31, 2007 which also a multiple functions LED light device which are the continuously filing of the (#B) U.S. Pat. No. 7,318,652 multiple functions Wall-cover filed on Mar. 31, 2005. The current invention is continuously filing of U.S. Pat. No. 7,651,365 (Inventor's #F) filed on Jan. 15, 2005 which is CIP of Oct. 1, 2004. It also the CIP of (#A) U.S. Pat. No. 7,810,985 file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (#FFF) U.S. Ser. No. 13/117,227 filed on May 27, 2011 for Universal Module has USB-Unit(s) or/and Outlet-unit(s) for variety of electric or digital-data device. This application is a continuation of U.S. patent application Ser. No. 14/444,703 filed on Dec. 31, 2013, which is a continuation of U.S. patent application Ser. No. 13/161,643 filed on Jun. 16, 2011, now U.S. Pat. No. 8,783,936 is incorporated by reference herein. This application is a continuation of (#GG-11) U.S. patent application Ser. No. 13/161,643, filed Jun. 16, 2011, now is U.S. Pat. No. 8,783,936 incorporated by reference herein.

This application is parent filed of the current inventor's (#FFF) U.S. patent application Ser. No. 13/117,227 filed on May 30, 2011, and entitled "Universal module of USB-unit or Outlet-units for electric or digital data device(s)." The current invention is continuously filing of co-pending filing (#CCC) U.S. Ser. No. 12/950,017 multiple surfaces has USB and LED light filed on Nov. 29, 2010 with rotating device has LED light device(s) and USB device and Outlets device built-in on the rotating substrate with more than one surface to offer multiple function.

This application also has subject matter in common with the inventor's (#I-1) U.S. patent application Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on, Nov. 6, 2012 issued (later than parent filing date)

These parent filing case(s) cover all desktop items and lighting device and desk top items. The current invention and related filing case have features at least cover as below feature and function including:

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source which is not like has AC input at $1^{st}$ and change to DC Battery power pack to become power source and has more than one power source into desktop product and go to the USB port which is not practical and increase a lot of trouble for construction and expensive. The current invention as co-inventor parent filed including:

The current invention is continuously filing of co-pending filing U.S. Ser. No. 12/950,017(#CCC) Multiple surface LED light filed on Nov. 29, 2010 with rotating device has LED light device(s) and USB device and Outlets device built-in on the rotating substrate with more than one surface to offer multiple function.

The said (#CCC) U.S. Ser. No. 12/950,017 Filed Nov. 19, 2010 (Now is U.S. Pat. No. 8,998,462) is continuously filing for (#R) U.S. Ser. No. 11/806,285, and (Inventor's #R) filed on May 31, 2007 which also a multiple functions LED light device which are the continuously filing of the U.S. Pat. No. 7,318,652 (Inventor's #B) for multiple function Wall Cover which filed on Mar. 31, 2005. The current invention also continuously filing of U.S. Pat. No. 7,651,365 (Inventor's #F) filed on Jan. 15, 2005 which is CIP of Oct. 1, 2004. It also the CIP of U.S. Pat. No. 7,810,985 (Inventor's #A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

these parent filing case cover all desktop items and lighting device and desk top items. The current invention and related filing case have features at least cover as below feature and function including:

1. A Quick USB charging-ports assembly for lighting device, consist of;
    At least one of USB charging ports has minimum 1.0 A up to 5.0 Amp charging capacity and specification released on 2007 and update on 2010.
    The USB charging ports only has charging function without any electric or digital data transmit or delivery.
    At least one of circuit incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.
    The said USB charging-port(s) is universal type can fit for all different USB-Wire at least one of plug(s) so can charge all different be-charged devices.
    A lighting device and its parts has base for desk, surface, floor, wall installation and has housing space with opening to install the USB charging port(s).
2. The Quick USB charging ports assembly for lighting device, the said power source is from outside the light device housing's AC to DC transformer, adaptor, converter, invertor which has circuit-kits inside to change the AC current to DC current.
3. The Quick USB charging ports assembly for lighting device, the said power source is from AC wall or extension cord or other's outlet and get power by the AC plug and wire to the light device inner-circuit which has transformer, invertor, adaptor, converter assembly inside and change the input AC current to DC current.
4. The Quick USB charging ports assembly for lighting device, the said light device has LED or LEDs to offer at least one function select from illumination, area illumination, indicator light, lighted image, project image, time display, charging status, date or/and calendar display, temperature display, message display.
5. The Quick USB charging ports assembly for lighting device, the said light device has non-LED light source to offer illumination.
6. The Quick USB charging ports assembly for lighting device, the said light device housing space including light device's base, pole, bar, stationary organizer, compartment, construction, stand, clip base, or other housing space.
7. The Quick USB charging ports assembly for lighting device, the said circuit has more than one circuit-kits or circuit-inner which for transformer, invertor, adaptor, converter inside the outside or light device's housing, and the said more than one circuit is circuit-inside that make device not only supply the DC current to the USB charging-ports but also arrange the power or electric functions to the other functions including light source, LED(s), time display, message display, wireless communication, image display, timer, time/date/calendar/weather display, other added functions, temperature/humility display, remote controller, wifi controller, image controller, IP cam, infra-red controller, wireless communication controller.
8. The Quick USB charging ports assembly for lighting device, the said lighting device is one of desk lamp, floor lamp, wall lamp, outdoor lighting, night light.
9. The Quick USB charging ports assembly for lighting device, the said other electric or digital products is a communication equipment, computer equipment, consumer electric products which has the DC energy storage unit or assembly inside the products and can be rechargeable.
10. The Quick USB charging ports assembly for lighting device, the said USB charging-port is a type A construction which same as majority of laptop computer USB port but has minimum 1.0 A up to 5 Amp or higher charging capacity.
11. The Quick USB charging ports assembly for lighting device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
12. The Quick USB charging ports assembly for lighting device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
13. The Quick USB charging ports assembly for lighting device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
14. The Quick USB charging ports assembly for lighting device, the said only one input power source, the said USB charging-port(s) only take output-end's DC current from (1) the circuit-inner while without the outside device's housing transformer; or (2) circuit-kits while has the outside device's housing transformer.
15. The Quick USB charging ports assembly for lighting device, the said light device further incorporate with Outlet-unit or Outlet-Module to SUPPLY the AC current directly though only conductive-kits or assembly from the outlet receiving port(s) to the other electric or digital device's has conductive prongs and the said Outlet-unit or outlet-module install within or on anywhere the light device.
16. The Quick USB charging ports assembly for lighting device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
17. The Quick USB charging ports assembly for lighting device, the said light device has added outlet-unit which has number 1 to N (any number) and has surge-protection for number over the 3 or more to offer the more safety.
18. The Quick USB charging ports assembly for lighting device, the said USB charging-ports or/and Outlet-units can arrange on any parts of the said lighting device including base, pole, bar, stand, stationer-organizer, added housing construction, clips.
19. The Quick USB charging ports assembly for lighting device, the said lighting device light source is a built-in LED(s), CFL, Power saving bulb, separated LED bulb, Florescent tube, LED tube, EL, OEL or other market available light source.

20. The Quick USB charging ports assembly for lighting device, the said lighting device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects.
21. The Quick USB charging ports assembly for lighting device, the said lighting device is a floor lamp has the USB charging-port on the anywhere of housing, base, added desk, bar, stand, pole and has number of outlets on the base or stand number from 1 to N (any number) so work as power strip has outlets up to N with optional surge protection and has only one wire with AC-Plug to plug-into Wall
22. A Quick USB charging-ports assembly for digital alarm clock or time related device, consist of;

At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though an outside housing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A digital alarm clock or time related device has housing with opening to install the USB charging port(s).
23. The Quick USB charging ports assembly for digital alarm clock or time related device, the said power source is from outside the digital alarm clock or time related device housing's AC to DC transformer, adaptor, converter, invertor which has circuit-kits inside to change the AC current to DC current.
24. The Quick USB charging ports assembly for digital alarm clock or time related device, the said power source is from outside digital alarm clock or time related device housing's AC wall outlet and get power by the AC plug and wire to the light device inner-circuit which has transformer, invertor, adaptor, converter assembly inside and change the input AC current to DC current.
25. The Quick USB charging ports assembly for digital alarm clock or time related device, the said device has LED or LEDs to offer at least one function select from illumination, indicator light, lighted image, project image, time display, charging status, date or/and calender display, temperature display, message display.
26. The Quick USB charging ports assembly for digital alarm clock or time related device, the said device has non-LED light source to offer illumination indicator light, lighted image, project image, time display, charging status, date or/and calendar display, temperature display, message display.
27. The Quick USB charging ports assembly for digital alarm clock or time related device, the said light device housing including light device's base, stationary construction, compartment, organizer, holder for phone or ipad or power-bank, be-charged products, or other housing arrangement has space.
28. The Quick USB charging ports assembly for digital alarm clock or time related device, the said circuit has more than one circuit-inside for transformer, invertor, adaptor, converter inside the light device's housing that not only supply the DC current to the USB charging-ports but also arrange the power to the other functions including light source, LED, time display, message display, wireless communication, image display, timer, date/calendar/ weather display, temperature/humility display, radio, music, audio device, alarm device, speaker device, remote controller, WIFI controller, image controller, IP cam, infra-red controller, wireless communication controller.
29. The Quick USB charging ports assembly for digital alarm clock or time related device, the said digital alarm clock or time piece device is one of clock, LED time piece, LED segments has 8 construction, time piece has audio parts & accessories, wall clock, night light time piece, desktop item has time display products, desktop time piece, digital alarm time piece, alarm clock, digital or analog time piece.
30. The Quick USB charging ports assembly for digital alarm clock or related piece, the said other electric or digital products is a communication equipment, computer equipment, consumer electric products which has the DC energy storage unit or assembly inside the products and can be rechargeable.
31. The Quick USB charging ports assembly for digital alarm clock or time related device, the said USB charging-port is a type A construction which same as majority of laptop computer USB port but has minimum 1.0 A up to 5 Amp or higher charging capacity.
32. The Quick USB charging ports assembly for digital alarm clock or time related device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
33. The Quick USB charging ports assembly for digital alarm clock or time related device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
34. The Quick USB charging ports assembly for digital alarm clock or time related device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
35. The Quick USB charging ports assembly for digital alarm clock or time related device, the said only one input power source, the said USB charging-port(s) only take output-end's DC current from
  (3) the circuit-inner while without the outside device's housing transformer; or
  (4) circuit-kits while has the outside device's housing transformer.

36. The Quick USB charging ports assembly for digital alarm clock or time related device, the said device further incorporate with Outlet-unit or Outlet-Module to SUPPLY the AC current directly though only conductive-kits or assembly from the outlet to the other electric or digital device has conductive prongs equipment and the said Outlet-unit or outlet-module install within or on anywhere the device.
37. The Quick USB charging ports assembly for digital alarm clock or time related device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
38. The Quick USB charging ports assembly for digital alarm clock or time related device, the said device has added outlet-unit which has number 1 to N (any number) and has surge-protection for number over the 3 or more to offer the more safety.
39. The Quick USB charging ports assembly for digital alarm clock or time related device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
40. The Quick USB charging ports assembly for digital alarm clock or time related device, the said device light source is a built-in LED(s), liquid crystal display, CFL, Power saving bulb, separated LED bulb, Florescent tube, LED tube, EL, OEL or other market available light source.
41. The Quick USB charging ports assembly for digital alarm clock or time related device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
42. The Quick USB charging ports assembly for digital alarm clock or time related device, the said device is a time related product has the USB charging-port on the anywhere of housing, base and has number of outlets on the base or housing with number from 1 to N (any number) so work as power strip has outlets up to N with optional surge protection and has only one wire with AC-Plug to plug-into Wall.
43. Quick USB charging ports assembly for lighting device, consist of;
    A USB charging ports has minimum 1.0 A up to 5.0 Amp charging capacity and specification released on 2007 and update on 2010.
    The USB charging ports only has charging function without any electric or digital data transmit or delivery.
    A circuit incorporate with USB charging port(s) and only has one input power source and supply DC current to charge the energy storage unit or assembly including battery, batteries, rechargeable battery inside the said other electric or digital data product(s).
    The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
    A lighting device has housing and bar, stand, base, pole, clipper, holder with opening to install the USB charging port(s) for quickly charging.
44. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.
45. Quick USB charging ports assembly for lighting device, the said USB-unit, USB-module, Outlet-unit, Outlet-module, USB Universal kits, USB sealed-unit can have number from 1 to N (any number).
46. Quick USB charging ports assembly for lighting device, the said clipper has spring device so can clip the variety desk, table, bed, tube, bar, post, edge so can install the desktop lighting device on many place(s) where has the thickness equal or less than clipper's two arms opening width.
47. Quick USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.
48. Quick USB charging ports assembly for lighting device, the said lighting device for desk, floor, wall, ceiling, landscape, ground, table, bed, moving table, bed cushion table, or any flat surface can put lighting device without vibration to make the lighting device to fall down.
49. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.
50. Quick USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.
51. Quick USB charging ports assembly for lighting device, the said light device has optic film added to prevent reflection from the LED, LEDs, LED Bulb or other light source.
52. Quick USB charging ports assembly for lighting device, the said outlet-unit or outlet-module has adding surge protection, or master controller or wireless communication by Wife, APP, remote controller, infra-red, RF remote, timer, time delay, dimmer, color changing, brightness controller functions or features.
53. Quick USB charging ports assembly for lighting device, the said lighting device incorporate with switch, sensor, motion sensor, timer, to turn on and turn off the lighting device.
54. A Quick USB charging-ports assembly for lighted cosmetic mirror device, consist of;

At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and individual USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A lighted cosmetic mirror device has image related function including magnify, reflective face, reflective body, reflect objects with light source to see under dark environment has housing with opening to install the USB charging port(s).

55. The Quick USB charging ports assembly for lighted cosmetic mirror device has image related function, the said power source is from outside the device housing's AC to DC transformer, adaptor, converter, invertor which has circuit-kits inside to change the AC current to DC current.

56. The Quick USB charging ports assembly for lighted cosmetic mirror device has Image related function, the said power source is from outside Image related device housing's AC wall outlet and get power by the AC plug and wire to the device inner-circuit which has transformer, invertor, adaptor, converter assembly inside and change the input AC current to DC current.

57. The Quick USB charging ports assembly for lighted cosmetic mirror device has Image related function, the said device has LED or LEDs to offer at least one function select from illumination, indicator light, lighted image, project image, time display, charging status, date or/and calendar display, temperature display, message display, color changing, brightness changing, dimmer the light brightness.

58. The Quick USB charging ports assembly for lighted cosmetic mirror device has image related function, the said device has non-LED light source to offer illumination, indicator light, lighted image, project image, time display, charging status, date or/and calendar display, temperature display, message display, different color of light, different brightness, dimmer the light brightness.

59. The Quick USB charging ports assembly for lighted cosmetic mirror device has Image related function, the said light device housing has at least one parts or desire combination select from light device's mirror, reflective surface, reflective and magnify kits or assembly, magnify lens, optics lens, optics assembly, base, bar, stand, pole, hook, stationary construction, compartment, compartment for the install all electric parts & accessories, organizer, holder for phone or ipad or power-bank, be-charged products, or other housing arrangement has space.

60. The Quick USB charging ports assembly for lighted cosmetic mirror device has Image related function, the said circuit has more than one of circuit-kits, or circuit-inner, there has other circuit-inside which beside the said transformer, invertor, adaptor, converter fit inside of the the light device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, WIFI controller, image controller, IP cam, infra-red controller, wireless communication controller.

61. The Quick USB charging ports assembly for lighted cosmetic mirror device has Image related function, the said lighted cosmetic mirror device has image related function is one device has desire combination select from desktop mirror, wall mounted mirror, time piece, LED segments has 8 construction, time piece has audio parts & accessories, clock, night light, desktop item has reflective mirror-like surface and functions, desktop time piece, digital alarm time piece, alarm clock, digital or analog time piece, weather station, radio.

62. The Quick USB charging ports assembly for lighted cosmetic mirror device has Image related function, the said other electric or digital products is a communication equipment, computer equipment, consumer electric products which has the DC energy storage unit or assembly inside the products and can be rechargeable.

63. The Quick USB charging ports assembly for lighted cosmetic mirror device has Image related function, the said USB charging-port is a type A construction which same as majority of laptop computer USB port(s) but has minimum 1.0 A up to 5 Amp or higher charging capacity and do not allow has data delivery.

64. The Quick USB charging ports assembly for lighted cosmetic mirror device has image related function, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

65. The Quick USB charging ports assembly for lighted cosmetic mirror device has Image related function, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

66. The Quick USB charging ports assembly for lighted cosmetic mirror device has Image related function, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

67. The Quick USB charging ports assembly for lighted cosmetic mirror device has Image related function, the said only one input power source, the said USB charging-port(s) only take output-end's DC current from
  (5) the circuit-inner while without the outside device's housing transformer; or
  (6) circuit-kits while has the outside device's housing transformer.

68. The Quick USB charging ports assembly for lighted cosmetic mirror device has Image related function, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.

69. The Quick USB charging ports assembly for lighted cosmetic mirror device has Image related function, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, moisture machine, humility machine, or any machine, tools, kits, equipment for people to make cosmetic purpose for face, hair, body, skin, hand, foot, leg, arms which need to use AC power source all belong to cosmetic related kits.

70. The Quick USB charging ports assembly for lighted cosmetic mirror device has Image related function, the said outlet-unit or outlet-module or universal unit or sealed units has Outlet receiving ports which may drive different cosmetic related kits and supply the AC current up to 1,850 Watt for hair dryer, 1,650 Wall for normal electric device or any other bigger or lower Watt needed for people while people use the Lighted cosmetic mirror device.

71. The Quick USB charging ports assembly for lighted cosmetic mirror device has Image related function, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

72. The Quick USB charging ports assembly for lighted cosmetic mirror device has Image related function, the said device has added outlet-unit which has number 1 to N (any number) and has surge-protection for number over the 3 or more to offer added surge protection circuit or the over-heat breaker circuit or the said over-load circuit, current leakage circuit for the more safety.

73. The Quick USB charging ports assembly for lighted cosmetic mirror device has Image related function, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

74. The Quick USB charging ports assembly for lighted cosmetic mirror device has Image related function, the said device light source is a built-in LED(s), CFL, Power saving bulb, separated LED bulb, Florescent tube, cold cathode tube, LED tube, EL, OEL or other market available light source.

75. The Quick USB charging ports assembly for lighted cosmetic mirror device has Image related function, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

76. The Quick USB charging ports assembly for lighted cosmetic mirror device has Image related function, the said device is a lighted cosmetic mirror product has the USB charging-port on the anywhere of housing, base and has number of outlets on the base or housing with number from 1 to N (any number) so work as power strip has outlets up to N with optional surge protection and has only one wire with AC-Plug to plug-into Wall.

77. Quick USB charging ports assembly for lighting device, consist of;
    A USB charging ports has minimum 1.0 A up to 5.0 Amp charging capacity and specification released on 2007 and update on 2010.
    The USB charging ports only has charging function without any electric or digital data transmit or delivery.
    A circuit incorporate with USB charging port(s) and only has one input power source and supply DC current to charge the energy storage unit or assembly including battery, batteries, rechargeable battery inside the said other electric or digital data product(s).
    The said circuit incorporate with an outside housing's and separated USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
    A lighting device has housing and bar, stand, base, pole, clipper, holder with opening to install the USB charging port(s) for quickly charging.

78. Quick USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

79. Quick USB charging ports assembly for lighting device, the said USB-unit, USB-module, Outlet-unit, Outlet-module, USB Universal kits, USB sealed-unit can have number from 1 to N (any number).

80. Quick USB charging ports assembly for lighting device, the said clipper has spring device so can clip the variety desk, table, bed, tube, bar, post, edge so can install the desktop lighting device on many place where has the thickness equal or less than clipper's two arms opening width.

81. Quick USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

82. Quick USB charging ports assembly for lighting device, the said lighting device for desk, floor, wall, ceiling, landscape, ground, table, bed, moving table, bed cushion table, or any flat surface can put lighting device without vibration to make the lighting device to fall down.

83. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male-plug is Type A.

84. Quick USB charging ports assembly for lighting device, the said USB wire has at least two male plugs one preferred TYPE A and the other prefer is mini-USB or micro-USB or Type C USB has smaller, compact, thin, narrow USB construction but quickly charging and bigger charging capacity.

85. Quick USB charging ports assembly for lighting device, the said light device has optic film added to prevent reflection from the LED, LEDs, LED Bulb or other light source.

86. Quick USB charging ports assembly for lighting device, the said outlet-unit or outlet-module has add surge protection, or master controller or wireless communication by Wife, APP, remote controller, infra-red, RF remote, timer, time delay, dimmer, color changing, brightness controller functions or features.

87. Quick USB charging ports assembly for lighting device, the said lighting device incorporate with switch, sensor, motion sensor, timer, to turn on and turn off the lighting device.

88. A Quick USB charging-ports assembly for desktop power station device, consist of, At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and separated USB-wire which has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged devices.

A desktop power station device has more than one power charging or-and supplying function including more than one receiving-port(s) to connect different other products' plug or input-end or prongs or add extra function(s) select from lighting, LED(s), illumination, controller, wireless communication, motion detection, surge protection, leakage current function, overheat function and device, charging status indicator and device has housing with opening to install the USB charging port(s) and other receiving-ports for other functions.

89. The Quick USB charging ports assembly for desktop power station device, the said power source is from outside the device housing's AC to DC transformer, adaptor, converter, invertor which has circuit-kits inside to change the AC current to DC current.

90. The Quick USB charging ports assembly for desktop power station device, the said power source is from outside device housing's AC wall outlet and get power by the AC plug and wire to the device inner-circuit which has transformer, invertor, adaptor, converter assembly inside and change the input AC current to DC current.

91. The Quick USB charging ports assembly for desktop power station device, the said device has LED or LEDs to offer at least one function select from illumination, indicator light, lighted image, project image, time display, charging status, date or/and calendar display, temperature display, message display, color changing, brightness changing, dimmer the light brightness.

92. The Quick USB charging ports assembly for desktop power station device, the said device has extra lighting which is a non-LED light source to offer illumination, indicator light, lighted image, project image, time display, charging status, date or/and calendar display, temperature display, message display, different color of light, different brightness, dimmer the light brightness.

93. The Quick USB charging ports assembly for desktop power station device, the said device housing has at least one parts or desire combination select from device's plurality of AC outlets, female receiving-ports for mail plug, insert-end, prong, connector, adaptor to build the electric signal delivery, audio connector, video connector, wireless communication receiver or transmitter, Bluetooth sets, wife set, base, bar, stand, stationary construction or organizer, compartment, compartment for the install all electric parts & accessories, organizer, holder for phone or ipad or power-bank, be-charged products, or other housing arrangement has space.

94. The Quick USB charging ports assembly for desktop power station device, the said circuit has more than one of circuit-kits, or circuit-inner, there has other circuit-inside which beside the said transformer, invertor, adaptor, converter fit inside of the device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infra-red controller, wireless communication controller.

95. The Quick USB charging ports assembly for desktop power station device, the said desktop power station device has power charging or-and supplying function is one device has desire combination select from USB charger, AC Power supplier, time piece, LED segments has 8 construction, time piece has audio parts & accessories, clock, night light, working light, digital alarm time piece, alarm clock, digital or analog time piece, weather station, radio, temperature, fan, video device, wireless communication equipment such as wife, APP, screen, TV.

96. The Quick USB charging ports assembly for desktop power station device, the said other electric or digital products is a communication equipment, computer equipment, consumer electric products which has the DC energy storage unit or assembly inside the products and can be rechargeable.

97. The Quick USB charging ports assembly for desktop power station device, the said USB charging-port is a type A construction which same as majority of laptop computer USB port(s) but has minimum 1.0 A up to 5 Amp or higher charging capacity and do not allow has data delivery.

98. The Quick USB charging ports assembly for desktop power station device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

99. The Quick USB charging ports assembly for desktop power station device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
100. The Quick USB charging ports assembly for desktop power station device, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
101. The Quick USB charging ports assembly for desktop power station device, the said only one input power source, the said USB charging-port(s) only take output-end's DC current from
   (7) the circuit-inner while without the outside device's housing transformer; or
   (8) circuit-kits while has the outside device's housing transformer.
102. The Quick USB charging ports assembly for desktop power station device, the said device further incorporate with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.
103. The Quick USB charging ports assembly for desktop power station device, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, machine, electric tools, or any machine, tools, kits, equipment for people to work which need to use AC power source.
104. The Quickly USB charging-ports assembly for desktop power station device, the said outlet-unit or outlet-module or universal unit or sealed units has Outlet receiving ports which may drive different machine, tools, kits and supply the AC current up to 1,850 Watt, 1,650 Watt for normal electric device or any other bigger or lower Watt needed for people while people use the equipment, machine, electric products.
105. The Quick USB charging ports assembly for desktop power station device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
106. The Quick USB charging ports assembly for desktop power station device, the said device has added outlet-unit which has number 1 to N (any number) and has surge-protection for number over the 3 or more to offer added surge protection circuit or the over-heat breaker circuit or the said over-load circuit, current leakage circuit for the more safety.
107. The Quick USB charging ports assembly for desktop power station device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
108. The Quick USB charging ports assembly for desktop power station device, the said device light source is a built-in LED(s), CFL, Power saving bulb, separated LED bulb, Florescent tube, cold-cathode tube, LED tube, EL, OEL or other market available light source.
109. The Quick USB charging ports assembly for desktop power station device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
110. The Quick USB charging ports assembly for desktop power station device, the said device has the USB charging-port on the anywhere of housing, base and has number of outlets on the base or housing with number from 1 to N (any number) so work as power strip has outlets up to N with optional surge protection and has only one wire with AC-Plug to plug-into Wall.
111. Quick USB charging ports assembly for lighting device, consist of;
   A USB charging ports has minimum 1.0 A up to 5.0 Amp charging capacity and specification released on 2007 and update on 2010.
   The USB charging ports only has charging function without any electric or digital data transmit or delivery.
   A circuit incorporate with USB charging port(s) and only has one input power source and supply DC current to charge the energy storage unit or assembly including battery, batteries, rechargeable battery inside the said other electric or digital data product(s).
   The said USB charging-ports incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
   A lighting device has housing and bar, stand, base, pole, clipper, holder with opening to install the USB charging port(s) for quickly charging.
112. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.
113. Quick USB charging ports assembly for lighting device, the said USB-unit, USB-module, Outlet-unit, Outlet-module, USB Universal kits, USB sealed-unit can have number from 1 to N (any number).
114. Quickly USB charging ports assembly for lighting device, the said clipper has spring device so can clip the variety desk, table, bed, tube, bar, post, edge so can install the desktop lighting device on many places where has the thickness equal or less than clipper's two arms opening width.
115. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

116. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall down.

117. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plugs are Type A.

118. Quick USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.

119. Quick USB charging ports assembly for lighting device, the said light device has optic film added to prevent reflection from the LED, LEDs, LED Bulb or other light source.

120. Quick USB charging ports assembly for lighting device, the said outlet-unit or outlet-module has add surge protection, or master controller or wireless communication by Wife, APP, remote controller, infra-red, RF remote, timer, time delay, dimmer, color changing, brightness controller functions or features.

121. Quick USB charging ports assembly for lighting device, the said lighting device incorporate with switch, sensor, motion sensor, timer, to turn on and turn off the lighting device.

122. Quick USB charging ports assembly for lighting device, consist of;
   At least one of USB charging-ports has minimum 1.0 A up to 5.0 Amp around DC 5 Volt or has desire combination for 1.0 A, 2,1 A, 1.2 A, 2.4 A, 3.1 A, 3.6 A, 4.2 A, 4.8 A or other combination for Big Amperage output-current to get quickly charger function and not overheat caused high voltage from transformer output-end to charge the battery.
   The USB charging ports only has charging function without any electric or digital data transmit or delivery.
   At least one of circuit-kits inside the outside housing or circuit-inner inside the lighting device housing and both incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.
   The $2^{nd}$ or more circuit-inside which inside the Light device's housing to supply the power to the said added functions beside the USB Charging-ports and the said $2^{nd}$ or more circuit-inside has electric parts & accessories or $2^{nd}$ transformer to get enough electric current which current needed is bigger than USB Charger needed to said plurality LEDs or plurality different color LEDs or other light source, dinner, switch, motion sensor, remote controller, PIR sensor, or Time display, alarm, controller, wireless communication device, wireless controller, IR photo diode, IP cam, or other market available electric functions to prevent from overheat by one of the transformer to supply the Big Amperage of current to Quickly USB Charging-port and the Plurality of different colors LEDs.
   The said USB charging-port(s) is universal type can fit for all different USB-Wire at least one of plug(s) so can charge all different be-charged device(s).
   The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
   A lighting device has housing and bar, stand, base, pole, clipper, holder with opening to install the USB charging port(s) for quickly charging.

123. A light device has USB charger including;
   At least one outlet power source through AC-to-DC device inside or outside the light device housing to change from outlet's $1^{st}$ Alternative current (AC) to $1^{st}$ voltage Direct Current (DC).
   At least one of DC-to-DC device or IC or other circuit-inside(s) within or inside of the said light device to change the said $1^{st}$ voltage DC current to $2^{nd}$ voltage or more different Voltage DC current(s) and at least one DC Voltage current for USB charger output-end and at least one DC voltage current for DC light source.
   The said light device has light source to offer illumination, and USB Charging-port(s) only to charge the other electric or digital products without electric data delivery.
   The said light source is one of DC or AC light source that DC light source is powered by one of more than one of different voltage DC current (s) or AC light source is powered by the said $1^{st}$ AC current.
   The said DC light source's working voltage DC current and USB charging-port output-end's 5 Volt DC Current powered by the said $1^{st}$ or more different voltage DC current(s) to operate the illumination and charging functions.
   The AC light source powered by the said $1^{st}$ AC current through the inside housing's conductive parts or the said more than one circuit-inside for arrangement.

124. A light device has USB charger including;
   At least one AC outlet power source through inside light device housing at least one of AC-to-DC device to change from outlet's Alternative current (AC) to $1^{st}$ voltage or more different voltage of Direct Current (DC), and
   The said $1^{st}$ voltage or $1^{st}$ voltage DC current though DC-to-DC circuit(s) to get more than one different voltage of Direct current either one is 5 Volt DC current directly or through conductive or electric parts inside light housing to USB charging-port(s) output-end to charge the other electric or digital products, and more than one different voltage of Direct current at least one meet working voltage of the DC light source including LED(s) to get illumination. The said light device has both USB charger and illumination both functions.
   Or
   (A) The said $1^{st}$ voltage Direct current is higher voltage DC current than USB-port output-end's 5 Volt DC current need through DC-to-DC circuit(s) or IC or other circuit-inside(s) within or inside of the said light device to change the said 1$^{st}$ voltage DC current to 2$^{nd}$ voltage DC current or through more DC-to-DC circuit(s) to make more different voltage DC current(s) to arrange USB charging-ports output-end has 5 Volt Direct current to charge other electric or digital device(s) and has 1$^{st}$ AC through the conductive parts or circuit-inside to the said AC light source for illumination.

Or (B) The said 1$^{st}$ voltage Direct current is 5 Volt and directly or through conductive or DC-to-DC circuit, or electric parts inside light housing to all USB charging-port(s) output-end to charge the other electric or digital products, and has the 1$^{st}$ AC current though the circuit-inside or IC or other electric parts to supply or arrange AC power to the said AC light source for illumination.

125. The light device has USB Charger, the said light device has outlet-unit or outlet-module get 1$^{st}$ AC current though the inner housing conductive parts directly to at least one of the out-unit or outlet-module's outlet-port(s) to supply AC power to other electric or digital products.

126. The light device has USB Charger, the said DC light source including built-in LED or LED(s). EL light element, Organic Electro-luminescent element(s).

127. The light device has USB charger, the said AC light source including CFL light, LED bulb.

128. The light device has USB Charger, the said Light device has USB module or USB power station has plurality of USB-ports and Outlet-ports to supply variety of DC current for different amperage and voltage and the said 120 Volt AC current 129. The light device has USB Charger, the said light device has at least one of added function(s) selected from (a) time display has separated batteries power source (b) alarm and time has batteries power source (c) Lighted mirror for reflect image (d) magnify lens to magnify the objects (e) wireless transmitter & receiver (f) APP controller (g) power station (h) surge protection (i) overheat protection (j) shortage cut-off protection (k) blue-tooth operation (l) remote controller (m) motion sensor (n) time delay (o) infra-red controller.

130. The light device has USB Charger, the said light device has LED indicator light to show charging status or added functions status.

131. The light device has USB charger, the said 5 Volt DC current has its tolerance (+/−15%).

The above 131 features for different MAIN DEVICE is fall within the PARENT Filing for desktop items definition which has functions as description as below:

desk top item function means in said desk top item housing for providing at least one of the following functions: a display of light beams from the LED, projection, an image, projection of a time image, clock functions, illumination of an area, playing of music, serving as a source of power or electric signals, display of photos, transmission of digital signals, providing air flow at a desired temperature, generating moisture, steam, or smells, dispensing liquid, brewing coffee/tea, preparing food, and displaying charging status;

To enable people to easily reach, touch, operate, or manage the desk top items, the USB-unit(s) or USB-module(s) are installed on or within the item or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is appreciated all the above discussion, background, brief, details description or alternative, replaceable, equal function, similar concept for quickly USB Charing-port which has initial public specification to overcome the overheating, overcome problem cause while had electric or digital data delivery, overcome only can charge one certain be-charged device because the USB port has male plug with custom-pin arrangement which not fit for variety of the be-charged device(s) so cause big return for not universal, or the more than 2 power source input to the same USB port which will make cost increased and consumer confused with expensive circuit board, so the current inventions same as the parent filing cases as above listed and has the minimum 1.0 Amp to 5 Amp or higher with safety USB charging-ports which can allow Big current passing though without heat problems to prevent overheating and cause the unit risk to fire and quickly charging capacity to save people waiting time is the most important than the charger from out-of-date 500 ma slow charger. The desktop items, lighting items, image items, lighted cosmetic mirror items, digital alarm clock, power station on desk top or any other more application as the parent filing case covered should be still fall within the current invention.

I claim:

1. A desktop or floor light device, comprising:
   a charging system arranged to get AC power from an AC outlet and through AC-to-DC circuitry,
   wherein the AC-to-DC circuitry is:
   (a) built-in the light device;
   (b) built-in an outside transformer plugged into the AC outlet or connected with the AC outlet and the light device by a wire and plug;
   (c) built inside an LED bulb or CFL bulb having an AC power bulb base,
   wherein the AC-to-DC circuitry converts AC current into first DC power for supply to at least one of:
   (1) at least one white color LED light source including at least one cool and warm white LED for reading or working illumination,
   (2) a wireless charging unit which is
      (2a) fixed or installed on a compartment of the light device,
      (2b) a wired unit and disassembled from and reassembled to the compartment of the device, or
      (2c) a unit having space for a wire arrangement, and
   (3) at least one DC-to-DC circuit, integrated circuit, electric parts included within the light device, LED bulb, or CFL bulb to change the first DC power into at least one second DC power for supply to at least one of:
  (i) a USB charging unit or the wireless charging unit with or without a wire connection with the LED light;
  (ii) a colorful LED light source for accent or nightlight illumination, besides the cool and warm white LED for reading or working illumination; and
  (iii) at least one additional function or device to provide a function that is in addition to single white light illumination and that is selected from at least one of:
    (1) a fan or airflow device;
    (2) a clock, alarm clock, or timepiece;
    (3) an integrated circuit for color changing and/or freezing;
    (4) a Bluetooth connected audio device;
    (5) a tray or compartment for storing a key or pocket items;
    (6) at least one second LED having sufficient brightness to illuminate a person or object situated in front of and reflected by a cosmetic mirror to provide a clear reflected or enlarged and reflected image;
    (7) at least one second LED to illuminate an object or person situated in front of the light device to capture by a camera or reflect by a mirror an image of the object or person; and
    (8) at least one receiving connector or USB port for inputting DC power to operate built-in functions of the LED light,
wherein the light device includes at least one built-in, fixed, detachable, or replaceable LED light source that provides illumination over an area or object and that is selected from the following:
A. an LED light source;
B. a plurality of LEDs;
C. at least one chip-on-board (COB) LED; and
D. at least one LED bulb powered by AC power and at least one built-in AC-to-DC circuit,
wherein, in addition to said LED illumination, the light device provides a USB or wireless charging function without data delivery, and
wherein a DC working voltage of the LED light source is different than a working voltage of the USB charger.

2. A desktop or floor light device, comprising:
a charging system arranged to get AC power from an AC outlet and through AC-to-DC circuitry,
wherein the AC-to-DC circuitry is:
(a) built-in the light device;
(b) built-in an outside transformer plugged into the AC outlet or connected with the AC outlet and the light device by a wire and plug;
(c) built inside an LED bulb or CFL bulb having an AC power bulb base,
wherein the AC-to-DC circuitry converts AC current into a first and highest DC voltage for supply to at least one white color LED light source,
wherein the light device further comprises at least one DC-to-DC circuit and/or at least one electric component, for providing at least one second DC voltage that is lower than the first DC voltage for supply to at least one of the following:
(i) at least one of a red, green, and blue LED, or at least one LED having multiple different colored chips built in, for color changing and/or mixing for the accent or night light illumination;
  (ii) the at least one USB charging unit with or without a wire connection with the LED light;
  (iii) the at least one wireless charging unit with or without a wire connection with the LED light;
  (iv) at least one color changing and/or color freezing function or device built-in the LED light;
  (v) an integrated circuit for controlling at least one LED color, brightness, or time function;
  (vi) a conductive switch;
  (vii) a dimmer switch;
  (viii) a color changing switch;
  (ix) a clock, alarm clock, or time display with backup battery for power failure;
  (x) a motor;
  (xi) a Bluetooth system for audio functions;
  (xii) an integrated circuit for a clock or alarm clock; and
  (xiii) an integrated circuit for at least one reading, accent, or night light to provide color changing, color selection, and/or color mixing functions,
wherein the light device includes at least one built-in, fixed, detachable, or replaceable light source that provide illumination over an area or object and that is selected from the following:
A. an LED light source;
B. a plurality of LEDs;
C. at least one chip-on-board (COB) LED; and
D. at least one LED bulb having a built-in AC-to-DC circuit, and
wherein, in addition to said LED illumination, the light device provides a USB or wireless charging function without data delivery.

3. A desktop or floor light device as claimed in claim 1, wherein the light device includes an outlet-unit or outlet-module that receives a first AC current from an AC outlet power source directly through inner housing conductive parts to supply AC power to external AC operated products.

4. A desktop or floor light device as claimed in claim 1, wherein the DC light source is at least one of a built-in, detachable, or replaceable LED light source.

5. A desktop or floor light device as claimed in claim 1, wherein the light device further includes at least one built-in, detachable, or replaceable AC light source having at least one built-in AC-to-DC circuit.

6. A desktop or floor light device as claimed in claim 1, wherein the USB charging unit is a mixed, movable, or replaceable USB or outlet module, or a sealed or universal unit having a predetermined number of output and/or input power USB ports and outlet ports to supply AC or DC currents.

7. A desktop or floor light device as claimed in claim 1, wherein the additional function or device is at least one of:
  (a) a time, alarm clock, weather, temperature, and/or calendar display with at least one separate battery power source;
  (b) an airflow device, air freshener, humidity dispenser, fragrance sprayer, air conditioner, heated air generator, and/or heater device;
  (c) a lighted mirror;
  (d) a magnifying lens and/or mirror;
  (e) a wireless transmitter and receiver;
  (f) a wireless controller incorporated with downloaded APP software;
  (g) a power station or power-fail system or device;
  (h) a surge protection system or device;
  (i) an overheat protection system or device;
  (j) an electric-short protection circuit and/or a cut-off protector;

(k) a Bluetooth connection or control system or device;
(l) an IR, RF, or WiFi device, or a router, for a wireless remote controller;
(m) a motion, photo, motion, radar, microwave, and/or conductive sensor;
(n) a time delay and/or timer for an auto shut-off function;
(o) an infrared sensor or controller;
(p) a speaker or audio system or device; and
(q) a tray, box, drawer, compartment, storage divider, space, or organizer for small items.

8. A desktop or floor light device as claimed in claim 1, wherein the light device has an LED indicator light to show a charging status or added function status.

9. A desktop or floor light device as claimed in claim 1, wherein a minimum voltage of a DC output from the USB charging port is 4.7V DC.

\* \* \* \* \*